United States Patent
Mapes

(10) Patent No.: US 8,971,932 B2
(45) Date of Patent: Mar. 3, 2015

(54) SECURE WITNESS OR CRIMINAL PARTICIPANT LOCATION OR POSITION AND TIME RECORDING INFORMATION APPARATUS, SYSTEMTS AND METHODS

(75) Inventor: Michael Mapes, Colorado Springs, CO (US)

(73) Assignee: Secure Sigint, LLC, Colorado Springs, CO (US)

( * ) Notice: Subject to any disclaimer, the term of this patent is extended or adjusted under 35 U.S.C. 154(b) by 210 days.

(21) Appl. No.: 13/525,201

(22) Filed: Jun. 15, 2012

(65) Prior Publication Data

US 2013/0165157 A1 Jun. 27, 2013

Related U.S. Application Data

(60) Provisional application No. 61/580,205, filed on Dec. 24, 2011, provisional application No. 61/600,650, filed on Feb. 19, 2012.

(51) Int. Cl.
*H04W 24/00* (2009.01)

(52) U.S. Cl.
USPC .................. 455/456.5; 455/404.1; 455/412.1; 455/412.2; 455/435.2; 455/456.1; 455/456.2; 455/456.3; 455/456.6; 455/457; 340/539.13; 340/539.23; 340/573.1; 340/573.4; 370/339; 342/419

(58) Field of Classification Search
USPC ......... 455/404.1, 412.1, 2, 435.2, 456.1–457; 340/539.13, 573.1, 573.4, 539.23; 370/332; 342/419
See application file for complete search history.

(56) References Cited

U.S. PATENT DOCUMENTS

| | | | | |
|---|---|---|---|---|
| 5,396,227 | A * | 3/1995 | Carroll et al. | 340/573.4 |
| 5,461,390 | A * | 10/1995 | Hoshen | 342/419 |
| 5,721,733 | A * | 2/1998 | Wang et al. | 370/332 |
| 5,959,533 | A * | 9/1999 | Layson et al. | 340/573.1 |
| 5,982,281 | A * | 11/1999 | Layson, Jr. | 340/539.13 |
| 6,198,915 | B1 | 3/2001 | McGregor et al. | |
| 6,912,230 | B1 | 6/2005 | Salkini et al. | |
| 7,031,704 | B2 | 4/2006 | Knobl et al. | |
| 7,117,374 | B2 | 10/2006 | Hill et al. | |
| 7,181,493 | B2 * | 2/2007 | English et al. | 709/204 |
| 7,221,928 | B2 * | 5/2007 | Laird et al. | 455/404.1 |
| 7,379,920 | B2 | 5/2008 | Leung et al. | |
| 2005/0149741 | A1 | 7/2005 | Humbel | |
| 2007/0279219 | A1 * | 12/2007 | Warriner | 340/539.23 |
| 2008/0242298 | A1 * | 10/2008 | Nylander et al. | 455/435.2 |
| 2009/0086721 | A1 | 4/2009 | Uhler | |

FOREIGN PATENT DOCUMENTS

WO WO/00/65771 A1 4/2000

* cited by examiner

*Primary Examiner* — Steve D Agosta

(57) ABSTRACT

An apparatus, system or method for use of encrypted or confidential location or position, time, and unique identifier information (LPTI Information) comprising mobile device encoded unique identifiers (UIs), to register the presence of one or more persons in a retail or service store or outlet, vehicle, financial, educational, governmental, transportation, shipping, cargo, residential, vacation, travel, power generation or distribution, water or food supply or storage, or data storage location or position, for use in identifying potential suspects, conspirators, participants or witnesses for criminal, regulated, tort, or prohibited activity for use by law enforcement or a court, and which information is kept encrypted until authorized access is granted to law enforcement or a court by issuance or a warrant or other appropriate legal authorization.

18 Claims, 20 Drawing Sheets

FIG.16

CHARGE INFORMATION MANAGEMENT TABLE (830)

| LARGE ARE POSITION ID ~2201 | TRANSMITTER FIXED ID ~2202 | MOBILE COMMUNICATION COMPANY ID ~2203 | APPLICATION SERVICE COMPANY ID ~2204 | NUMBER OF TIMES OF POSITIONING ~2205 | |
|---|---|---|---|---|---|
| "10000" | "999" | "1"; COMPANY K | "1"; COMPANY G | "10" | ~2206 |
| "10000" | "999" | "2"; COMPANY D | "1"; COMPANY G | "20" | ~2207 |
| "10000" | "998" | "2"; COMPANY D | "2"; COMPANY N | "50" | ~2208 |

SECURE WITNESS OR CRIMINAL PARTICIPANT LOCATION OR POSITION AND TIME RECORDING INFORMATION APPARATUS, SYSTEMTS AND METHODS

PRIORITY

This application claims priority to U.S. provisional application Nos. 61/600,650, filed 2012 Feb. 19; and 61/580,205, filed 2011 Dec. 24, each of which are entirely incorporated herein by reference.

FIELD OF THE INVENTION

The present invention relates to apparatus, systems, and/or methods for collecting encrypted or confidential location and/or position, identity, and time information (LPTI Information) by the use of mobile device unique identifiers (Us) to register the presence of one or more persons in a retail or service store or outlet, or vehicle, or financial, educational, governmental, transportation, shipping, cargo, residential, vacation, travel, power generation or distribution, water or food supply or storage, or data storage location and/or position, for use in identifying potential suspects, conspirators, participants or witnesses for criminal activity.

BACKGROUND

Among location or position measurement systems using radio waves, Global Location or position System (hereinafter, referred to as GPS) is a widely used system. GPS is a system which measures location or positional relationship between GPS satellites and a receiver by utilizing GPS location or position signals transmitted from about 30 satellites traversing earth orbits and can be used to calculate the latitude, longitude, and altitude of a current site. Because the location or position signals from the satellites are used in GPS, there is a problem that the location or position in buildings or underground does not work.

Mobile phone tracking refers to the attaining of the current location or position of a mobile phone, stationary or moving. Localization may occur either via multilateration of radio signals between radio towers of the network and the phone, and/or via GPS. To locate the phone using multilateration of radio signals, it must emit at least the roaming signal to contact the next nearby antenna tower, but the process does not always require an active call. GSM is based on the signal strength to nearby antenna masts. Mobile location or position, which includes location or position based service that discloses the actual coordinates of a mobile phone bearer, is a technology used by telecommunication companies to approximate where a mobile phone, and thereby also its user (bearer), temporarily resides. The more properly applied term locating refers to the purpose rather than a location or position process. Such service is offered as an option of the class of location or position-based services (LBS).

The technology of locating is based on measuring power levels and antenna patterns and uses the concept that a mobile phone always communicates wirelessly with one of the closest base stations, so knowledge of the location or position of the base station implies the cell phone is nearby.

Advanced systems determine the sector in which the mobile phone resides and roughly estimate also the distance to the base station. Further approximation can be done by interpolating signals between adjacent antenna towers.

GSM localization is the use of multilateration to determine the location or position of GSM mobile phones, or dedicated trackers, usually with the intent to locate the user. Localization-Based Systems can be broadly divided into: Network-based; Handset-based; SIM-based; or Hybrid. Network-based techniques utilize the service provider's network infrastructure to identify the location or position of the handset. The advantage of network-based techniques (from mobile operator's point of view) is that they can be implemented non-intrusively, without affecting the handsets.

The accuracy of network-based techniques varies, with cell identification as the least accurate and triangulation as moderately accurate, and newer "Forward Link" timing methods as the most accurate. The accuracy of network-based techniques is both dependent on the concentration of base station cells, with urban environments achieving the highest possible accuracy, and the implementation of the most current timing methods.

Handset-based technology requires the installation of client software on the handset to determine its location or position. This technique determines the location or position of the handset by computing its location or position by cell identification, signal strengths of the home and neighboring cells, which is continuously sent to the carrier. In addition, if the handset is also equipped with GPS then significantly more precise location or position information is then sent from the handset to the carrier.

Cell phone and similar mobile devices have associated serial or identification numbers provided as codes. These codes include an Electronic Identification Number ("EIN") (a unique 32-bit number programmed into the phone by the manufacturer), and a Mobile Identification Number (MIN), a 10-digit number derived from the phone's number.

The cell site relays these codes to the mobile telecommunications switching office in a process known as registration. The registration process is explained in the Department of Justice's Electronic Surveillance Manual:

Cellular telephones that are powered on will automatically register or re-register with a cellular tower as the phone travels within the provider's service area. The registration process is the technical means by which the network identifies the subscriber, validates the account and determines where to route call traffic. This exchange occurs on a dedicated control channel that is clearly separate from that used for call content (e.g., audio)—which occurs on a separate dedicated channel. This registration process automatically occurs even while the cell phone is idle. Moving from one service area to another triggers the registration process anew. The cell site can even initiate registration on its own by sending a signal to the cell phone causing the phone to transmit and identify itself It is possible to scan cell phones using suitable radio frequency scanners and computers to determine what the serial or identification numbers or codes are.

Current methods or systems for identifying potential suspects, conspirators, participants or witnesses for criminal activity suffer from problems such as lack of suitability for correct or practical identification, e.g., where security cameras record images of persons that cannot be properly identified due to clothing or attire that covers or blocks their faces or other distinguishing or identifying features or information.

SUMMARY OF THE INVENTION

Accordingly, there is a need to provide improved identification means, apparatus, methods and/or systems of potential or suspected suspects, conspirators, participants or witnesses for, criminal, regulated, tort, or prohibited activity, that can be provided to law enforcement to help identify such potential or suspected suspects, conspirators, participants or witnesses, and optionally where such information is or can be stored and/or communicated securely and/or in encrypted form to meet applicable local, state, or federal laws or regulations, as well as to maintain privacy of the individuals identified outside the authorized use by law enforcement or court systems relating to specific instances of criminal, regulated, tort, or prohibited activity.

It is an object of the present invention to provide apparatus, systems and/or methods for encrypted or confidentially collected location or position/time/identity information ("LPTI information") location and/or position, encrypted or confidential identity code or identifier (e.g., as a unique identifier (IU)) that can subsequently be used to identify the name or identity of the owner or user of a mobile device), and time information by the use of mobile device encoded unique identifiers (UIs) (e.g., but not limited to, EIN, MIN, and the like, serial or identification numbers, or MAC addesses), to register the presence of one or more persons in a retail or service store or outlet, or vehicle, or financial, educational, governmental, transportation, shipping, cargo, residential, business, vacation, travel, power generation or distribution, water or food supply or storage, or data storage location and/or position, e.g., securely or encrypted, to law enforcement to help identify such potential suspects, conspirators, participants or witnesses.

The present invention provides in one aspect an apparatus, system or method for use of encrypted or confidential mobile device UIs as part of confidential or encrypted LPTI information, to register the presence of one or more persons in a retail or service store or outlet, or vehicle, or financial, educational, governmental, transportation, shipping, cargo, residential, vacation, travel, power generation or distribution, water or food supply or storage, or data storage location and/or position, by time for use in identifying potential suspects, conspirators, participants or witnesses for criminal, regulated, tort, or prohibited activity.

In order to solve the above-described problems, in the present invention, systems and/or methods are alternatively or in combination provided for the use of encrypted or confidential mobile device UIs as part of confidential or encrypted LPTI information, to register the presence of one or more person in a retail or service store or outlet, or vehicle, or financial, educational, governmental, transportation, shipping, cargo, residential, vacation, travel, power generation or distribution, water or food supply or storage, or data storage location and/or position, by time, for use in identifying potential suspects, conspirators, participants or witnesses for actual or potential criminal, regulated, tort, or prohibited activity, which solves one or more problems of prior systems or methods, and which information can be provided, e.g., securely or encrypted, to law enforcement to help identify such potential suspects, conspirators, participants or witnesses, wherein the encrypted or confidential mobile device LPTI information can optionally be accessible by law enforcement or a court upon issuance of a warrant or upon legally accepted basis for access in the investigation, indictment, prosecution, conviction, or appeal of an alleged crime, tort, regulation violation, law violation, ordinance violation, or prohibited activity.

More specifically, methods and/or systems can be provided according to the invention that can include configurations described herein or equivalents evident to those skilled in the relevant arts, as non-limiting examples.

In order to secure the accuracy of location and/or position, time record and mobile device identification number information (also "ID-time information") of a location and/or position, time record and mobile device identification number information system or method, the location or position, time record and mobile device identification number information system or method manages location or position, time record and mobile device identification number information in an area having a determined extent where installation points for one or a plurality of ID and/or time information scanners are set representing or corresponding to the presence of a mobile device and associated person as a potential or suspected suspects, conspirators, participants or witnesses in criminal, regulated, tort, or prohibited activity in the relative vicinity of the one or more scanners, wherein the encrypted or confidential mobile device LPTI information is accessible by law enforcement or a court upon issuance of a warrant or upon legally accepted basis for access in the investigation, indictment, prosecution, conviction, or appeal of an alleged crime, tort, regulation violation, law violation, ordinance violation, or prohibited activity.

The location and/or position, time record and mobile device identification number information system or method can comprise one or more of: the use of, or including, one or more of a mobile device ID scanner installed at one or more installation points and optionally transmitting a specific ID and/or location and/or position identifier; and an ID-time-location and/or position management server receiving the transmitted ID, time, and/or location and/or position identifier and converting the same into location and/or position, time record and mobile device identification number information representing or corresponding to the presence of a mobile device and associated person as a potential or suspected suspects, conspirators, participants or witnesses in criminal, regulated, tort, or prohibited activity in the relative vicinity of the determined one or more installation points, wherein the ID-time-location and/or position management server system or methods comprises:

a. assigning or assigns to the one or more of an ID and/or time information scanners a transmitter fixed identifier specific thereto, b. assigning or assigns to each of the ID and/or time information scanners a transmitter variable identifier which is specific to this ID and/or time information scanner and is a variable value, and c. storing or stores the fixed and variable identifier, and communicated or associated location and/or position, time record and mobile device identification number information from the scanner representing or corresponding to the presence of a mobile device and associated person as a potential or suspected suspects, conspirators, participants or witnesses in criminal, regulated, tort, or prohibited activity in the relative vicinity of, into a storage device and stored and/or accessed as encoded, encrypted and/or secured, either separate from, including or associated with, the ID-time-location and/or position management server, or a related server, d. wherein the encrypted or confidential mobile device LPTI information is accessible by law enforcement or a court upon issuance of a warrant or upon legally accepted basis for access in the investigation, indictment, prosecution, conviction, or appeal of an alleged crime, tort, regulation violation, law violation, ordinance violation, or prohibited activity.

The location and/or position, time record and mobile device identification number information system or method can comprise one or more of: the use of, or including, one or more of a mobile device ID-time scanner installed at one or more installation points and optionally transmitting a specific ID and/or location and/or position variable and/or fixed identifiers; and an ID-time-location and/or position management server receiving the transmitted ID, time, and/or location and/or position identifier and converting the same into location and/or position, time record and mobile device identification number information representing or corresponding to the presence of a mobile device and associated person(s) as a potential or suspected suspects, conspirators, participants or witnesses in criminal, regulated, tort, or prohibited activity in the relative vicinity of one or more installation points, wherein the ID-time-location and/or position management server system or method comprises:

a. assigning or assigns to the determined area a large area location and/or position identifier specific thereto associated with the mobile device ID-time scanner, b. assigning or assigns to the determined scanner installation point a local location and/or position identifier specific thereto associated with the mobile device ID-time scanner, c. assigning or assigns to the ID-time scanner a transmitter fixed identifier specific thereto, d. assigning or assigns to the ID-time scanner a transmitter variable identifier which is specific to this ID and/or time information scanner and is a variable value, and e. storing or stores the assigned large area identifier, local location and/or position identifier, transmitter identifier, and transmitter variable identifier, and communicated or associated location and/or position, time record and mobile device identification number information representing or corresponding to the presence of a mobile device and associated person as a potential or suspected suspects, conspirators, participants or witnesses in criminal, regulated, tort, or prohibited activity in the relative vicinity of the one or more scanners, and stored and/or accessed as encoded, encrypted and/or secured, into a storage device, either separate from, including or associated with the ID-time-location and/or position management server, or a related server, f. wherein the encrypted or confidential mobile device LPTI information is accessible by law enforcement or a court upon issuance of a warrant or upon legally accepted basis for access in the investigation, indictment, prosecution, conviction, or appeal of an alleged crime, tort, regulation violation, law violation, ordinance violation, or prohibited activity.

A system or method of the invention can further optionally include one or more of wherein the ID and/or time information (ID-time) scanner:

g. storing or stores its own transmitter fixed identifier, its own transmitter variable identifier, and a large area location and/or position identifier assigned to an area in which an installation point of the transmitter itself is located, into a storage unit, a. performing or performs a transmitter variable identifier concealing process on the transmitter variable identifier to conceal the transmitter variable identifier stored therein, and b. generating or generates the ID and/or location and/or position identifier comprising the concealed variable identifier and the large area location and/or position identifier, and c. transmitting or transmits one or more of the above identifiers, optionally with location and/or position, time record and mobile device identification number information representing or corresponding to the presence of a mobile device and associated person as a potential or suspected suspects, conspirators, participants or witnesses in criminal, regulated, tort, or prohibited activity in the relative vicinity of the one or more scanners, to the ID-time-location and/or position management server and stored and/or accessed as encoded, encrypted and/or secured;

d. wherein the ID-time-location and/or position management server optionally e. storing or stores into the storage device a transmitter activation identifier management table for managing a correlation among initial values of the transmitter fixed identifier and transmitter variable identifier of the ID and/or time information scanner and the large area location and/or position identifier and local location and/or position identifier of an installation point, f. performing or performs a concealing process on the transmitter variable identifier and stores into the storage device a transmitter identifier management table for managing a correlation among a generated concealed variable identifier and the large area location and/or position identifier and local location and/or position identifier of an installation point, g. storing or stores into the storage device a location and/or position identifier management table for managing a correlation among the large area location and/or position identifier and local location and/or position identifier of an installation point and the location and/or position, time record and mobile device identification number information of the installation point, h. extracting or extracts a concealed variable identifier from the ID and/or location and/or position identifier received from the ID and/or time information scanner, and i. converting or converts the received ID and/or location and/or position identifier into the large area location and/or position identifier and the local location and/or position identifier of an installation point, with the extracted identifier as a secured, encrypted and/or encoded key and with reference to the transmitter identifier management table, optionally further comprising location and/or position, time record and mobile device identification number information, and stored and/or accessed as encoded, encrypted and/or secured data, representing or corresponding to the presence of a mobile device and associated person as a potential or suspected suspects, conspirators, participants or witnesses in criminal, regulated, tort, or prohibited activity in the relative vicinity of the one or more scanners; and j. wherein at least one converted of the large area location and/or position identifiers, and at least one of the local location and/or position identifiers of one or more installation points, optionally further comprising location and/or position, time record and mobile device identification number information from one or more scanners, are provided or communicated to a server, and stored and/or accessed as encoded, encrypted and/or secured, such as the ID-time-location and/or position management server, to convert the two or more location and/or position identifiers into location and/or position, time record and mobile device identification number information with the two location and/or position identifiers as a key and with reference to the location and/or position identifier management table, which information is stored and/or accessed as encoded, encrypted and/or secured data, optionally further includes location and/or position, time record and mobile device identification number information representing or corresponding to the presence of a mobile device and associated person as a potential or suspected suspects, conspirators, participants or witnesses in criminal, regulated, tort, or prohibited activity in the relative vicinity of the one or more scanners.

According to another aspect of the invention, in order to encode, encrypt, or secure the accuracy of one or more sets of location and/or position, time record and/or mobile device identification number information (also "ID-time information"), the information is encoded, encrypted, and/or secured either when recorded or stored on one or more of at least one scanner, location and/or position identifier, server or storage device used in a method or system of the invention, and wherein the encrypted or confidential mobile device LPTI information is accessible by law enforcement or a court upon issuance of a warrant or upon legally accepted basis for access in the investigation, indictment, prosecution, conviction, or appeal of an alleged crime, tort, regulation violation, law violation, ordinance violation, or prohibited activity.

Such a method or system can comprise one or more ID and/or time information scanners being installed at the one or more installation points and transmitting a specific ID and/or location and/or position identifier; and one or more ID-time-location and/or position management servers receiving the transmitted ID, time stamp, and/or location and/or position identifier and converting the same into location and/or position, time record and mobile device identification number information representing the determined installation point and associated location and/or position, time record and mobile device information and/or location and/or position, and stored and/or accessed as encoded, encrypted and/or secured, the information representing or corresponding to the presence of a mobile device and associated person as a potential or suspected suspects, conspirators, participants or witnesses in criminal, regulated, tort, or prohibited activity in the relative vicinity of the one or more scanners, wherein the ID-time-location and/or position management server or associated system or method.

The present invention can also include one or more or any combination of any embodiment described herein or below, as well as similar or equivalent systems or methods as would be evident to one of ordinary skill in the relevant arts.

A location and/or position, time record and mobile device identification number information method of the invention can comprise:
   i. transmitting an ID-time-location and/or position management server, using an electronic transmitting system functionally associated with at least one ID-time scanner, location and/or position, time record and mobile device information representing or corresponding to the presence of a mobile device and associated person as a potential or suspected suspects, conspirators, participants or witnesses in criminal, regulated, tort, or prohibited activity in the relative vicinity of the one or more or at least one ID and/or time information scanner provided at least one determined or predetermined installation point; and
   ii. transmitting to an ID-time-location and/or position management server, using an electronic transmitting system, an ID (collected, stored or accesses as encoded, encrypted or secured) and/or location and/or position identifier from at least one location and/or position identifier correlated with the location and/or position of said ID-time scanner; and
   iii. electronically converting, using said ID-time-location and/or position management server, said ID and/or location and/or position identifier and said location and/or position, time record and mobile device information and/or location and/or position information representing or corresponding to the presence of a mobile device and associated person as a potential or suspected suspects, conspirators, participants or witnesses in criminal, regulated, tort, or prohibited activity in the relative vicinity of the one or more of said at least scanner.

An ID-time-location and/or position management server or method of the invention can optionally further perform one or more of the following functions or steps:
   i. assigns or assigning a large area location and/or position identifier to an area in which an ID and/or time information scanner is installed, and stores the same;
   ii. assigns or assigning a local location and/or position identifier to the installation point of the ID and/or time information scanner in this area and stores the same, wherein the ID and/or time information scanner by itself performs a determined transmitter variable identifier concealing process to generate a concealed variable identifier from a specific transmitter variable identifier; and
   iii. transmits or transmitting the concealed variable identifier and the large area location and/or position identifier to an ID-time-location and/or position management server.

The invention can optionally include a location and/or position, time record and mobile device identification number information system, optionally installed at a predetermined or determined installation point, comprising:
   a. an ID and/or time information scanner transmitting an ID and/or location and/or position identifier; and
   b. an ID-time-location and/or position management server converting the ID and/or location and/or position identifier into location and/or position, time record and mobile device identification number information of the determined installation point, wherein the location and/or position, time record and mobile device identification number information represents or corresponds to the presence of a mobile device and associated person as a potential or suspected suspects, conspirators, participants or witnesses in criminal, regulated, tort, or prohibited activity in the relative vicinity of the one or more of said scanner, wherein the encrypted or confidential mobile device LPTI information is accessible by law enforcement or a court upon issuance of a warrant or upon legally accepted basis for access in the investigation, indictment, prosecution, conviction, or appeal of an alleged crime, tort, regulation violation, law violation, ordinance violation, or prohibited activity.

The invention can provide in a further aspect of the above-described location and/or position, time record and mobile device identification number information method, wherein the transmitter variable identifier concealing process comprises the steps of:
   a. calculating on a computer a first hash value by hashing a transmitter variable identifier stored by the ID and/or time information scanner, with a first hash function and further repeatedly hashing the calculated hash value with the first hash function and generating a first hash information sequence comprising one or a plurality of hash values obtained by this repetition;
   b. calculating on a computer a second hash value by hashing each element of the first hash information sequence with a second hash function and generating a second hash information sequence comprising one or a plurality of the calculated hash values;
   c. calculating on a computer the generated second hash information sequence as a concealed variable identifier.

Such a method can further comprise wherein the step of generating the ID and/or location and/or position identifier comprises the steps of:

a. calculating on a computer a top hash value from each element of the second hash information sequence;

b. calculating on a computer the extracted hash value combined with a large area location and/or position identifier stored therein and generating the ID and/or location and/or position identifier;

c. repeatedly transmitting using an electronic transmitter the generated ID and/or location and/or position identifier a determined first number of times at a determined first time interval; and d. calculating on a computer a next hash value of the second hash information sequence and e. repeating steps (i) to (iv) to generate and transmit the ID and/or location and/or position identifier as described above, wherein the ID number is generated, accessed, stored or provided in an encoded, encrypted or secured form that is accessible to law enforcement or a court when authorized to do so, such as under a warrant or other legal basis.

A location and/or position, time record and mobile device identification number information system manages location and/or position, time record and mobile device identification number (provided, recorded, accessed, stored or provided in an encrypted, secured, or encoded form) information in an area having a determined extent where installation points for one or a plurality of ID and/or time information scanners are set, the location and/or position, time record and mobile device identification number information system comprising:

a. the ID and/or time information scanner being installed at the each set installation point and transmitting a specific ID and/or location and/or position identifier;

b. a mobile communication terminal provided with a location and/or position function including an ID and/or location and/or position identifier receiving unit configured to receive the transmitted ID and/or location and/or position identifier, c. a program execution unit configured to execute a client program of a location and/or position, time record and mobile device identification number information application, and d. a wired or wireless communication unit for mobile communications; and e. a mobile communication server including a wireless communication unit for mobile communication with the mobile communication terminal, and a network communication unit configured to communicate with a network;

f. an application server including a network communication unit configured to communicate with the network and a program execution unit configured to execute a server program of a location and/or position, time record and mobile device identification number information application; and g. an ID-time-location and/or position management server including a network communication unit configured to communicate with the network for receiving the transmitted ID and/or location and/or position identifier via the mobile communication terminal provided with a location and/or position function and the mobile communication server, and h. an ID and/or time information scanner identifier decoding processing unit configured to convert the received ID and/or location and/or position identifier into location and/or position, time record and mobile device identification number information representing the determined installation point, i. wherein the ID-time-location and/or position management server stores, accesses, communicates, and/or stores the mobile ID information in an encrypted, secure or encoded form that is accessible by law enforcement or a court upon issuance of a warrant or upon legally accepted basis for access in the investigation, indictment, prosecution, conviction, or appeal of an alleged crime.

The invention can also optionally include one or more of a location and/or position, time record and mobile device identification number information system, the ID-time-location and/or position management server, wherein for each of the ID and/or time information scanners installed at the determined points, a charge information record of a set of information group consisting of a large area location and/or position identifier of the installation point, a transmitter fixed identification number of the installed ID and/or time information scanner, an identification number of a mobile communication company operating the mobile communication system, an identification number of a service company of the application, and a number of times of location and/or position, which is a number of times of the conversion of an ID and/or location and/or position identifier transmitted by the ID and/or time information scanner into location and/or position, time record and mobile device identification number information, is created and a charge information management table for storing the record is retained in the storage device.

The invention can optionally further include one or more of a method that performs a location and/or position charge process comprising the steps of:

i. every time the mobile terminal location and/or position request is received and converted and decoded into location and/or position, time record and mobile device identification number information, searching the charge information management table, with the large area location and/or position identifier extracted through the conversion and decoding, the transmitter fixed identification number, the mobile communication company identification number, and the service company identification number as a search key; and ii. if there is a charge information record matching the search key, creating a charge information record wherein the number of times of location and/or position of the charge information record is incremented by one, and writing back the charge information record to the charge information management table; OR iii. if there is no charge information record matching the search key, newly creating the charge information record, and setting the number of times of location and/or position of the created charge information record to one and storing the created charge information record into the charge information management table;

iv. reading each record of the charge information management table at a determined time interval;

v. for the each large area location and/or position identifier, summing a total of the number of times of location and/or position of the read record to calculate the number of times of location and/or position for each large area location and/or position, and applying a determined charge function to the calculated number of times of location and/or position and transmitting a location and/or position charge request for an area owner;

vi. for the each mobile communication company identifier, summing a total of the number of times of location and/or position of the read record to calculate the number of times of location and/or position for each mobile communication company, and applying a determined charge function to the calculated number of times of location and/or position and transmitting a location and/or position charge request for a mobile communication company; and vii. for the each application service company identifier, summing a total of the number of times of location and/or position of the read record to calculate the number of times of location and/or position for each application service company, and applying a determined charge function to the calculated number of times of location and/or position, and transmitting a location and/or position charge request for a service company.

The invention can further comprise a location and/or position, time record and mobile device identification number information method, wherein the ID-time-location and/or position management server a. stores, for the each mobile communication terminal, a mobile communication terminal identifier management table for storing a result of a transmitter identifier decoding process, which is performed in response to a mobile terminal location and/or position request transmitted by the mobile communication terminal, into the storage device, b. stores a record comprising a mobile communication terminal identifier, a mobile communication company identifier, a large area location and/or position identifier, a local location and/or position identifier, the location and/or position request occurrence time, a transmitter fixed identifier, and location and/or position, time record and mobile device identification number information into the mobile communication terminal identifier management table, and c. each time the ID-time-location and/or position management server receives the mobile terminal location and/or position request and starts a transmitter identifier decoding process, with reference to the mobile communication terminal identifier management table, and with the identifier of a mobile communication terminal which transmitted the location and/or position request, as a search key, the ID-time-location and/or position management server d. obtains a decoding result of a mobile terminal location and/or position request, which the communication terminal issues immediately before, as search result, and extracts the location and/or position request occurrence time of the immediately preceding location and/or position request and the location and/or position, time record and mobile device identification number information, and e. compares the location and/or position request occurrence time, which is a result of the decoding process of the received new location and/or position request, with the location and/or position, time record and mobile device identification number information, and if a change in the location and/or position, time record and mobile device identification number information, the change being equal to or greater than a determined distance, is detected with a determined time difference, then with regard to an ID and/or time information scanner which transmitted a concealed variable identifier included in the received new location and/or position request, the ID-time-location and/or position management server invalidates a record in the transmitter identifier management table in which the ID and/or time information scanner is registered.

Note that, the present invention also includes each device constituting the above-described location and/or position, time record and mobile device identification number information system, a method using the each device, a method using the location and/or position, time record and mobile device identification number information system, and a computer program for realizing the same, wherein the encrypted or confidential mobile device LPTI information is accessible by law enforcement or a court upon issuance of a warrant or upon legally accepted basis for access in the investigation, indictment, prosecution, conviction, or appeal of an alleged crime, tort, regulation violation, law violation, ordinance violation, or prohibited activity.

According to the present invention, in a location and/or position, time record and mobile device identification number information system, in order to secure the accuracy in location and/or position and also establish a cost sharing mechanism, an ID and/or time information scanner transmits an ID and/or location and/or position identifier instead of directly transmitting location and/or position, time record and mobile device identification number information. A ID-time-location and/or position management server stores and manages the ID and/or location and/or position identifier and the location and/or position, time record and mobile device identification number information while correlating them with each other. In response to a location or position, time record and mobile device identification number information request with an ID and/or location or position identifier, the ID-time-location or position management server converts the ID and/or location or position identifier into location or position, time record and mobile device identification number information according to the aforementioned correlation.

In this way, in order to convert the ID and/or location or position identifier, which the ID and/or time information scanner transmits, into location or position, time record and mobile device identification number information, the ID and/or location or position identifier always goes through the ID-time-location or position management server, so that the ID-time-location or position management server can recognize which mobile communication terminal has received an ID and/or location or position identifier transmitted by a ID-time-location or position terminal installed at which installation place, and for which application the conversion of the location or position, time record and mobile device identification number information has been requested. As a result, according to the number of times of use of an ID and/or location or position identifier, charge information can be generated so that an area owner, a mobile communication company, a mobile communication terminal user, and an application company at an installation point share and pay the installation and operation cost of the location or position, time record and mobile device identification number information system.

Furthermore, the ID and/or location or position identifier transmitted by an ID and/or time information scanner is updated in a determined time using a determined update unit, so that the ID-time-location or position management server can (for example, exclusively) convert the ID and/or location or position identifier into location or position, time record and mobile device identification number information. The application of an encryption technology to the determined update means makes it difficult for a third party to decode the ID and/or location or position identifier and also makes it difficult to forge the ID and/or time information scanner, thus improving the security of the system.

Moreover, in the location or position, time record and mobile device identification number information system, the location or position, time record and mobile device identification number information is directly stored into an ID and/or time information scanner to secure the location or position accuracy, and moreover, in order to establish the cost sharing mechanism, the ID-time-location or position management server stores and manages a correlation between an ID and/or location or position identifier and location or position, time record and mobile device identification number information. In response to a location or position, time record and mobile device identification number information request with an ID and/or location or position identifier, the ID-time-location or position management server converts the ID and/or location or position identifier into location or position, time record and mobile device identification number information according to the aforementioned correlation.

Furthermore, the ID-time-location or position management server updates the ID and/or location or position identifier transmitted by the ID and/or time information scanner in a determined time by using a determined update unit, so that the ID-time-location or position management server can (for example, exclusively) convert the ID and/or location or position identifier into location or position, time record and mobile device identification number information.

Other objects, features, and advantages of the present invention will become apparent from the following description of the embodiments of the present invention in conjunction with the accompanying drawings.

BRIEF DESCRIPTION OF THE DRAWINGS

FIG. 16 is a view showing a configuration of a charge information management table (830).

DESCRIPTION

Figure 1:
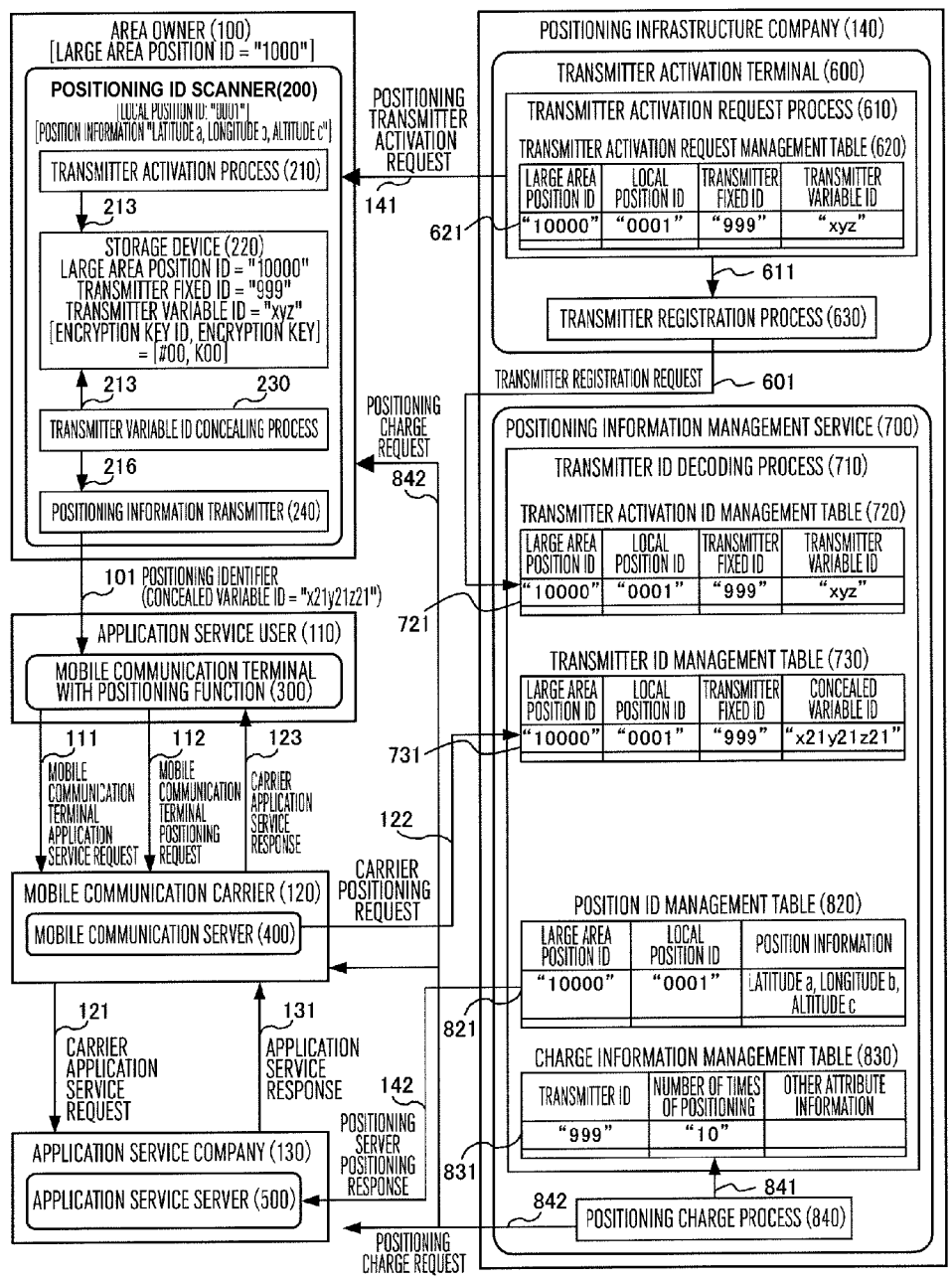
FIG. 1 is a view showing a configuration of an embodiment of an mobile ID—time-location or position system of the present application.

There is a need to provide improved identification means, methods or systems of potential or suspected suspects, conspirators, participants or witnesses for, criminal, regulated, tort, or prohibited activity, that can be provided to law enforcement to help identify suspects, conspirators, participants or witnesses, and additionally where such information is or can be stored and/or communicated to law enforcement or a court securely and/or in encrypted form to meet applicable local, state, or federal laws or regulations, as well as to maintain privacy of the individuals identified outside the authorized use by law enforcement or court systems relating to specific instances of criminal, regulated, tort, or prohibited activity.

It is an object of the present invention to provide systems and/or methods for collecting location or position, identity (e.g., as a unique identifier (IU) that can subsequently be used to identify the owner or user of a mobile device), and time information by the use of mobile device encoded unique identifiers (Us) (e.g., but not limited to, EIN, MIN, and the like, serial or identification numbers, or MAC addesses), to register the presence of one or more persons in a retail or service store or outlet, or vehicle, or financial, educational, governmental, transportation, shipping, cargo, residential, business, vacation, travel, power generation or distribution, water or food supply or storage, or data storage location or position, for use in identifying potential suspects, conspirators, participants or witnesses for criminal, regulated, tort, or prohibited activity, which solves one or more problems of prior systems or methods, and which information can be provided, e.g., securely or encrypted, to law enforcement to help identify such potential suspects, conspirators, participants or witnesses, wherein the encrypted or confidential mobile device LPTI information is accessible by law enforcement or a court upon issuance of a warrant or upon legally accepted basis for access in the investigation, indictment, prosecution, conviction, or appeal of an alleged crime, tort, regulation violation, law violation, ordinance violation, or prohibited activity, wherein the encrypted or confidential mobile device LPTI information is accessible by law enforcement or a court upon issuance of a warrant or upon another legally accepted basis for access in the investigation, indictment, prosecution, conviction, or appeal of an alleged crime or other prohibited activity.

The invention can provide wherein the financial location or position is selected from an automated teller machine, a bank, a lending company, a check cashing company, a credit union, an investment company, or financing company.

The invention can provide wherein the residential location or position is selected from a home, rental property, a vacation home, a condominium, an apartment, a townhouse, The invention can provide wherein the transportation location or position is selected from an airport, a train station, a bus station, a subway station, a taxi or limousine station or stand, a shipping or cargo port or dock, a trucking or railway stop or distribution center, or a cargo stop, port or distribution center.

The invention can provide wherein the educational location or position is selected from a primary school, a secondary school, a college, a university, a vocational school, a health services school or university, a computer training school, a retail or services school.

The invention can provide wherein the method is provided at a business or residential location or position using a wireless or Ethernet internet connection provided by a cable, satellite, telephone, TV, wireless, or fiber optic product, service, or security system provider.

The invention can provide wherein the security provider provides security services to an occupant, owner or leasee at the residential or business location or position.

The invention provides a system or method for use of mobile device encoded Unique Identifiers (UIs) to register the presence of one or more persons in a retail or service store or outlet, or vehicle, or financial, educational, governmental, transportation, shipping, cargo, residential, vacation, travel, power generation or distribution, water or food supply or storage, or data storage location or position, by time for use in identifying potential suspects, conspirators, participants or witnesses for criminal, regulated, tort, or prohibited activity, which solves one or more problems of prior systems or methods, and which information can be provided, e.g., securely or encrypted, to law enforcement to help identify such potential suspects, conspirators, participants or witnesses.

The present invention provides in one aspect systems and/or methods for collecting encrypted or confidential location or position, time, and unique identifier information (LPTI Information) by the use of mobile device encoded unique identifiers (UIs), to register the presence of one or more persons in a retail or service store or outlet, or vehicle, or financial, educational, governmental, transportation, shipping, cargo, residential, vacation, travel, power generation or distribution, water or food supply or storage, or data storage location or position, for use in identifying in identifying potential suspects, conspirators, participants or witnesses for criminal, regulated, tort, or prohibited activity. Non limiting examples include: ATMS, financial institutions, banks, lending companies, check cashing, credit unions, investing companies, Airports, bus and train stations, ports, cargo shipping, passenger and cruise lines; Shipping companies (trucking, FedEx, UPS, cargo, etc.); Commercial, residential, and governmental security systems; Primary, secondary and colleges and universities; Government buildings; Shop lifting security/electronic articles surveillance; Residential/commercial security monitoring by cable, satellite, and wireless/telephone/fiber optics companies; and/or Data storage/cloud/data backup companies.

Financial location or positions can include any type of property that provides any type of financial service or products, as well as ATMs.

ATMs: Automated teller machine or automatic teller machine (ATM), also known as an automated banking machine (ABM) in Canada, and a Cashpoint (which is a trademark of Lloyds TSB), cash machine or sometimes a hole in the wall in British English, is a computerized telecommunications device that provides the clients of a financial institution with access to financial transactions in a public space without the need for a cashier, human clerk or bank teller. ATMs are known by various other names including ATM machine, automated banking machine, and various regional variants derived from trademarks on ATM systems held by particular banks. There are two major types of financial institutions: banks (i.e., deposit-type financial institutions) and nonbanks (i.e., non-deposit-type financial institutions).

Most ATMs are connected to interbank networks, enabling people to withdraw and deposit money from machines not belonging to the bank where they have their account or in the country where their accounts are held (enabling cash withdrawals in local currency). Some examples of interbank networks include PULSE, PLUS, Cirrus, Interac, Interswitch, STAR, and LINK. ATMs rely on authorization of a financial transaction by the card issuer or other authorizing institution via the communications network. This is often performed through an ISO 8583 messaging system.

Many banks charge ATM usage fees. In some cases, these fees are charged solely to users who are not customers of the bank where the ATM is installed; in other cases, they apply to all users. In order to allow a more diverse range of devices to attach to their networks, some interbank networks have passed rules expanding the definition of an ATM to be a terminal that either has the vault within its footprint or utilizes the vault or cash drawer within the merchant establishment, which allows for the use of a scrip cash dispenser.

ATMs typically connect directly to their host or ATM Controller via either ADSL or dial-up modem over a telephone line or directly via a leased line. Leased lines are preferable to POTS lines because they require less time to establish a connection. Leased lines may be comparatively expensive to operate versus a POTS line, meaning less-trafficked machines will usually rely on a dial-up modem. That dilemma may be solved as high-speed Internet VPN connections become more ubiquitous. Common lower-level layer communication protocols used by ATMs to communicate back to the bank include SNA over SDLC, TC500 over Async, X.25, and TCP/IP over Ethernet.

In addition to methods employed for transaction security and secrecy, all communications traffic between the ATM and the Transaction Processor may also be encrypted via methods such as SSL.

An ATM is typically made up of the following devices: CPU (to control the user interface and transaction devices); Magnetic and/or Chip card reader (to identify the customer); PIN Pad (similar in layout to a Touch tone or Calculator keypad), often manufactured as part of a secure enclosure; Secure crypto processor, generally within a secure enclosure; Display (used by the customer for performing the transaction); Function key buttons (usually close to the display) or a Touchscreen (used to select the various aspects of the transaction); Record Printer (to provide the customer with a record of their transaction); Vault (to store the parts of the machinery requiring restricted access) Housing (for aesthetics and to attach signage to)

Mechanisms found inside the vault may include: Dispensing mechanism (to provide cash or other items of value); Deposit mechanism including a Check Processing Module and Bulk Note Acceptor (to allow the customer to make deposits); Security sensors (Magnetic, Thermal, Seismic, gas); Locks: (to ensure controlled access to the contents of the vault) Journaling systems; many are electronic (a sealed flash memory device based on proprietary standards) or a solid-state device (an actual printer) which accrues all records of activity including access timestamps, number of bills dispensed, etc.—This is considered sensitive data and is secured in similar fashion to the cash as it is a similar liability.

With the migration to commodity PC hardware, standard commercial "off-the-shelf" operating systems and programming environments can be used inside of ATMs. With the move to a more standardized software base, financial institutions have been increasingly interested in the ability to pick and choose the application programs that drive their equipment. WOSA/XFS, now known as CEN XFS (or simply XFS), provides a common API for accessing and manipulating the various devices of an ATM. J/XFS is a Java implementation of the CEN XFS API. With the onset of Windows operating systems and XFS on ATM's, the software applications have the ability to become more intelligent. This has created a new breed of ATM applications commonly referred to as programmable applications. These types of applications allows for an entirely new host of applications in which the ATM terminal can do more than only communicate with the ATM switch. It is now empowered to connect to other content servers and video banking systems. Notable ATM software that operates on XFS platforms include Triton PRISM, Diebold Agilis EmPower, NCR APTRA Edge, Absolute Systems Absolute NTERACT, KAL Kalignite, Phoenix Interactive VISTAatm, and Wincor Nixdorf ProTopas. With the move of ATMs to industry-standard computing environments, concern has risen about the integrity of the ATM's software stack.

Encryption of personal information, required by law in many jurisdictions, is used to prevent fraud. Sensitive data in ATM transactions are usually encrypted with DES, but transaction processors now usually require the use of Triple DES. Remote Key Loading techniques may be used to ensure the secrecy of the initialization of the encryption keys in the ATM. Message Authentication Code (MAC) or Partial MAC may also be used to ensure messages have not been tampered with while in transit between the ATM and the financial network. There have also been a number of incidents of fraud by Man-in-the-middle attacks, where criminals have attached fake keypads or card readers to existing machines. These have then been used to record customers' PINs and bank card information in order to gain unauthorized access to their accounts. Various ATM manufacturers have put in place countermeasures to protect the equipment they manufacture from these threats. The use of MAC addresses can be provided to determine location associated with an internet phone, e.g., as disclosed in U.S. application Ser. No. 12/042,586, which is entirely incorporated herein by reference.

Alternate methods to verify cardholder identities have been tested and deployed in some countries, such as finger and palm vein patterns, iris, and facial recognition technologies. However, recently, cheaper mass production equipment has been developed and is being installed in machines globally that detect the presence of foreign objects on the front of ATMs, current tests have shown 99% detection success for all types of skimming devices.

Although ATMs were originally developed as just cash dispensers, they have evolved to include many other bank-related functions. In some countries, especially those which benefit from a fully integrated cross-bank ATM network (e.g.: Multibanco in Portugal), ATMs include many functions which are not directly related to the management of one's own bank account, such as, but not limited to: Deposit currency recognition, acceptance, and recycling; Paying routine or other bills, fees, and taxes (utilities, phone bills, social security, legal fees, taxes, etc.); Printing bank statements; Updating passbooks; Loading monetary value into stored value cards; Purchasing Postage stamps; Lottery tickets; Train tickets; Concert tickets; Movie tickets; Shopping mall gift certificates; Games and promotional features; Fast loans; CRM at the ATM; Donating to charities; Cheque Processing Module; Adding pre-paid cell phone/mobile phone credit; Paying (in full or partially) the credit balance on a card linked to a specific current account; and Transferring money between linked accounts (such as transferring between checking, debit, credit, and/or savings accounts).

Increasingly banks are seeking to use the ATM as a sales device to deliver pre-approved loans and targeted advertising using products such as ITM (the Intelligent Teller Machine) from Aptra Relate from NCR. ATMs can also act as an advertising channel for companies to advertise their own products or third-party products and services. In Canada, ATMs are called guichets automatiques in French and sometimes "Bank Machines" in English. The Interac shared cash network does not allow for the selling of goods from ATMs due to specific security requirements for PIN entry when buying goods. CIBC machines in Canada, are able to top-up the minutes on certain pay as you go phones.

Manufacturers have demonstrated and have deployed several different technologies on ATMs that have not yet reached worldwide acceptance, such as: Biometrics, where authorization of transactions is based on the scanning of a customer's fingerprint, iris, face, etc. Biometrics on ATMs can currently be found in Asia; Cheque/Cash Acceptance, where the ATM accepts and recognize cheques and/or currency without using envelopes Bar code scanning; On-demand printing of "items of value" (such as movie tickets, traveler's cheques, etc.); Dispensing additional media (such as phone cards); Co-ordination of ATMs with mobile phones; Customer-specific advertising; and/or Integration with non-banking equipment.

A postal interactive kiosk may also share many of the same components as an ATM (including a vault), but only dispenses items relating to postage.

A scrip cash dispenser may share many of the same components as an ATM, but lacks the ability to dispense physical cash and consequently requires no vault. Instead, the customer requests a withdrawal transaction from the machine, which prints a receipt. The customer then takes this receipt to a nearby sales clerk, who then exchanges it for cash from the till.

A Teller Assist Unit may also share many of the same components as an ATM (including a vault), but they are distinct in that they are designed to be operated solely by trained personnel and not the general public, they do not integrate directly into interbank networks, and are usually controlled by a computer that is not directly integrated into the overall construction of the unit.

FINANCIAL INSTITUTIONS: Deposit-type financial institutions mainly fall under four classifications: commercial banks, savings and loan associations, credit unions, and the newer Internet banks. Savings and loan associations have slightly different ownership arrangements than banks, but they are similar to commercial banks. Credit unions are similar to savings and loan associations, but they are not-for-profit organizations and are owned by their members. Nonbank financial institutions consist of two main kinds: mutual fund companies and brokerage firms. Mutual fund companies have broken into the banking arena. With many mutual fund companies, you can now write checks against your mutual fund account. Brokerage firms have also gotten into the act. Many brokerage firms now allow you to write checks, issue credit cards and ATM cards, and make loans. Brokerage firms offer these and many other account features that were once reserved for traditional banks. With the blurring of roles between deposit and no deposit institutions, banks can offer investment services and non-banks can offer check-writing privileges, credit cards, and savings accounts. 1. Deposit-taking institutions that accept and manage deposits and make loans, including banks, building societies, credit unions, trust companies, and mortgage loan companies 2. Insurance companies and pension funds; and 3. Brokers, underwriters and investment funds.

A financial institution is one that facilitates allocation or position of financial resources from its source to potential users. There are a large number of different types of financial institutions in the United States, creating a rich mosaic in the financial system. Some institutions acquire funds and make them available to users. Others act as middlemen between deficit and surplus units. Still others invest (manage) funds as agents for their clients. The key categories of financial institutions are the following: deposit taking; finance and insurance; and investment, pension, and risk management. There are also government and government-sponsored institutions that carry out regulatory, supervisory, and financing functions. Historically, each type has performed a specialized function in financing and investment management.

DEPOSIT TAKING: Deposit-taking institutions take the form of commercial banks, which accept deposits and make commercial and other loans; savings and loan associations and mutual savings banks, which accept deposits and make mortgage and other types of loans; and credit unions, which are cooperative organizations that issue share certificates and make member (consumer) and other loans. Altogether there are more than 15,000 deposit taking institutions with more than 100,000 branches spread across the economy.

Savings and loan associations, mutual savings banks and credit unions, and money market mutual funds are other deposit-taking institutions. Savings and loan associations take savings deposits and primarily make mortgage loans throughout the country. They have provided funds to create millions of housing units in the county. Their key function is maturity intermediation when they accept short-term deposit and make long-term mortgage loans. Mutual savings banks exist mainly in the eastern part of the United States. Like savings and loan associations, they, too, accept short-maturity deposits and make long-term mortgage loans. They also issue consumer and other loans, making them more diversified and therefore less risky in terms of loan defaults. Credit unions specialize in member savings and loans, although they also make mortgage-type loans and other investments similar to other deposit-taking institutions.

FINANCE AND INSURANCE INSTITUTIONS: Finance (credit) companies are different from deposit-taking banking institutions in that their sources of funds are not deposits. They acquire funds in the market by issuing their own obligations, such as notes and bonds. They, however, make loans on the other side of the balance sheet in full competition with deposit-taking and other types of financial institutions, such as insurance companies. Finance companies specialize in business inventory financing, although they also make consumer loans, mostly indirectly through manufacturers and distributors of goods and services. Some of the finance companies are huge and operate in domestic as well as foreign markets. Several are bigger than most of the commercial banks in the United States.

Insurance companies provide the dual services of insurance protection and investment. There are two types of insurance companies: life insurance companies and casualty and property insurance companies. Insurance companies' sources of funds are primarily policy premiums. Their uses of funds range from loans (thus competing with finance companies, commercial banks, and savings and loan associations) to creation of investment products (thus competing with investment companies). Life insurance companies match their certain mortality-based needs for cash outflows with longer-term riskier investments such as stocks and bonds. Casualty and property insurance companies have more uncertainty of cash outflows and their timing. Therefore they have more conservative investment policies in terms of maturity and credit risk of their investments.

INVESTMENT, PENSION, AND RISK MANAGEMENT: Investment companies pool together funds and invest in the market to achieve goals set for various types of investments, matching liquidity, maturity, return, risk, tax, and other preferences of investors on the one hand and users of funds on the other. Investment companies are organized as open-end or closed-end mutual funds. Open-end funds accept new investments and redeem old ones, while closed-end funds accept funds at one time and then do not take in new funds. Investment companies have become very popular with investors in recent decades, and thus they have mobilized trillions of dollars.

Another investment type of company is investment banks, which provide investment and fund-raising advice to potential users of funds, such as commercial, industrial, and financial companies. They also create venture capital funds or companies. Some of them also have brokerage and dealerships in securities. Many of them underwrite securities and then place them in the market or sell them to investors.

Pension funds in the private and the government sectors collect pension contributions and invest them according to goals of the employees for their funds. Increasingly, employees are able to indicate their personal preferences for risk and reward targets with respect to their own and sometimes their employers' contributions.

Other institutions that are significant parts of the financial system are the stock, bond, commodity, currency, futures, and options exchanges. The various types of exchanges make possible not only creation and ownership of financial claims but also management of liquidity and risk of price changes and other risks in underlying commodities in the market. They greatly expand investment opportunities for savers and access to funds by small, medium, and large business enterprises. They have deepened and broadened markets in financial products and services, helped manage price risk, and improved allocation or position efficiency in financial markets where every attribute desired in a financial product has a counter party to trade with. The banking and investment intermediaries have extended their services to the global saver-investor with the cross-border flow of funds and trading of financial products facilitated by cross-border investing, listing, and trading of securities in home and foreign markets in home and foreign currencies.

Any suitable scanner, secure or encrypted mobile or other communication, computer, server, and/or data transmitting and/or recording systems or devices can be used as is known in the art. As a non-limiting example, a mobile device serial or other identification number scanner can be used as is known in the art. Non-limiting examples include cellphone ESN readers or DDI (Digital Data Interpreters) that can monitor the radio wave transmissions from the cell phones, where the ESN & MIN can then recorded. There are other devices also such as Plugs and ES-Pros which do not require computers. Both GSM and CDMA technology mobile devices can be scanned for their ESN or MIN numbers.

Security and Alarm Systems:

AIRPORT SECURITY refers to the techniques and methods used in protecting airports and aircraft from crime. Large numbers of people pass through airports. This presents potential targets for terrorism and other forms of crime because of the number of people located in a particular location or position. Similarly, the high concentration of people on large airliners, the potential high death rate with attacks on aircraft, and the ability to use a hijacked airplane as a lethal weapon may provide an alluring target for terrorism. Airport security attempts to prevent any threats or potentially dangerous situations from arising or entering the country. If airport security does succeed in this, then the chances of any dangerous situations, illegal items or threats entering into an aircraft, a country or an airport are greatly reduced. As such, airport security serves several purposes: To protect the airport and country from any threatening events, to reassure the traveling public that they are safe and to protect the country and their people.

Airport enforcement authority: While some countries may have an agency that protects all of their airports. The primary personnel will vary and can include: A police force hired and dedicated to the airport i.e. the Irish Airport Police Service; A branch (substation) of the local police department stationed at the airport; Members of the local police department assigned to the airport as their normal patrol area; Members of a country's military; Members of a country's airport protection service; and/or Police dog services for explosive detection, drug detection and other purposes; Other resources may include: Security guards; Paramilitary forces; Military forces; and/or Process and equipment.

Travelers are screened by metal detectors. Explosive detection machines used include X-ray machines and explosives trace-detection portal machines (a.k.a. "puffer machines"). In the United States the TSA is working on new scanning machines that are still effective searching for objects that aren't allowed in the airplanes but that don't depict the passengers in a state of undress that some find embarrassing. Explosive detection machines can also be used for both carry on and checked baggage. These detect volatile compounds given off from explosives using gas chromatography A recent development is the use of backscatter X-rays to detect hidden weapons and explosives on passengers. These devices, which use Compton scattering, require that the passenger stand close to a flat panel and produce a high resolution image. A technology released in Israel in early 2008 allows passengers to pass through metal detectors without removing their shoes, a process required as walk-though gate detectors are not reliable in detecting metal in shoes or on the lower body extremities. Alternately, the passengers step fully shod onto a device which scans in under 1.2 seconds for objects as small as a razor blade. In some countries, specially trained individuals may engage passengers in a conversation to detect threats rather than solely relying on equipment to find threats.

Generally people are screened through airport security into areas where the exit gates to the aircraft are located. These areas are often called "secure", "sterile" and airside. Passengers are discharged from airliners into the sterile area so that they usually will not have to be re-screened if disembarking from a domestic flight; however they are still subject to search at any time. Airport food outlets have started using plastic glasses and utensils as opposed to glasses made out of glass and utensils made out of metal to reduce the usefulness of such items as weapons.

Another critical security measure utilized by several regional and international airports is the use of fiber optic perimeter intrusion detection systems. These security systems allow airport security to locate and detect any intrusion on the airport perimeter, ensuring real-time, immediate intrusion notification that allows security personnel to assess the threat and track movement and engage necessary security procedures. This has notably been utilized at Dulles International Airport and U.S. Military JFPASS.

PORT SECURITY refers to the defense, law and treaty enforcement, and counterterrorism activities that fall within the port and maritime domain. It includes the protection of the seaports themselves, the protection and inspection of the cargo moving through the ports, and maritime security.

Port security in the United States. In the United States, port security is handled jointly by the Coast Guard and U.S. Customs and Border Protection, both components of the Department of Homeland Security. Local law enforcement agencies and the FBI also have a role in port security at the local and regional level.

Port security gained prominence politically in 2006 due to the sale of British company P&O Ports (including its American port assets) to Dubai Ports World. The ensuing controversy led to charges that the purchase would pose a national security risk. In March 2006, Dubai Ports World announced that it would sell off its American assets, and they were sold to AIG in December 2006. The new attention to port security that the controversy generated led to the passage of the SAFE Port Act (H.R. 4954) in Congress in 2006.

Vulnerabilities: The U.S. maritime system consists of over 300 sea and river ports with more than 3,700 cargo and passenger terminals. Cargo containers represent the largest area of concern in terms of security and vulnerability. With an estimated global inventory of over 12 million, the securing, tracking, and inspection of all shipping containers are a difficult task. The largest obstacle to overcome with cargo and port security is cost: the cost of inspecting the containers, and the cost of shipping delays from those inspections. A large container ship has the capacity to carry in excess of 3,000 containers, making inspection impossible without disrupting shipment. More than 6 million cargo containers enter U.S. seaports annually, of which only 2% are physically inspected by Customs.

The protection and security of the landside perimeter of a port is difficult due to their large size. Ports located in highly urbanized areas allow terrorists a densely populated area in which to hide while infiltrating or escaping the port area at their perimeter. The high volume of trucks entering and exiting port facilities pose a threat to the port, as well as surrounding geographical areas. Exiting trucks may contain WMD or terrorist operatives that are to infiltrate a surrounding metropolitan area, i.e. transporting a chemical explosive device (from the Port of Los Angeles) to a more densely populated area (downtown Los Angeles). Container ships anchored at port facilities are particularly vulnerable to both high-jacking and explosive devices as they are stationary targets. Most crews of cargo ships are unarmed, and would be defenseless to an armed attack. The disabling of a ship at port is enough to halt all activity at that port for an extended period of time, especially if the disabled ship is blocking a throughway for other vessels.

Although there are many government sponsored agencies involved with port security, the responsibility of providing that security is of state and local governments. Under the protective principle, a state has jurisdiction to prescribe and enforce laws against acts that threaten vital state interests. The protective principle recognizes that a state may apply its laws to protect vital state interests, such as the state's national security or governmental functions. Some ports may enact their own police forces in addition to city law enforcement.

Federal agencies that are involved with port security include the Coast Guard, U.S. Customs and Border Protection, and the Transportation Security Administration (TSA). These three agencies are now under the jurisdiction of the Department of Homeland Security. The Maritime Administration (MARAD) is also, while the Coast Guard and Customs are the two prominent agencies at ports. The Coast Guard is responsible for evaluating, boarding, and inspecting commercial ships as they approach U.S. waters, for countering terrorist threats in U.S. ports, and for helping to protect U.S. Navy ships in U.S. ports. CBP's primary responsibility is the inspecting of cargo, including containers that commercial ships bring into U.S. ports. CBP is also responsible for the inspection of ship crews and passengers aboard the vessel. The TSA's focus was initially focused on air transportation, but now has the authority of all modes of transportation. MARAD is a civilian agency that is part of the Department of Transportation. MARAD publishes Maritime Security Reports and national planning guides on port security.

CBP has initiated new programs to aid in counter terrorist efforts by creating the Container Security Initiative (CSI) and the Customs Trade Partnership against Terrorism (C-TPAT). The CSI consists of 4 core elements: Using intelligence and automated information to identify and target containers that pose a risk for terrorism, pre-screening those containers that pose a risk at the port of departure before they arrive at U.S. ports, using detection technology to quickly pre-screen containers that pose a risk, and using smarter, tamper-evident containers. Under C-TPAT, shippers commit to improving the security of their cargo shipments, and in return, they receive a variety of benefits from the government f. SUPPLY CHAIN SECURITY refers to efforts to enhance the security of the supply chain: the transport and logistics system for the world's cargo. It combines traditional practices of supply chain management with the security requirements of the system, which are driven by threats such as terrorism, piracy, and theft. Some analysts have raised concerns about supply chain security overreach. Typical supply chain security activities include: Credentialing of participants in the supply chain; Screening and validating of the contents of cargo being shipped; Advance notification of the contents to the destination country; Ensuring the security of cargo while in-transit via the use of locks and tamper-proof seals; and/or Inspecting cargo on entry.

Key initiatives. There are a number of supply chain security initiatives in the United States and around the world today. These include:

The Customs Trade Partnership against Terrorism (C-TPAT), a voluntary compliance program for companies to improve the security of their corporate supply chains;

The World Customs Organization (WCO) adopted the Framework of Standards to Secure and Facilitate Global Trade in 2005, which consists of supply chain security standards for Customs administrations including Authorized Economic Operator(AEO) programs;

The Container Security Initiative(CSI), a program led by U.S. Customs and Border Protection in the Department of Homeland Security focused on screening containers at foreign ports; and/or The World Customs Organization.

Efforts for countries around the world to implement and enforce the International Ship and Port Facility Security Code (ISPS Code), an agreement of 148 countries that are members of the International Maritime Organization (IMO).

Pilot initiatives by companies in the private sector to track and monitor the integrity of cargo containers moving around the world using technologies such as RFID and GPS.

The International Organization for Standardization has released a series of Standards for the establishment and management of supply chain security. ISO/PAS 28000-Specification for security management systems for the supply chain, offers public and private enterprise an international high-level management standard that enables organizations to utilize a globally consistent management approach to applying supply chain security initiatives.

PHYSICAL SECURITY/ALARM SYSTEMS: The field of security engineering has identified the following elements to physical security:

obstacles, to frustrate trivial attackers and delay serious ones; to include: explosion protection;

detection systems, such as surveillance systems, alarms, security lighting, security guard patrols or closed-circuit television cameras, to make it likely that attacks will be noticed; and security response, to repel, catches or frustrates attackers when an attack is detected.

In a well-designed system, these features must complement each other. There are at least four layers of physical security: Environmental design; Mechanical, electronic and procedural access control; Intrusion detection (with appropriate response procedures); Personnel Identification (authentication)

There may be many choices to consider and there is no "best" solution that will satisfy a broad class of situations. Each situation is unique. What is offered in this article are only proven techniques, but not always required or expected, or satisfactory for the end user.

Deterrence: The goal of physical security is to convince potential attackers that the likely costs of attack exceeds the value of making the attack, e.g. that consequences of a failed attack may well exceed the gain. The combination of layered security features establishes the presence of territoriality.

The initial layer of security for a campus, building, office, or other physical space uses crime prevention through environmental design to deter threats. Some of the most common examples are also the most basic—warning signs, fences, vehicle barriers, vehicle height-restrictors, restricted access points, site lighting and trenches. However, even passive things like hedgerows may be sufficient in some circumstances.

Access control: The next layer is mechanical and includes gates, doors, and locks. Key control of the locks becomes a problem with large user populations and any user turnover. Keys quickly become unmanageable, often forcing the adoption of electronic access control. Electronic access control easily manages large user populations, controlling for user lifecycles times, dates, and individual access points.

For example a user's access rights could allow access from 0700h to 1900h Monday through Friday and expires in 90 days. Another form of access control (procedural) includes the use of policies, processes and procedures to manage the ingress into the restricted area. An example of this is the deployment of security personnel conducting checks for authorized entry at predetermined points of entry. This form of access control is usually supplemented by the earlier forms of access control (i.e. mechanical and electronic access control), or simple devices such as physical passes.

An additional sub-layer of mechanical/electronic access control protection is reached by integrating a key management system to manage the possession and usage of mechanical keys to locks or property within a building or campus.

Detection: The third layer is intrusion detection systems or alarms. Intrusion detection monitors for unauthorized access. It is less a preventative measure and more of a response trigger, although some[who?] would argue that it is a deterrent. Intrusion detection has a high incidence of false alarms. In many jurisdictions, law enforcement will not respond to alarms from intrusion detection systems.[citation needed] For example, a motion sensor near a door could trigger on either a person or a squirrel. The sensor itself does not do identification and as far as it is designed, anything moving near that door is unauthorized.

Identification: The last layer is video monitoring systems. Security cameras can be a deterrent[citation needed] in many cases, but their real power comes from incident verification [5] and historical analysis. [6] For example, if alarms are being generated and there is a camera in place, the camera could be viewed to verify the alarms. In instances when an attack has already occurred and a camera is in place at the point of attack, the recorded video can be reviewed. Although the term closed-circuit television (CCTV) is common, it is quickly becoming outdated as more video systems lose the closed circuit for signal transmission and are instead transmitting on computer networks.

Advances in information technology are transforming video monitoring into video analysis. For instance, once an image is digitized it can become data that sophisticated algorithms can act upon. As the speed and accuracy of automated analysis increases, the video system could move from a monitoring system to an intrusion detection system or access control system. It is not a stretch to imagine a video camera inputting data to a processor that outputs to a door lock. Instead of using some kind of key, whether mechanical or electrical, a person's visage is the key. When actual design and implementation is considered, there are numerous types of security cameras that can be used for many different applications. One must analyze their needs and choose accordingly.

Note that video monitoring does not necessarily guarantee that a human response is made to an intrusion. A human must be monitoring the situation real-time in order to respond in a timely manner. Otherwise, video monitoring is simply a means to gather evidence to be analyzed at a later time—perhaps too late in some cases Alarm devices include: burglar alarms, designed to warn of burglaries; this is often a silent alarm: the police or guards are warned without indication to the burglar, which increases the chances of catching him or her; alarm clocks can produce an alarm at a given time; distributed control manufacturing systems or DCSs, found in nuclear power plants, refineries and chemical facilities also generate alarms to direct the operator's attention to an important event that he or she needs to address; alarms in an operation and maintenance (O&M) monitoring system, which informs the bad working state of (a particular part of) the system under monitoring. first-out alarm; safety alarms, which go off if a dangerous condition occurs. Common public safety alarms include: tornado sirens; fire alarms "Multiple-alarm fire", a locally-specific measure of the severity of a fire and the fire-department reaction required; car alarms; community Alarm or autodialed alarm (medical alarms); air raid sirens; personal alarm; and/or tocsins—a historical method of raising an alarm.

Alarms have the capability of causing a fight-or-flight response in humans; a person under this mindset will panic and either flee the perceived danger or attempt to eliminate it, often ignoring rational thought in either case. We can characterize a person in such a state as "alarmed".

With any kind of alarm, the need exists to balance between on the one hand the danger of false alarms (called "false positives")—the signal going off in the absence of a problem—and on the other hand failing to signal an actual problem (called a "false negative"). False alarms can waste resources expensively and can even be dangerous. For example, false alarms of a fire can waste firefighter manpower, making them unavailable for a real fire, and risk injury to firefighters and others as the fire engines race to the alleged fire's location or position. In addition, false alarms may acclimatize people to ignore alarm signals, and thus possibly to ignore an actual emergency: Aesop's fable of The Boy Who Cried Wolf exemplifies this problem SCHOOL-EDUCATIONAL INSTITUTION SECURITY: To curtail violence, some schools, including any school, such as primary, preschool, kindergarten, day care, secondary, colleges and universities, vocational schools and the like, have added CCTV surveillance cameras. This is especially common in schools with excessive gang activity or violence. The safety of staff and students is increasingly becoming an issue for school communities, an issue most schools are addressing through improved security. Many school administrators in the United States have created plans to protect students and staff in the event of a school shooting. Some have also taken measures such as installing metal detectors or video surveillance. Others have even taken measures such as having the children swipe identification cards as they board the school bus. For some schools, these plans have included the use of door numbering to aid public safety response. Other security concerns faced by schools include bomb threats, gangs, vandalism, and bullying.

INFRASTRUCTURE SECURITY: Infrastructure security is the security provided to protect infrastructure, especially critical infrastructure, such as airports, highways rail transport, hospitals, bridges, transport hubs, network communications, media, the electricity grid, dams, power plants, seaports, oil refineries, and water systems. Infrastructure security seeks to limit vulnerability of these structures and systems to sabotage, terrorism, and contamination. Critical infrastructures naturally utilize information technology as this capability has become more and more available. As a result they have become highly interconnected, and interdependent. Intrusions and disruptions in one infrastructure might provoke unexpected failures to others. How to handle interdependencies becomes an important problem.

Security challenges for the electricity infrastructure: One of the fundamental foundations of modern society is the electrical power systems. An intentional disruption of electricity supplies would affect national security, the economy, and every person's life. Because power grids and their sources are widely dispersed, this is a challenge for the effectiveness of defensive organizations and structures. Sabotage can damage electrical sources for the power grid, including civilian nuclear power stations. Sabotage in the form of cyber-attacks can create havoc with computer, communication, and information systems, which could severely interrupt the electrical supply. This in turn can cause major disruptions to other infrastructure components of society. Comprehensive defense plans are proposed. One method is to isolate load systems. Sophisticated defense systems should be wide-area, real-time protection, with control systems that are alerted and guided by sensing technologies. Communication and information must be capably routed.

Remedies: Many countries have initiated government agencies to directly manage the security of critical infrastructure usually through the Ministry of Interior/Home Affairs, dedicated security agencies to protect facilities such as United States Federal Protective Service and also creation of dedicated transport police such as the British Transport Police. There are also commercial transportation security units such as the Amtrak Police in the United States.

A number of government organizations has focus on infrastructure security and protection. The Technical Support Working Group has the Infrastructure Protection Subgroup. The UK has the National Infrastructure Security Co-ordination Centre.

Several infrastructures also utilize fiber optic perimeter intrusion detection security systems, which enables the detection and location or position of intrusions over many miles of deployed fiber. This is commonly utilized at water utility sites and at other critical infrastructure sites globally.

Non-Limiting Representative Embodiment 1

A configuration of a location or position system which is a first embodiment of the present application is shown in FIG. 1.

First, companies setting up, implementing, and/or using this mobile device ID, time and location or position system and/or method, and an information system owned or leased by each related company are described.

An area owner 100 owns or leases a determined area which is uniquely designated by a "large area location or position ID". This determined area refers to an area having an extent. Specific examples include a building or rooms or floors of a building, a vehicle, a store or retail outlet in a retail or shopping center, and the like. In the determined area, one or a plurality of ID and/or time information scanners, such as an ID and/or time information scanner 200 transmitting an ID and location or position identifier 101, are installed.

An application service user 110 is a service user who carries a mobile communication terminal provided with a location or position function 300, represented by a mobile phone, and visits the determined area and uses a location or position based service (LBS) mounted on the mobile communication terminal provided with a location or position function 300 in this area. The mobile communication terminal provided with a location or position function 300 receives an ID and/or location or position identifier 101 transmitted by the ID and/or time information scanner 200, and performs the client side process of the LBS which is an application service utilizing the received ID and/or location or position identifier. Moreover, the mobile communication terminal 300 transmits and receives a wireless communication packet to and from a mobile communication server 400 in performing the LBS.

The mobile communication carrier 120 is a company which owns and operates a mobile communication system comprising a mobile communication terminal represented by a mobile phone and a wireless communication base station. The mobile communication carrier 120 owns the mobile communication server 400. The mobile communication server 400 transmits and receives a wireless communication packet to and from the mobile communication terminal 300. Furthermore, the mobile communication server 400 includes a network interface with a backbone network, processes the transmitted and received wireless communication packet and transmits and receives data to and from the backbone network.

The application service company 130 is a service company, which makes a contract with the mobile communication carrier 120 and provides the LBS utilizing an ID and location or position identifier to the application service user 110. The application service company 130 owns an application server 500 for performing the LBS. The application server 500 includes a network interface with the backbone network, and transmits and receives data to and from the backbone network.

A location or position infrastructure company 140 is a service company, which provides the installation and maintenance of the ID and/or time information scanner 200, the issuance and operation management of the ID and/or location or position identifier itself, and a decoding service of the ID and/or location or position identifier provided by a mobile device ID scanner. The location or position infrastructure company 140 owns a transmitter activation terminal 600 and a ID-time-location or position management server 700. The transmitter activation terminal 600 includes a wired or wireless communication interface between the transmitter activation terminal 600 and the ID and/or time information scanner 200, and activates the ID and/or time information scanner 200. Furthermore, the transmitter activation terminal 600 includes a network interface with the backbone network, and transmits the result information of the activation process to the ID-time-location or position management server 700 and registers the same. The ID-time-location or position management server 700 includes a network interface with the backbone network, and transmits and receives data to and from the activation terminal 600, the mobile communication server 400, and the application server 500. The ID-time-location or position management server 700 receives a location or position request via the backbone network, decodes the received ID and/or location or position identifier, and returns a response as location or position, time record and mobile device identification number information.

Now the description of the companies constituting the first embodiment of the present location or position system and the information system owned or leased by each company is completed.

Next, the installation work and operation work of the present location or position system will be described in detail in accordance with one or more of the following work segments.

a. Design and initialization work of the installation place of an ID and/or time information scanner;

b. Activation and installation work of an ID and/or time information scanner;

c. Registration work of an installed ID and/or time information scanner;

d. ID-time-location or position concealing and ID and/or location or position identifier transmitting work;

e. ID and/or location or position identifier reception and LBS work;

f. ID and/or location or position identifier decoding work; and/or g. Charge work of an ID and/or location or position identifier decoding process.

Note that, in the followings, for ease of description, an example of a single ID and/or time information scanner to be installed in a determined area will be mainly described. However, it is apparent that also when one or a plurality of ID and/or time information scanners are installed, the same process may be repeated with respect to the individual ID and/or time information scanner. The notation used in the description of the present invention is described.

In the embodiments of the present invention, a notation of "$(element data variable name)" is used in representing an internal variable used in a program or an element data of an information table. Moreover, a notation of "$$(structure variable name $(element data variable name 1), $(element data variable name 2), $(element data variable name 3), . . . )" is used in representing a structural format of internal variable comprising a combination of one or a plurality of element data, or structure data of an information table. Moreover, the "identifier" may be abbreviated as "ID".

(1) Design and Initialization Work of the Installation Place of an ID and/or Time Information Scanner The "design and initialization work of the installation place of an ID and/or time information scanner" which is the first main work will be described using FIG. 1, FIG. 2, FIG. 18, and FIG. 20. In this work, information on the installation place of an ID and/or time information scanner is registered in the ID-time-location or position management server. Furthermore, in this work, the registered information is downloaded to the transmitter activation terminal 600 to prepare for "the activation and installation work of an ID and/or time information scanner" described later.

First, a method for specifying a location or position mobile device ID (also termed a "location or position ID") in the present invention is described with reference to FIG. 20 (1). In the following, specifically, Company A, which owns or leases a hypothetical building, is described as an example. First, assuming that Company A Building is a determined area in which the above-described ID and/or time information scanner is installed, "10000" is assigned to a large area location or position ID 222. The large area location or position ID may be in any expression form as long as it is an information code capable of uniquely specifying a location or position in the national level. For example, a character string of the above-described address indicative of the location or position may be used. The area owner 100 is Company B. Furthermore, assume that one ID and/or time information scanner is installed at two places in Company A Building, respectively. Assume that Company A Building is occupied by an office or retail or supply outlet of Company B and An office or retail or supply outlet of Company C. As the first installation place, "the entrance of Company C." in the first floor on the east side of the building is selected, and is assigned with a local location or position ID "0001". This installation information is represented by a record 3003 of the location or position ID management table (820) of FIG. 20 (1). In the "location or position, time record and mobile device identification number information" on the record 3003, the longitude, latitude, and altitude of an installation place which are the decoding results of the ID and/or location or position identifier are given. As the second installation place, "the entrance of Company B" in the first floor on the south side of the building is selected, and is assigned with a local location or position ID "0002". This installation information is represented by a record 3004 of the location or position ID management table (820) of FIG. 18 (1).

As described above, the present invention is characterized by, as the method for specifying the ID number representing any location or position which is the installation place of an ID and/or time information scanner, a combination of a large area location or position mobile device ID (also termed a "location or position ID") representing the location or position, such as the location or position of a building itself, of a level where location or position is possible by GPS and/or LBS, and a local location or position ID representing a location or position, such as a location or position inside the building, of a level where location or position by GPS is difficult. Here, note that the terms "large area location or position ID" and "local location or position ID" are just the terms indicative of a relative relationship from the physical point of view. As described above, the large area location or position ID is an identifier for describing an area having a determined range of extent while the local location or position ID is an identifier for describing one point not having an extent inside this area. That is, it is possible to specify one or a plurality of local location or position ID's in an area assigned with a certain large area location or position ID, and the terms "large area" and "local area" come from this physical magnitude relationship. Now the description of the method for specifying the large area location or position ID and local location or position ID representing the installation place of an ID and/or time information scanner is completed.

Next, a preprocessing which should be carried out prior to the activation and installation work of an ID and/or time information scanner is described.

Figure 2:
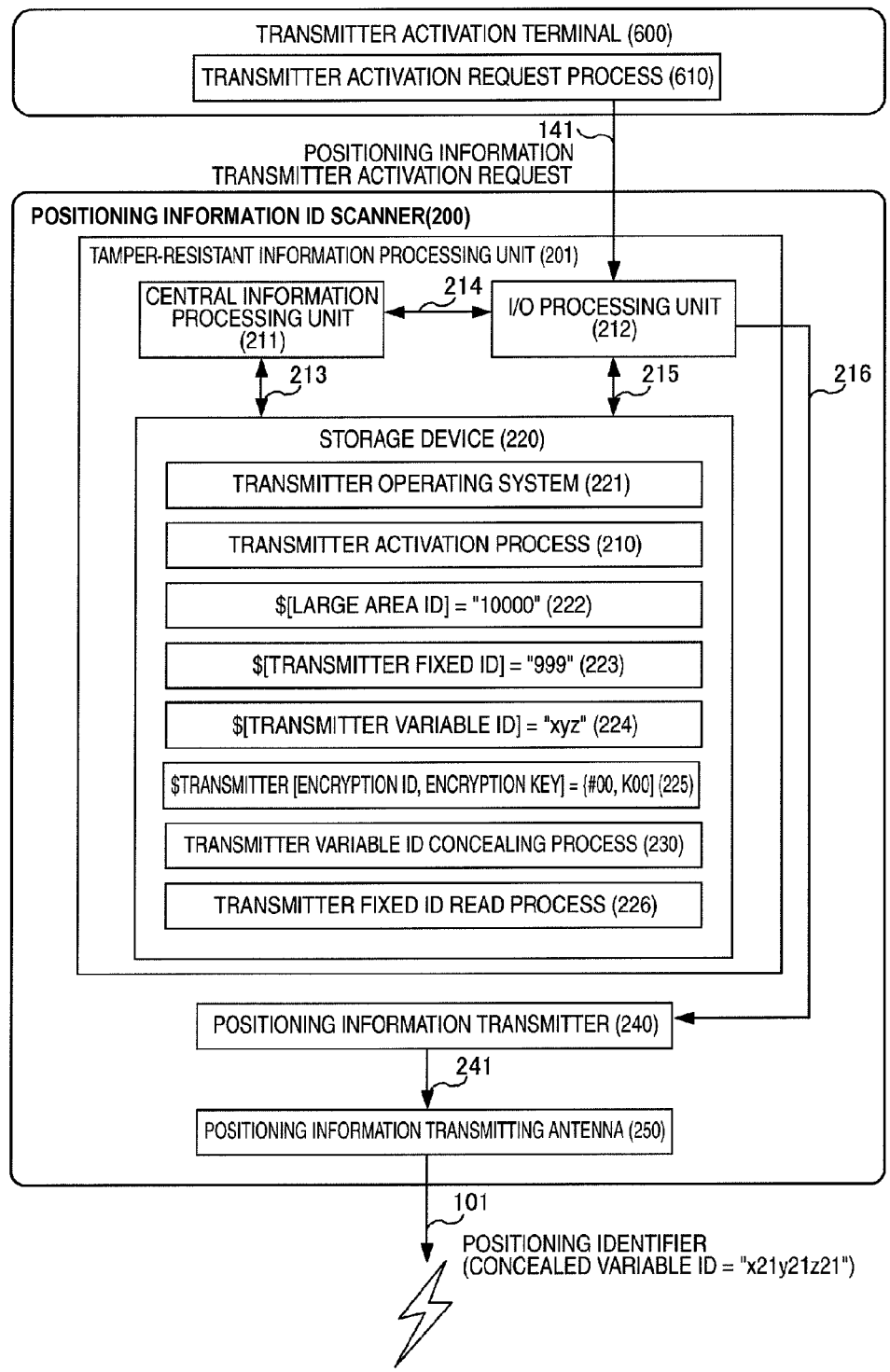
FIG. 2 is a view showing a configuration of a mobile ID-location or position-time information scanner (200).

(Pre-Processing 1) Initialization Process of a Transmitter Fixed ID of an ID and/or Time Information Scanner As shown in FIG. 1 and FIG. 2, with regard to the ID and/or time information scanner 200, a transmitter fixed ID 223 within a storage device 220 is initialized in advance. Specifically, in the description of this embodiment, the transmitter fixed ID 223 is set to "999" in advance. The transmitter fixed ID 223 can be read from the outside of the ID and/or time information scanner through a command interface for starting a transmitter fixed ID read process (226 in FIG. 2). However, this transmitter fixed ID read command can be provided through a physical communication interface which is different from that of an ID and/or location or position identifier transmitter 240 to be described later. As described later, this is because the present invention is characterized in that for the purpose of retaining security, the ID and/or time information scanner will not extensively transmit the fixed ID.

Figure 18:
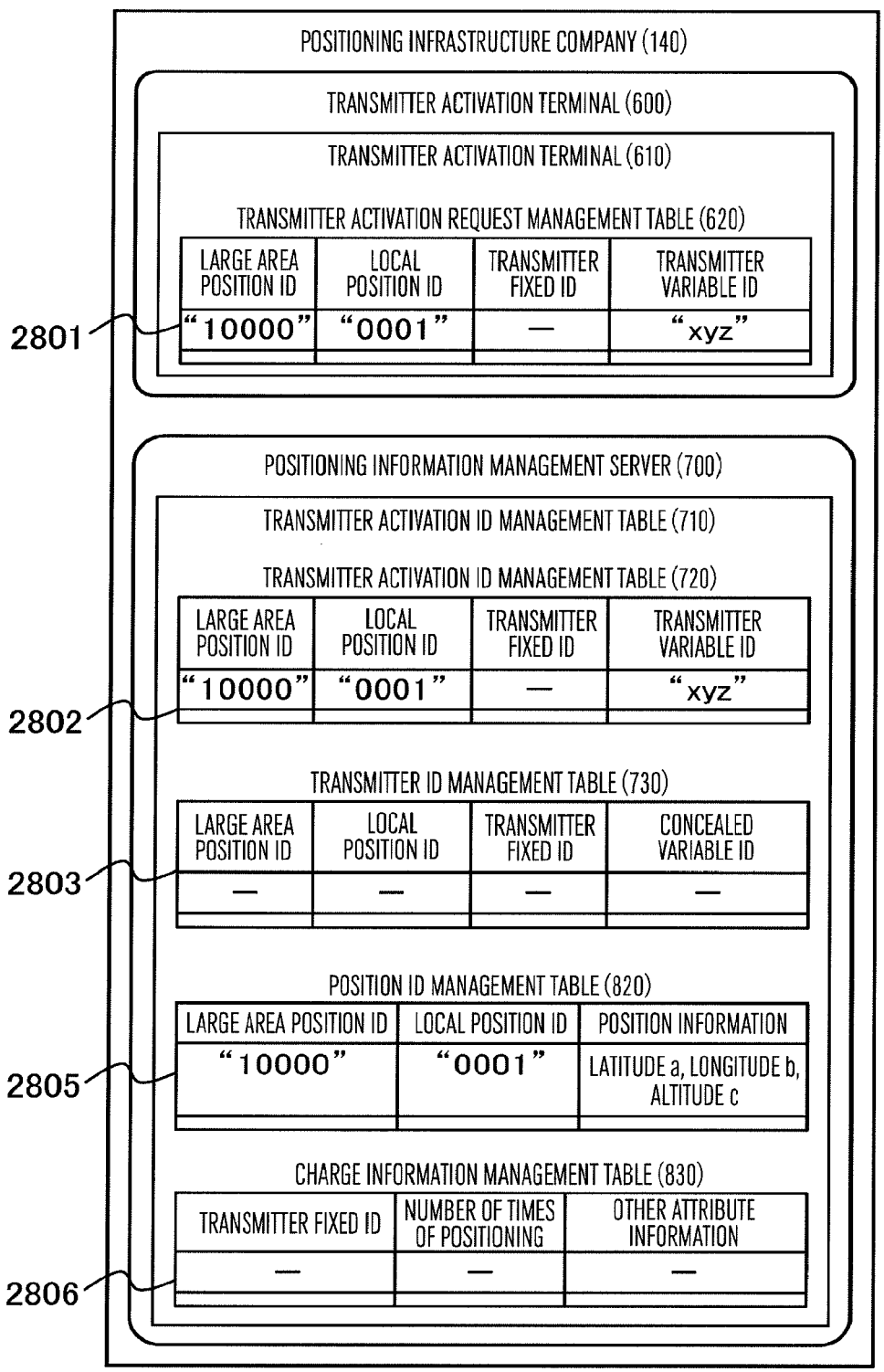
FIG. 18 is a view showing a content of a preprocessing of a transmitter activation work.

(Pre-Processing 2) Initialization Process of the Location or Position Mobile Device ID Management Table As shown in FIG. 18, with regard to the ID-time-location or position management server 700, the location or position mobile device ID (also termed herein a "location or position ID") management table 820 is initialized in advance. Specifically, in the description of this embodiment, a record 821 is stored into the location or position ID management table 820 in advance, and also the large area location or position ID(="10000"), the local location or position ID(="0001"), and the location or position, time record and mobile device identification number information(="latitude a, longitude b, an altitude c") are set for element data constituting the record. As described in the above description of the location or position ID, the record 821 is a record for storing the information about the installation location or position of an ID and/or time information scanner, which means that "the location or position designated by the latitude, longitude, and altitude which are the location or position, time record and mobile device identification number information is designated as the installation location or position of an ID and/or time information scanner, and in order to uniquely identify this installation location or position an information pair of the large area location or position ID and the local location or position ID is assigned."

(Pre-Processing 3) Initialization Process of the Transmitter Activation ID Management Table 720

As shown in FIG. 18, with regard to the ID-time-location or position management server 700, the transmitter activation ID management table 720 is initialized in advance. Specifically, in the description of this embodiment, in FIG. 18, a record 2802 is stored into the transmitter activation ID management table 720 in advance, and the large area location or position ID(="10000"), the local location or position ID(="0001"), and the transmitter variable ID(="xyz") are set for element data constituting the record in advance. The record 2802 is a record for storing an initial value of the transmitter variable ID required for activation of the ID and/or time information scanner, which means that "an ID and/or time information scanner is prepared and a transmitter variable ID 224 in the storage device 220 of the ID and/or time information scanner is initialized by the transmitter variable ID of the record 2802, and furthermore, the ID and/or time information scanner is installed at an installation location or position designated by the information pair of the large area location or position ID and the local location or position ID."

(Pre-Processing 4) Initialization Process of the Transmitter Activation Request Management Table 620

As shown in FIG. 18, with regard to the transmitter activation terminal 600, the transmitter activation request management table 620 is initialized in advance. Specifically, in the embodiment of the present invention, in FIG. 18, a record 2801 is stored into the transmitter activation request management table 620 in advance, and the large area location or position ID(="10000"), the local location or position ID(="0001"), and the transmitter variable ID(="xyz") are set for element data constituting the record in advance. The record 2801 is downloaded from the record 2802 of the transmitter activation ID management table in the ID-time-location or position management server 700 and is stored in advance. In the actual installation of an ID and/or time information scanner, one or a plurality of records are stored into the transmitter activation request management table 620 in advance, an installation technician selects a record corresponding to the installation place, and proceeds with the installation work through a procedure of using the stored information of this record and activating the ID and/or time information scanner.

In the above description, note that the "transmitter fixed ID" of the record 2801 of the transmitter activation request management table 620 and the "transmitter fixed ID" of the record 2802 of the transmitter activation ID management table 720 are not set yet. This is because the value of the "transmitter fixed ID" cannot be obtained until the ID and/or time information scanner installed at the actual installation place is selected and activated in "(2) activation and installation work of an ID and/or time information scanner" to be described later. Now the description of "(1) design and initialization work of the installation place of an ID and/or time information scanner" is completed.

(2) Activation and Installation Work of an ID and/or Time Information Scanner

"(2) Activation and installation work of an ID and/or time information scanner" which is the second main work is described using FIG. 1, FIG. 2, FIG. 6, FIG. 8, and FIG. 20. In this work, the transmitter activation process 610 in the transmitter activation terminal 600 is started to activate the ID and/or time information scanner 200, and the activated ID and/or time information scanner 200 is installed at a determined installation location or position. The information about the activated and installed ID and/or time information scanner 200 is stored into the transmitter activation terminal 600, and is registered in the ID-time-location or position management server 700 through the "registration work of an installed ID and/or time information scanner" to be described later.

The sequence of the description of this work is shown below. First, the ID and/or time information scanner 200 on the activated side is described. Specifically, the configuration of the ID and/or time information scanner 200 is described with reference to FIG. 1 and FIG. 2, and then a process flow of the transmitter activation process (210 in FIG. 2) is described mainly with reference to FIG. 8 while referring to FIG. 1 and FIG. 2 as required. Next, the ID and/or time information scanner activation terminal 600 on the activating side is described. Specifically, the process flow of the transmitter activation request process 610 is described mainly with reference to FIG. 6 while referring to FIG. 1 and FIG. 2 as required.

First, the ID and/or time information scanner 200 which is a device on the activated side is described. First, the configuration of the ID and/or time information scanner 200 is described. The ID and/or time information scanner 200 comprises a tamper-resistant information processing unit (tamper-resistant micro computer chip) 201, an ID and/or time information scanner 240, and a ID-time-location or position transmitting antenna 250. As with an ordinary computer, the tamper-resistant information processing unit comprises a central information processing unit 211, an I/O device 212, and a storage device 220, and includes the same function as an ordinary computer. In the storage device 220, as with an ordinary computer, a transmitter operating system 221 is stored in advance. Other than this, a transmitter fixed ID read process 226, a transmitter activation process 210, and a transmitter variable ID concealing process 230 which are processing programs specific to the ID and/or time information scanner 200 are stored in the storage device 220 in advance. Furthermore, the large area location or position ID 222, the transmitter fixed ID 223, the transmitter variable ID 224, and a transmitter (encryption key ID, encryption key) 225, which are the fields for storing the ID information of the ID and/or time information scanner, are reserved in the storage device.

Next, the process and areas relevant to the activation work of the ID and/or time information scanner 200 are described. The transmitter fixed ID read process 226 is started by a command request (not illustrated) sent from the outside via the I/O device 212. In the transmitter fixed ID read process 226, the value of the transmitter fixed ID 223 in the storage device 220 is read and the read value is returned as the command response. Next, the transmitter activation process 210 is started by an ID and/or time information scanner activation request 141 which is a command request sent from the outside via the I/O device 212. In the transmitter activation process 210, the value of a command argument is stored into each field of the large area location or position ID 222, transmitter variable ID 224, and transmitter (encryption key ID, encryption key) 225 within the storage device 220 to carry out the activation process. Now the description of the configuration of the ID and/or time information scanner 200 is completed.

Figure 8:
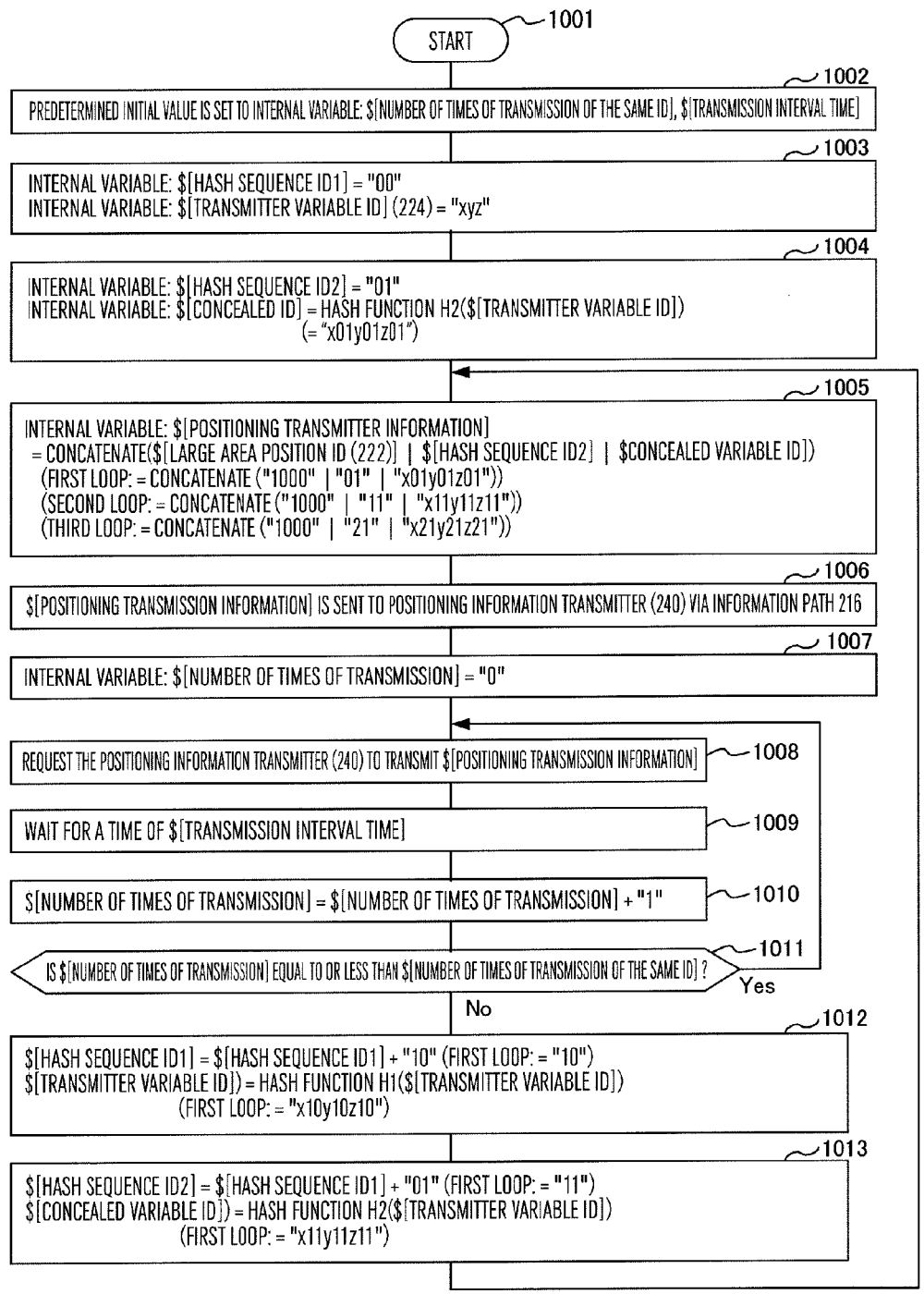
FIG. 8 is a view showing a process flow of an embodiment of a variable ID concealing process (230).

Next, the process flow of the transmitter activation process (210 in FIG. 2) is described mainly with reference to FIG. 8 while referring to FIG. 1 and FIG. 2 as required. In the ID and/or time information scanner 200, the transmitter operating system 221 receives the ID and/or time information scanner activation request 141 and starts the process by dispatching a command to the transmitter activation process 210 (Step 881). First, it is determined whether or not the ID and/or time information scanner activation request 141 has been received (Step 882). If the answer is "Yes", then it is determined whether or not the command argument $(transmitter fixed ID)(="999") of the received transmitter activation request 141 is equal to the transmitter fixed ID 223 (="999") stored in the storage device 220 of the ID and/or time information scanner 200 (Step 883). This step is the verification process for determining whether or not the received transmitter activation request 141 is an activation request corresponding to the transmitter fixed ID read by the above-described "transmitter fixed ID read command". This ensures the continuity of the "transmitter fixed ID read command" and the "transmitter activation command". Moreover, in this embodiment, the fixed ID, which is stored in the ID and/or time information scanner through the preprocessing, is read in plain texts, and an activation request, which is included in the plain texts with the fixed ID as an argument, is generated, thereby assuring the continuity of the above-described two commands. However, in order to further increase the security of the activation process, a mechanism can be employed, in which the ID and/or time information scanner 200 stores an activating encryption key in place of the fixed ID and the transmitter activation terminal authenticates this activating encryption key.

Now, return to the description of the process flow of the transmitter activation process 210 shown in FIG. 8. Upon verification of the validity of the activation request command, the flow moves to the step of performing the main body portion of the activation process. First, the command argument $(large area location or position ID)(="10000") of the transmitter activation request 141 is stored into $(large area location or position ID) 222 in the storage device 220 of the ID and/or time information scanner 200 (Step 884). Next, the command argument $(transmitter variable ID)(="xyz") of the transmitter activation request 141 is stored into $(transmitter variable ID) 224 in the storage device 220 of the ID and/or time information scanner 200 (Step 885). Finally, the command argument $(transmitter (encryption key ID, encryption key))(="(#00, K00)") of the transmitter activation request 141 is stored into $(transmitter (encryption key ID, encryption key)) 225 in the storage device 220 of the ID and/or time information scanner 200 (Step 886). AN ID and/or time information scanner activation response is transmitted to the transmitter activation terminal 600 to notify the completion of the activation (Step 887). The setting of the activation information of the ID and/or time information scanner 200 is now completed (Step 888). The state of the ID and/or time information scanner after completing the transmitter activation process as described above is shown in the storage device 220 of FIG. 1 and FIG. 2. Each ID value set in the views will be used in the transmitter variable ID concealing process 230 described later. Now the description of the process flow of the transmitter activation process 210 shown in FIG. 8 is completed. Furthermore, now the description of the ID and/or time information scanner 200 on the activated side is completed.

Next, the ID and/or time information scanner activation terminal 600 which is a device on the activating side is described. Specifically, the process flow of the transmitter activation request process 610 is described mainly with reference to FIG. 6 while referring to FIG. 1, FIG. 2, and FIG. 20 as required.

Prior to describing the transmitter activation process flow, assume that the ID and/or time information scanner is to be installed at a planned installation place (large area location or position ID(="10000"), local location or position ID(="0001")). A worker in charge of the activation and installation of the ID and/or time information scanner prepares the initialized transmitter activation terminal 600 and ID and/or time information scanner 200 as described above. The transmitter activation request process 610 in the transmitter activation terminal 600 is started (Step 651 in FIG. 6). First, the transmitter activation request management table 620 is searched with $(large area location or position ID) (="10000") and $(local location or position ID)(="0001") assigned to "the entrance of Company C. on the first floor of Company A Building" (3003 in FIG. 20), which is the planned installation place of the ID and/or time information scanner, as a key. A record 621 having the same $(large area location or position ID) and $(local location or position ID) as those of the search key is obtained as a search result (Step 652). Hereinafter, in order to proceed with the creation of an activation command using the information of the record 621, the pointer address of the record 621 is substituted for an internal variable $(record pointer) (Step 653). One ID and/or time information scanner to be installed at the planned installation place is selected out. A transmitter fixed ID read request is transmitted from the transmitter activation terminal 600 to the selected ID and/or time information scanner 200 (Step 654). A transmitter fixed ID read response (="999") returned by the ID and/or time information scanner 200 is stored into a data element $(transmitter fixed ID) of a record indicated by $(record pointer) (Step 655).

As described above, in the present invention, in the stage of designing the planned installation place of an ID and/or time information scanner, the ID and/or time information scanner to be installed in this planned site is not identified in advance. Then, at the installation place, any ID and/or time information scanner 200 is selected out, the fixed ID of this ID and/or time information scanner is read, the activation process request 141 fit for this ID and/or time information scanner is created, and the activation process is performed. According to this method, there is no need to fixedly assign an ID and/or time information scanner to an installation place in advance, and the ID and/or time information scanner arbitrarily selected at an installation place can be activated and installed. On the other hand, there is also a method of activating a specific transmitter intended for a specific installation place in advance. With this method, an error, such as a mix-up of the ID and/or time information scanners, is likely to occur in the activation and installation work. In contrast, in the method of the present invention, because the ID and/or time information scanner is not fixedly assigned to an installation place in advance, an error, such as mixing up of the ID and/or time information scanners, will not occur and furthermore an improvement in the work efficiency is also obtained.

Figure 6:
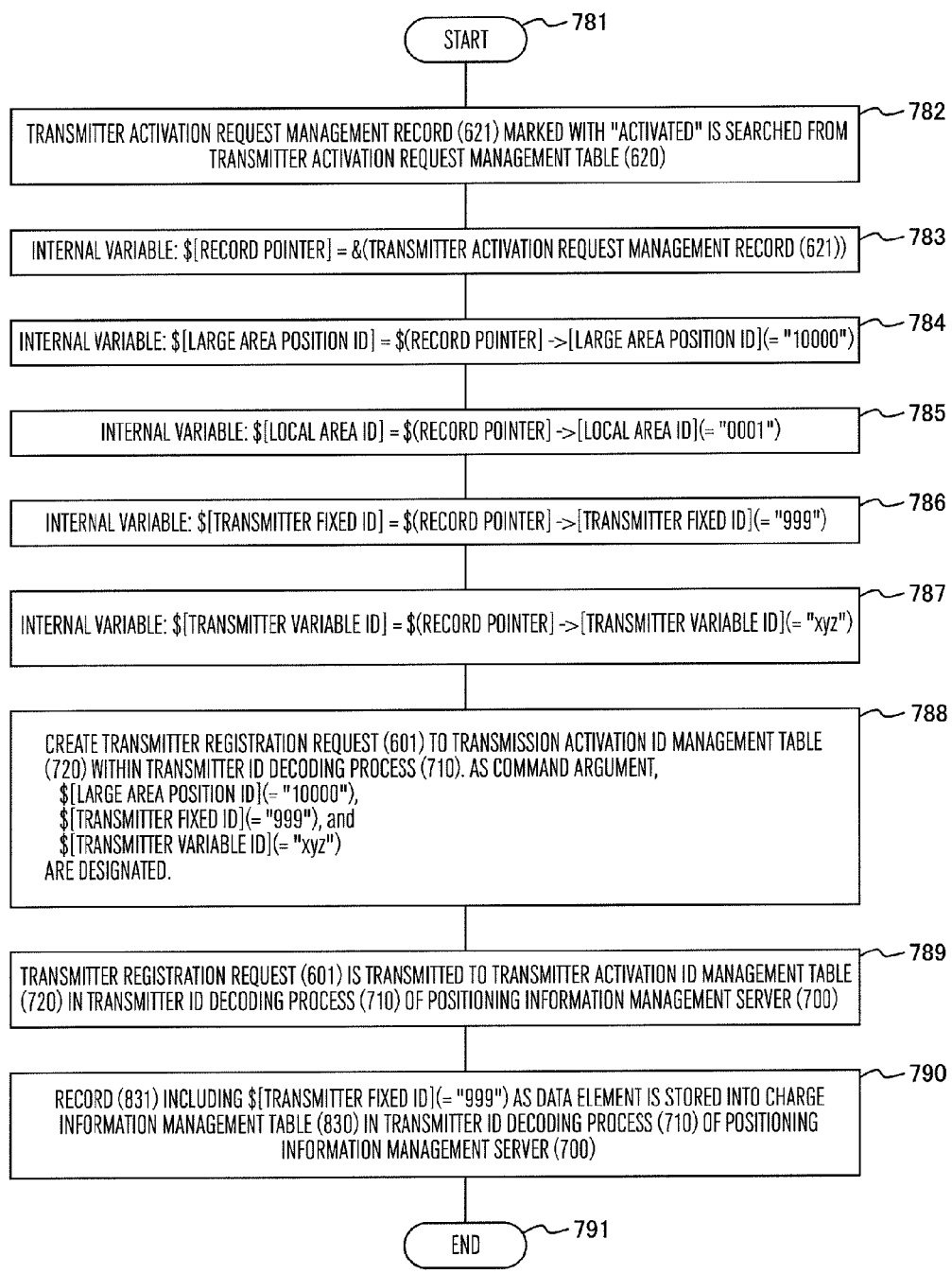
FIG. 6 is a view showing a process flow of a transmitter registration process (630)

Next, return to the description of the process flow 610 of the ID and/or time information scanner activation process shown in FIG. 6. In the following, the preparation of an argument for creating the ID and/or time information scanner activation request is started. First, a value(="10000") of the data element $(large area location or position ID) of a record indicated by $(record pointer) is substituted for the internal variable: $(large area location or position ID) (Step 656). Next, a value(="xyz") of the data element $(transmitter variable ID) of the record indicated by $(record pointer) is substituted for the internal variable: $(transmitter variable ID) (Step 657). The ID and/or time information scanner activation request (141) is created using the data elements prepared in Steps 655 to 657.

As the command argument,
a. $(record pointer)→(transmitter fixed ID)(="999"),
b. $(large area location or position ID)(="10000"), and
c. $(variable ID)(="xyz")
are designated (Step 658). The created ID and/or time information scanner activation request 141 is transmitted to the ID and/or time information scanner 200 (Step 659). Next, the ID and/or time information scanner activation response is received. If the activation is successful, a mark indicative of "activated" is put on a non-illustrated data element $(activation process flag) of the record 621 used in the creation of the activation request, i.e., the record indicated by $(record pointer) (Step 660). Now the activation data is stored into the ID and/or time information scanner 200. Finally, the activated ID and/or time information scanner 200 is installed at the planned installation place of the ID and/or time information scanner (Step 661), and the ID and/or time information scanner activation process is completed (Step 662). Now the description on "(2) activation and installation of an ID and/or time information scanner" is completed.

(3) Registration Work of an Installed ID and/or Time Information Scanner

Figure 20:
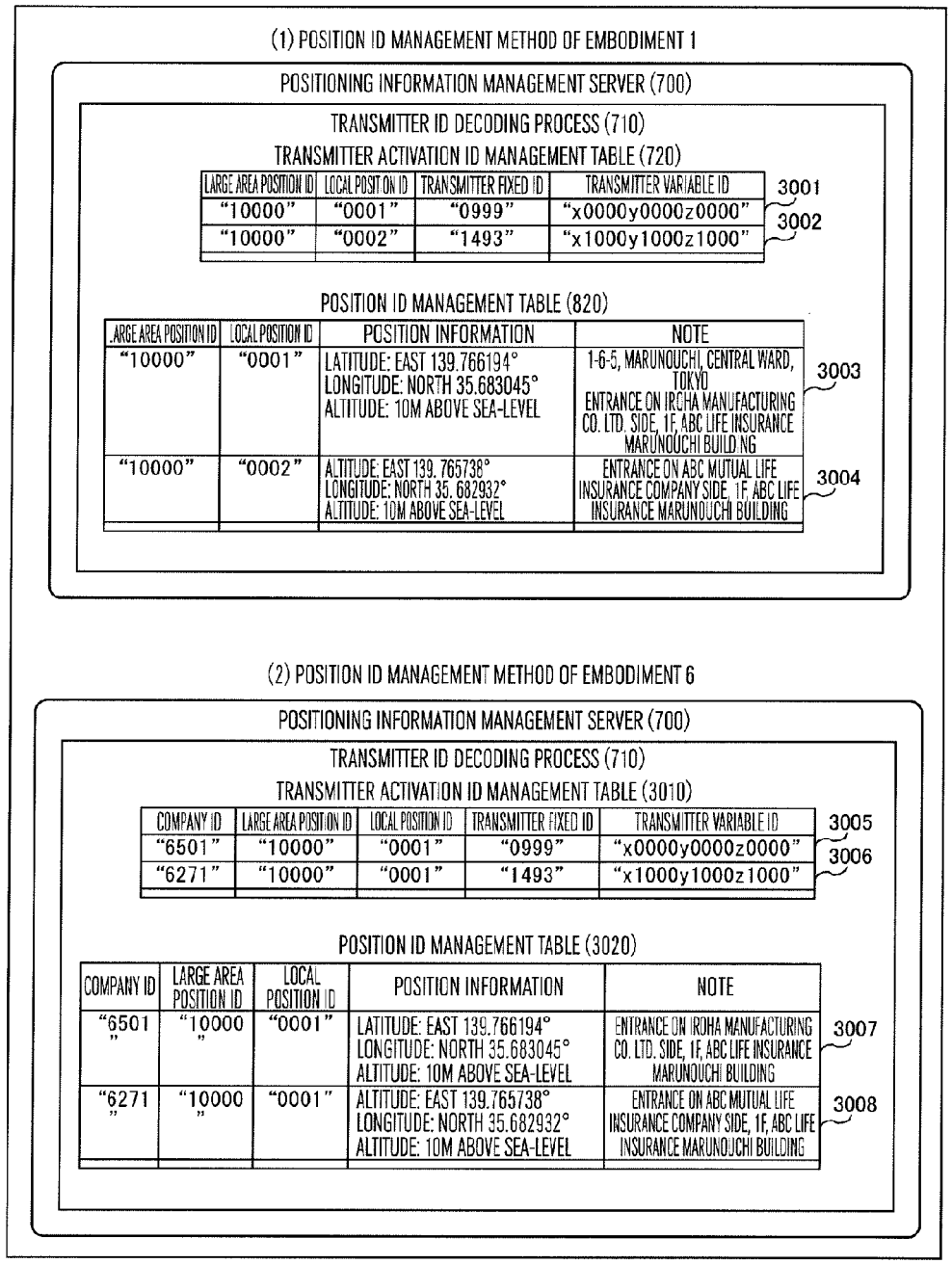
FIG. 20 is a view showing a configuration of a method for managing a location or position ID (also termed herein "location or position ID" for each company.

"(3) Registration work of an installed ID and/or time information scanner" which is the third main work is described using FIG. 1, FIG. 6, and FIG. 20. In this work, a transmitter registration process 630 in the transmitter activation terminal 600 is started, and the information on the activated and installed ID and/or time information scanner 200, which is stored into the transmitter activation terminal 600 as a result of performing the "activation and installation of an ID and/or time information scanner", is registered in the ID-time-location or position management server 700. The registered information is used in the "ID and/or location or position identifier transmission and LBS support work" described later.

A process flow of the transmitter registration process 630 to carry out this work is described mainly with reference to FIG. 6 while referring to FIG. 1 and FIG. 20 as required. The transmitter registration process 630 of the transmitter activation terminal 600 shown in FIG. 1 is started, and the process flow shown in FIG. 6 is started (Step 781). First, a transmitter activation request management record 621 which is marked with "activated" in the transmitter activation process flow 610 of FIG. 6 is searched from the transmitter activation request management table 620 (Step 782). The pointer address of the transmitter activation request management record 621 obtained as the result of this search is stored into the internal variable $(record pointer) (Step 783).

In the following, based on the activation result record which is the search result, the transmitter activation ID management table 720 of the ID-time-location or position management server 700 is searched to find out the original record of this activation result record, and ID information of the installed ID and/or time information scanner is stored therein. First, the data element $(large area location or position ID) (="10000") of the activation result record indicated by $(record pointer) is substituted for the internal variable $(large area location or position ID) (Step 784). Next, the data element $(local location or position ID)(="0001") of the activation result record indicated by $(record pointer)) is substituted for the internal variable $(local location or position ID) (Step 785). Next, the data element $(transmitter fixed ID) (="999") of the activation result record indicated by $(record pointer) is substituted for the internal variable $(transmitter fixed ID) (Step 786). Finally, the data element $(transmitter variable ID)(="xyz") of the activation result record indicated by $(record pointer) is substituted for the internal variable $(transmitter variable ID) (Step 787).

Based on the result information of the ID and/or time information scanner activation process obtained in the above, the transmitter registration request 601 to the transmitter activation ID management table 720 in the transmitter ID decoding process 710 is created. As the command argument, a. $(large area location or position ID)(="10000"),
b. $(transmitter fixed ID)(="999"), and
c. $(transmitter variable ID)(="xyz")

B are designated (Step 788). Finally, the transmitter registration request 601 is transmitted to the transmitter activation ID management table 720 in the transmitter ID decoding process 710 of the ID-time-location or position management server 700 (Step 789). As a result of this command request, the record 721 is registered in the transmitter activation ID management table 720 of FIG. 1. If the record 721 of FIG. 1 is compared with the record 2802 of the transmitter activation ID management table 720 prior to carrying out the transmitter activation work shown in FIG. 18, then $(transmitter fixed ID) is to be determined in the record 2802 while in the record 720, "999" is already stored. The transmitter fixed ID "999" is nothing but $(transmitter fixed ID) 223 stored in the storage device 220 of the ID and/or time information scanner 200 which has been read via the transmitter activation terminal 600 and been set. Now, a value is set to each data element of the transmitter activation ID management table 720, so that the later-described "ID-time-location or position transmission and LBS support work" is possible. Finally, a record 831 including $(transmitter fixed ID)(="999") as the data element is stored into the charge information management table 830 in the transmitter ID decoding process 710 of the ID-time-location or position management server 700 (Step 790).

Now the transmitter registration process 630 is completed (Step 791), and the description of "(3) registration work of an installed ID and/or time information scanner" is completed.

(4) ID-Time-Location or Position Concealing and ID and/or Location or Position Identifier Transmitting Work "(4) ID-time-location or position concealing and ID and/or location or position identifier transmitting work" which is the fourth main work is described using FIG. 1, FIG. 2, FIG. 7, and FIG. 8. In this work, the ID and/or time information scanner 200 transmits ID-time-location or position called the ID and/or location or position identifier 101. The transmitted ID and/or location or position identifier 101 is received by the mobile communication terminal provided with a location or position function 300, and then "(5) ID and/or location or position identifier reception and LBS work" describe later is performed.

This work is described in detail. Specifically, the process flow of the variable ID concealing process (230 in FIG. 1 and FIG. 2) is described mainly with reference to FIG. 8 while referring to FIG. 7 as required. After completing the activation process, the ID and/or time information scanner starts the variable ID concealing process 230 in order to transmit the ID and/or location or position identifier (Step 1001). First, a determined initial value is set to the internal variable $(number of times of transmission of the same ID) and $(transmission interval time), respectively. $(number of times of transmission of the same ID) indicates how many times the ID and/or time information scanner repeatedly transmits an ID and/or location or position identifier with the same content, i.e., the repeat count. Moreover, $(transmission interval time) indicates a time interval in the repetition of the transmission of the ID and/or location or position identifier. Next, an internal variable for storing the transmitter variable ID value is prepared. This variable ID value is generated with two hash functions H 1 and H 2 connected in series. First, as the storage area for a hash value in the first stage, the internal variable $(transmitter variable ID) (918 in FIG. 7) is prepared, and the initial value: $(transmitter variable ID) 224 (="xyz") is set thereto. Furthermore, for the purpose of numbering this hash value, $(hash sequence ID 1) (901) of the internal variable is prepared, and the initial value: "00" (902) is set to $(hash sequence ID 1) (901) (Step 1003). Next, as the storage area for a hash value in the second stage which is generated with the hash value in the first stage as an input, an internal variable $(concealed variable ID) (903) is prepared, and an initial value: hash function H 2 ($(transmitter variable ID)) (="x01y01z01") is stored therein. Furthermore, for the purpose of numbering this hash value, $(hash sequence ID 2) (919) of the internal variable is prepared, and the initial value: "01" is set thereto (Step 1004).

Now that the inputs to the hash functions H 1 and H 2 are determined, hereinafter the flow moves to the step of generating the ID and/or location or position identifier. $(location or position transmission information) (908) of the internal variable is prepared, and a result data obtained by concatenating the following element data using a concatenate function Concatenate is substituted for $(location or position transmission information) (Step 1005). Concatenate($(large area location or position ID) (222)|$(hash sequence ID 2)|$(concealed variable ID))

Specifically, in the first loop, Concatenate ("1000"|"01"|"x01y01z01") is substituted. The generated $(location or position transmission information) (908) is sent to the ID and/or time information scanner 240 via an information path 216 (Step 1006).

Hereinafter, the flow moves to the actual ID-time-location or position transmission process. First, $(number of times of transmission) of the internal variable is reserved, and the initial value "0" is stored therein (Step 1007). Next, transmission of $(location or position transmission information) is requested to the ID and/or time information scanner 240 (Step 1008). Once this step is performed, an ID and/or location or position identifier is transmitted (101). After the transmission, the system waits for a time of $(transmission interval time) (Step 1009). $(number of times of transmission) is incremented by "1" (Step 1010). It is determined whether or not $(number of times of transmission) has reached $(number of times of transmission of the same ID) (Step 1011). If not reached yet, the flow returns to Step 1008, where the transmission of the same $(location or position transmission information) is repeated. If it has reached the specified number of times of transmission, the flow proceeds to Step 1012.

In Step 1012, $(location or position transmission information) is updated for the next ID and/or location or position identifier transmission. First, the hash value in the first stage is updated. Specifically, a hash value: the hash function H 1 ($(transmitter variable ID)) 919 (="x10y10z10") is substituted for $(transmitter variable ID) (918 in FIG. 7). Furthermore, an update value: $(hash sequence ID 1)+"10"(="10") (904) is set to $(hash sequence ID 1) (901) which is the numbering of this hash value (Step 1012). Next, as the hash value in the second stage which is generated with the hash value in the first stage as an input, the hash function H 2 ($(transmitter variable ID))(="x11y11z11") is stored into $(concealed variable ID) (905). Furthermore, an update value: $(hash sequence ID 1)+"01"(="11") (905) is set to $(hash sequence ID 2) (919) which is the numbering of this hash value (Step 1013). Now that the new concealed variable ID(="x11y11z11") and the hash sequence ID 2 (="11") are generated, the flow returns to Step 1005 to update $(location or position transmission information). Specifically, in the second loop, Concatenate("1000"|"11"|"x11y11z11") is generated as the concatenate function output, and is substituted for $(location or position transmission information) (908 in FIG. 7). Similarly, in the third loop, Concatenate ("1000"|"21"|"x21y21z21") is generated as the concatenate function output, and is substituted for $(location or position transmission information) (908 in FIG. 7).

As described above, in this process, a routine is repeated in which the same location or position transmission information is repeatedly transmitted a certain number of times and thereafter the location or position transmission information is updated and the updated location or position transmission information is repeatedly transmitted. This update process follows a determined secret procedure, so that for an outside party the location or position transmission information is the concealed information which varies with time. Now the description of the variable ID concealing process 230 performed by the ID and/or time information scanner 200 is completed. Moreover, "(4) ID-time-location or position concealing and ID and/or location or position identifier transmitting work" is completed.

(5) ID and/or Location or Position Identifier Reception and LBS Work

"(5) ID and/or location or position identifier reception and LBS work" which is the fifth main work is described using FIG. 1, FIG. 3, FIG. 4, FIG. 5, FIG. 7, FIG. 9, FIG. 10, FIG. 11, FIG. 12, and FIG. 13. This work extends over one or a plurality of system modules and is lengthy and complicated. Then, sub-works constituting this work and the works relevant to this work are enumerated with reference to FIG. 1, and while following this flow, this work is described in the units of sub-work.

Sub-Work Segments and its Sequence

First, the mobile communication terminal provided with a location or position function 300 executes a client program of a ID-time-location or position service which is an application service.

The mobile communication terminal 300 receives an ID and/or location or position identifier transmitted by the ID and/or time information scanner 200.

Next, the mobile communication terminal 300 transmits a mobile terminal location or position request 112, which is a request to decode the received ID and/or location or position identifier 101, to the ID-time-location or position management server 700. The request 112 is converted into a carrier location or position request 122 via the mobile communication server 400, and is transmitted to the ID-time-location or position management server 700.

Furthermore, a mobile communication terminal application service request 111, which is a request from the client side of the ID-time-location or position service, is converted into a carrier application service request 121 via the mobile communication server 400, and is transmitted to the application server 500.

Then, the carrier location or position request 122 is subjected to a decoding process by the ID-time-location or position management server 700, is converted into location or position, time record and mobile device identification number information 821, and is sent to an application service server 500 as a location or position server location or position response 142. In addition, because this sub-work is the same as the above-described main work (6), the detail will not be described in the description of this sub-work. Instead, the detail is described in the main work (6).

The application service server 500 receives the carrier application service request 121 and location or position server location or position response 142 described above, performs the server side process of the location or position, time record and mobile device identification number information service, and transmits the executed result to the network as an application server application service response 131.

Finally the service response 131 is transmitted to the mobile communication terminal 300 as the carrier application service response via the mobile communication server 400.

Now the brief description of the sub-work is completed. In the following, each sub-work of the above (1) to (5), and (7) will be described in detail. The sub-work (6) will be described later.

Figure 3:
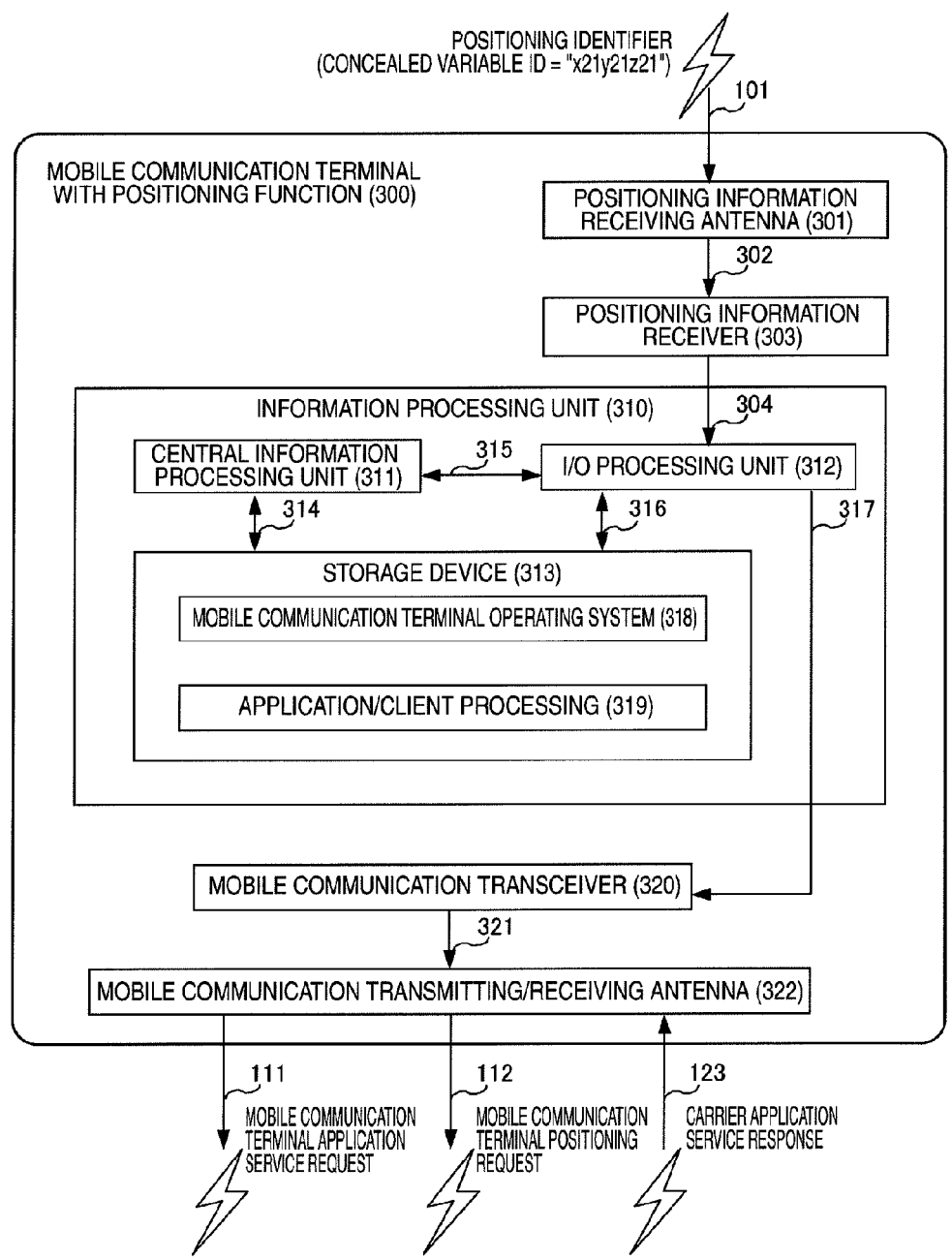
FIG. 3 is a view showing a configuration of a mobile communication terminal provided with a location or position function (300).
Figure 9:
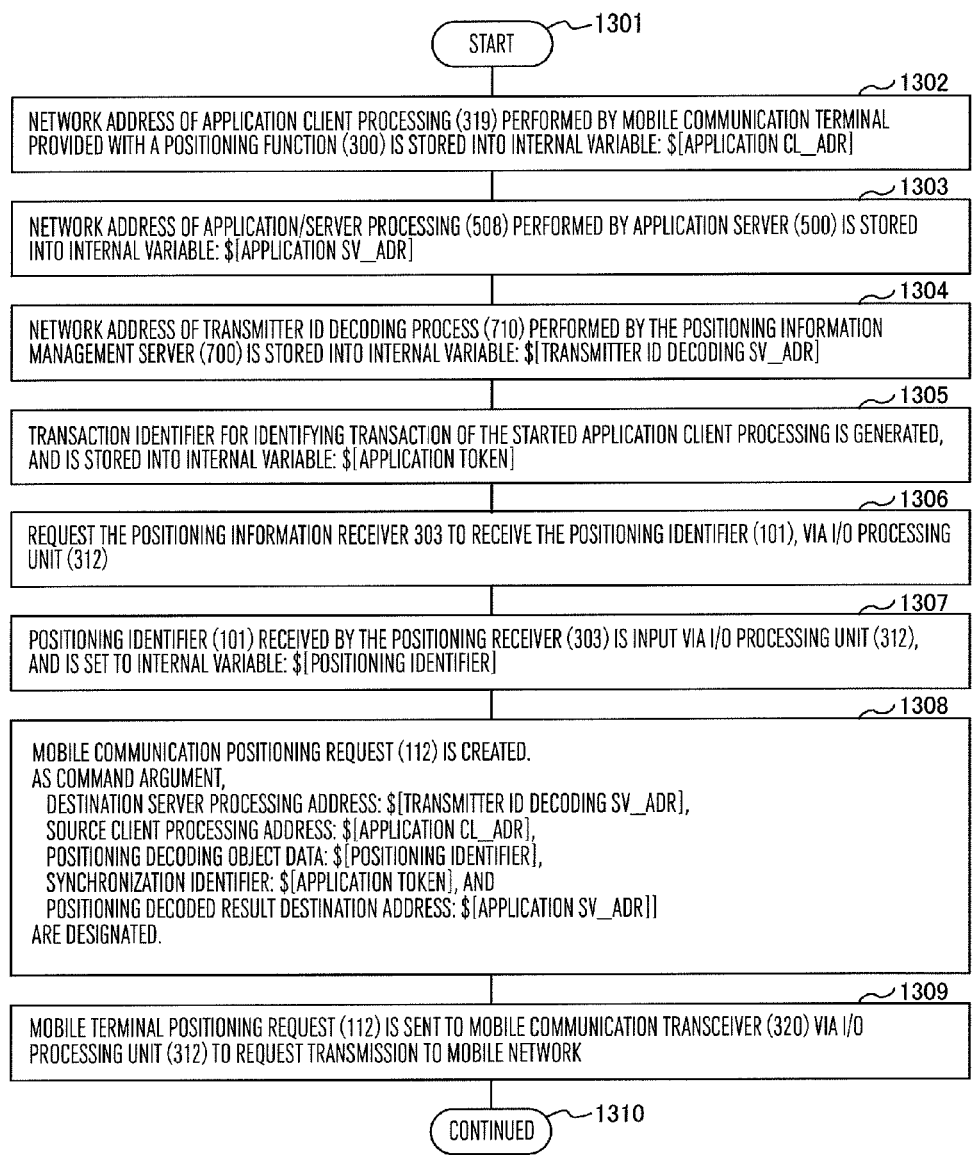
FIG. 9 is a view showing a process flow of an application client processing (319).
Figure 10:
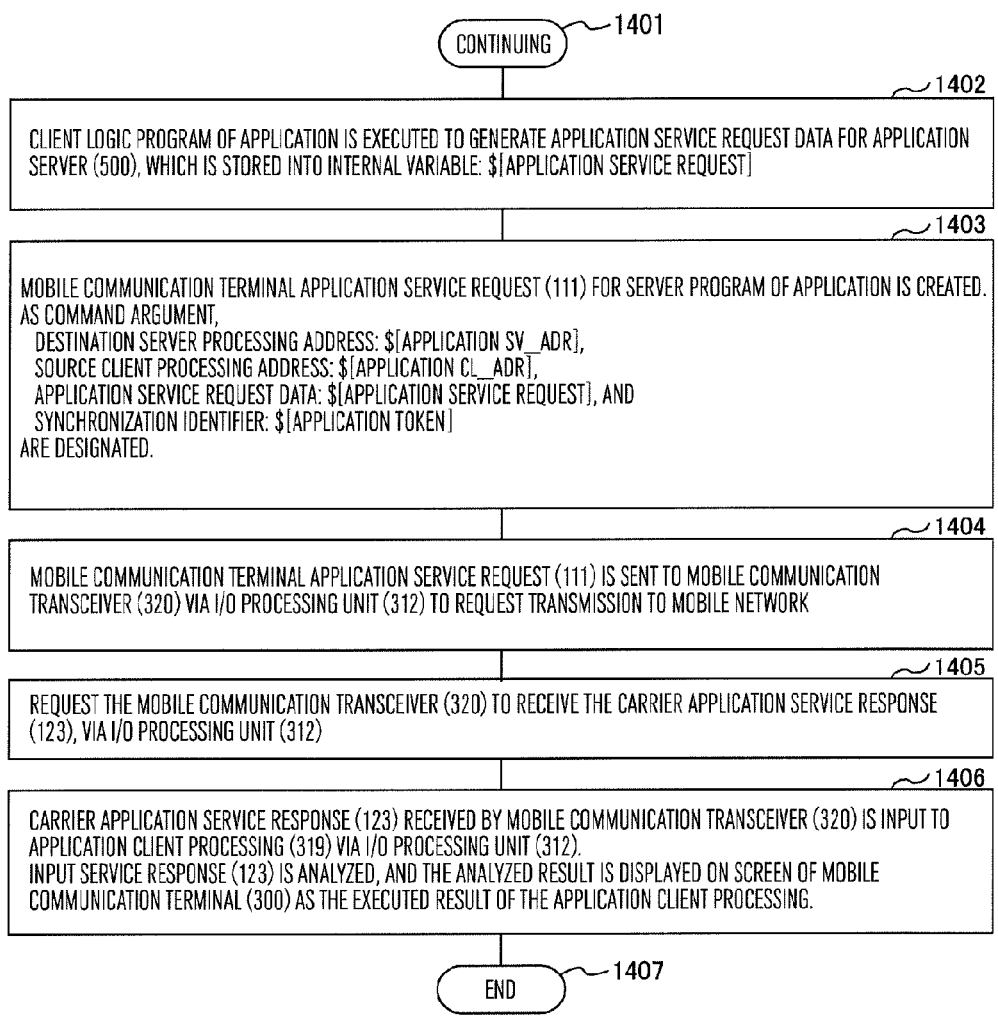
FIG. 10 is a view showing a process flow of the application client processing (319).

The sub-work, in which the mobile communication terminal provided with a location or position function 300 executes a client program of the location or position, time record and mobile device identification number information service which is an application service, is described using FIG. 3, FIG. 9, and FIG. 10.

Prior to the description of the program, the configuration of the mobile communication terminal provided with a location or position function 300 is described with reference to FIG. 3. The mobile communication terminal provided with a location or position function 300 comprises mainly three sections.

The first section comprises a ID-time-location or position receiving antenna 301 and ID-time-location or position receiver 303 for receiving the ID and/or location or position identifier 101 from the ID and/or time information scanner 200. The location or position receiver 303 is connected to an I/O processing unit 312 of the later-described information processing unit 310 via a data path 304.

The second section comprises a mobile communication transmitting/receiving antenna 322 and a mobile communication transceiver 320 for transmitting/receiving data to/from the mobile communication server 400. The mobile communication transceiver 320 is connected to the later-described I/O processing unit 312 of the information processing unit 310 via a data path 317.

The third section is the information processing unit 310 with the same function as that of an ordinary computer. The information processing unit 310, as with an ordinary computer, comprises a central processing unit 311, an I/O device 312, and a storage device 313. A mobile communication terminal operating system 318 is stored in the storage device 313 in advance as with an ordinary computer. Other than this, an application client processing 319 which is a processing program specific to the mobile communication terminal 300 is stored in the storage device 313 in advance. Now the description of the configuration of the mobile communication terminal provided with a location or position function 300 is completed.

Next, the process flow of the application client processing 319 is described with reference to FIG. 9 and FIG. 10. The client processing 319 is started, and is performed by the central processing unit 311 (Step 1301). First, a parameter group used to generate the later-described mobile communication request is initialized. The network address of the application client processing 319 performed by the mobile communication terminal provided with a location or position function 300 is stored into $(application CL_ADR) of the internal variable (Step 1302). Next, the network address of an application server processing 508 performed by the application server 500 is stored into $(application SV_ADR) of the internal variable (Step 1303). Next, the network address of a transmitter ID decoding process 710 performed by the ID-time-location or position management server 700 is stored into $(transmitter ID decoding SV_ADR) of the internal variable (Step 1304). Now the initialization process with regard to the network addresses for communication is completed.

Next, a transaction identifier for identifying transaction of the started application client processing 319 is generated, and is stored into $(application token) of the internal variable (Step 1305).

Figure 19:
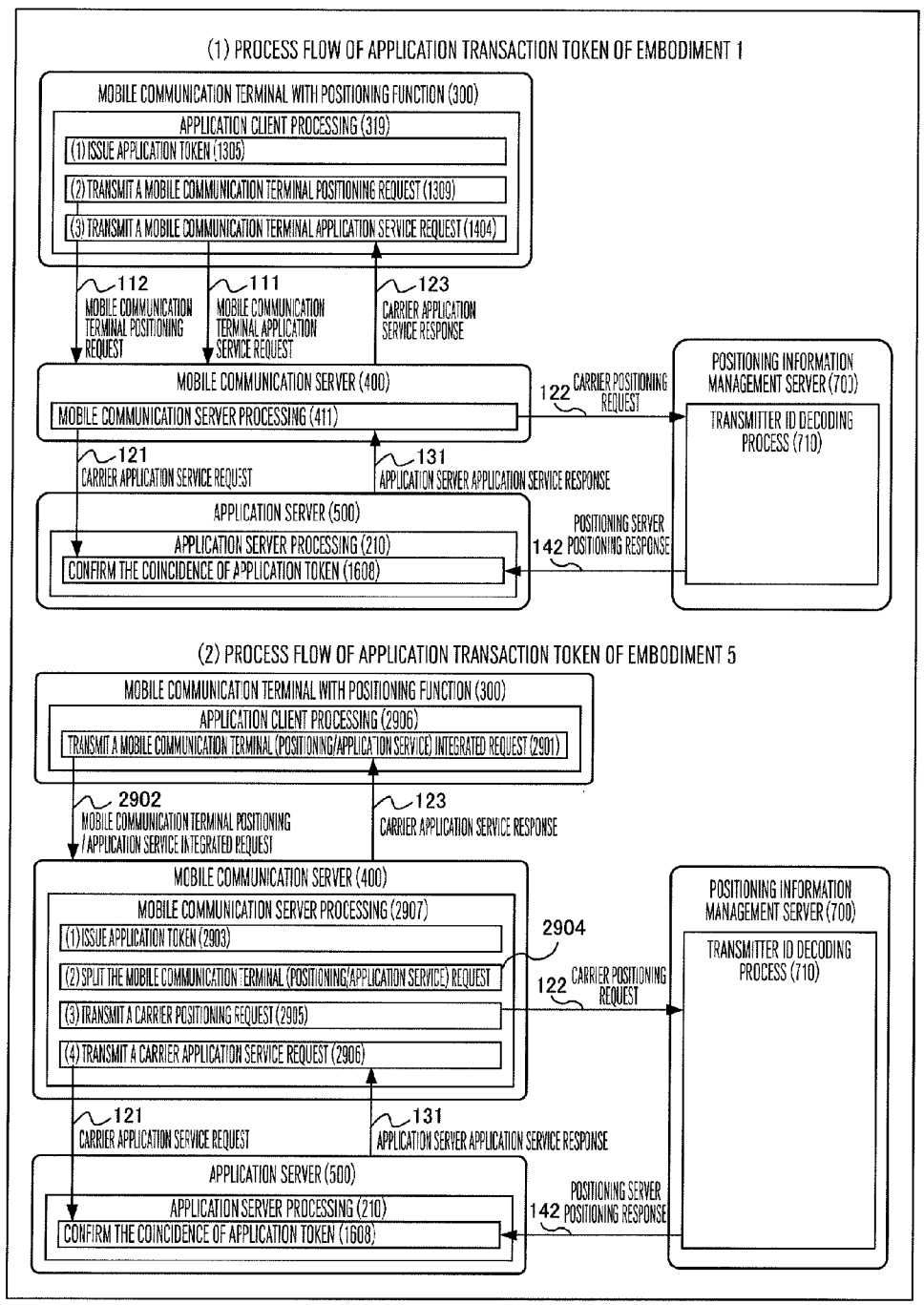
FIG. 19 is a view showing a location or position system configuration to achieve an integration of a location or position request and an application service request.

Here, the need for the transaction identifier is described using FIG. 19 (1). As shown in FIG. 19, the application client processing 319 includes two main logic processings, and in each processing, one request is sent to the outside. The first processing is a mobile terminal location or position request (112 in Step 1309) which is generated by the mobile communication terminal 300 based on the ID and/or location or position identifier 101 received from the ID and/or time information scanner 200. The request in Step 1309 is intended to acquire location or position, time record and mobile device identification number information (latitude, longitude, altitude, etc.) by decoding the ID and/or location or position identifier. The other processing is the application service (LBS) request (111 in Step 1404) for the application server 500 which is generated by performing a client logic program (not illustrated) of the application (LBS) utilizing the location or position, time record and mobile device identification number information obtained in the above-described decoding. There is a dependency relationship between these two processings, wherein the latter application service request uses the processing result of the former location or position request. When considering these two logic processings, the simplest process flow is given as follows.

a. The mobile communication terminal 300 transmits the location or position request 112.

b. The mobile communication server 400 converts the location or position request 112 into the carrier location or position request 122, and transmits the carrier location or position request 122 to the ID-time-location or position management server 700.

c. The ID-time-location or position management server 700 transmits a location or position server location or position response.

d. The mobile communication server 400 converts the location or position server location or position response into a carrier location or position response, and transmits the carrier location or position response to the mobile communication terminal 300.

e. The mobile communication terminal 300 transmits the terminal application service request 111 using the carrier location or position response.

f. The mobile communication server 400 converts the terminal application service request 111 into the carrier application service request 121, and transmits the carrier application service request 121 to the application server 500.

g. The application server 500 transmits the server application service response 131.

h. The mobile communication server 400 converts the server application service response 131 into a carrier application service response 123, and transmits the carrier application service response 123 to the mobile communication terminal 300.

As shown above, in the simplest implementation, the number of times of communication between the client and the server is eight, and the data processing and communication processing of the client and server are serially performed. In contrast, in the first embodiment of the present invention shown in FIG. 19 (1), the location or position server location or position response of (iii) is not sent to the mobile communication terminal 300, but is sent to the application server 500. With this, as shown in FIG. 19 (1), the number of times of communication between the client and the server can be reduced to seven. Moreover, because the data processing and communication processing of the client and server can be performed in parallel, the whole processing time can be reduced. Now the description using FIG. 19 (1) with regard to the need for the transaction identifier is completed.

Now, return to the description of the process flow of the application client processing 319 shown in FIG. 9.

(2) The sub-work in which the mobile communication terminal provided with a location or position function 300 receives the ID and/or location or position identifier transmitted by the ID and/or time information scanner 200 is described using FIG. 3, FIG. 9, and FIG. 10.

First, in the application client processing 319, a request is issued via the I/O processing unit 312 to the ID-time-location or position receiver 303 to receive the ID and/or location or position identifier 101 (Step 1306). Next, the ID and/or location or position identifier 101 received by the location or position receiver 303 is input via the I/O processing unit 312, and is set to $(ID and/or location or position identifier) of the internal variable (Step 1307). Here, in the example of FIG. 3, the concealed variable ID="x21y21z21" is received, and is stored into $(ID and/or location or position identifier).

(3) Next, the mobile communication terminal provided with a location or position function 300 transmits the mobile terminal location or position request 112, which is the request to decode the received ID and/or location or position identifier 101, to the ID-time-location or position management server 700. First, the mobile terminal location or position request 112 is created. As the command argument, a. destination server processing address: $(transmitter ID decoding SV_ADR), b. a source client processing address: $(application CL_ADR),
c. a location or position decoding object data: $(ID and/or location or position identifier)(="x21y21z21"),
d. a transaction identifier: $(application token), and
e. a location or position decoded result destination address: $(application SV_ADR)) are designated (Step 1308). Next, the mobile terminal location or position request 112 is sent to the mobile communication transceiver 320 via the I/O processing unit 312 to request transmission to the mobile network (Step 1309). The mobile terminal location or position request 112 is converted into the carrier location or position request 122 and transmitted to the ID-time-location or position management server 700 via the mobile communication server 400.

Figure 4:
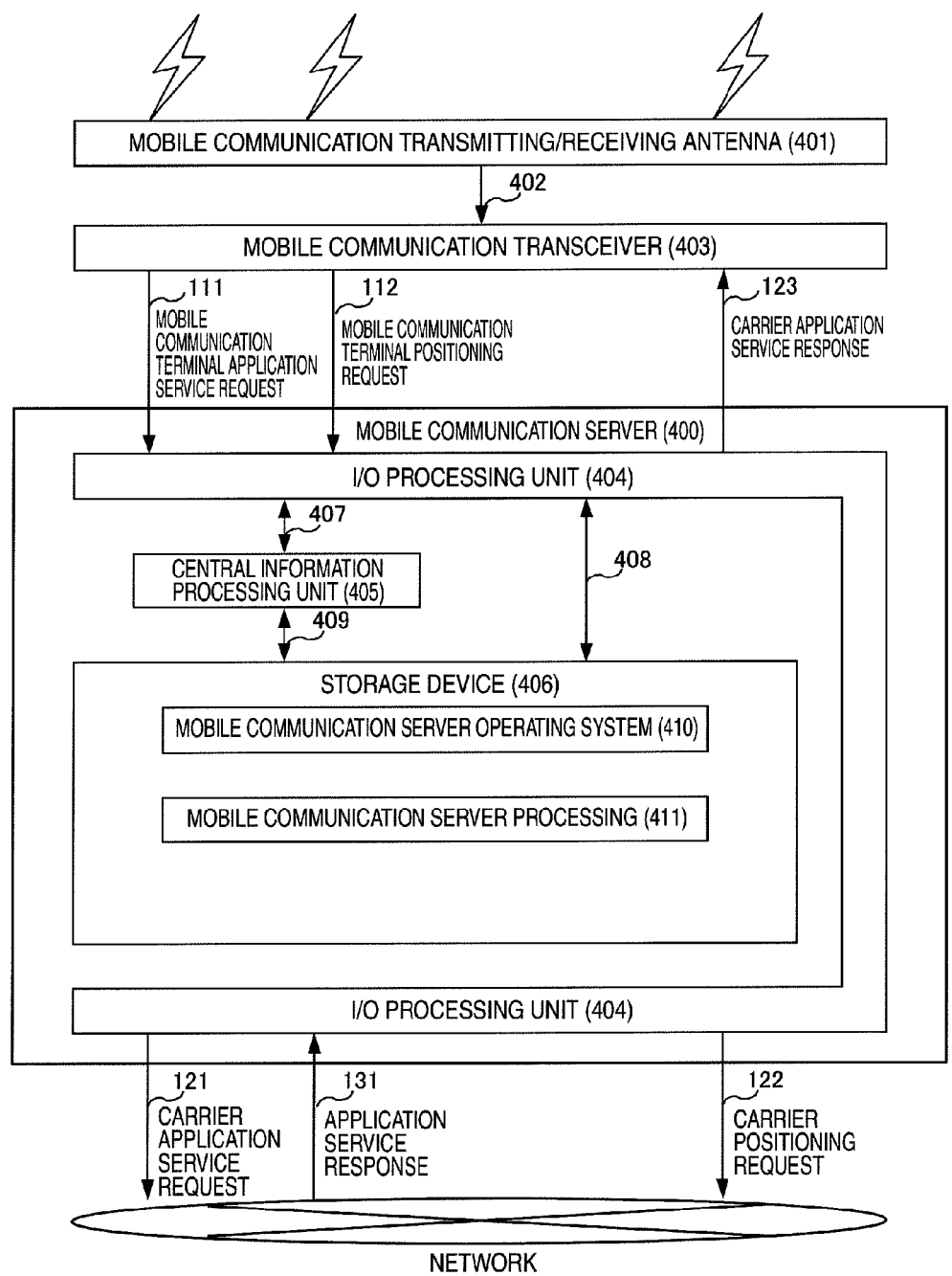
FIG. 4 is a view showing a configuration of a mobile communication server (400).
Figure 11:
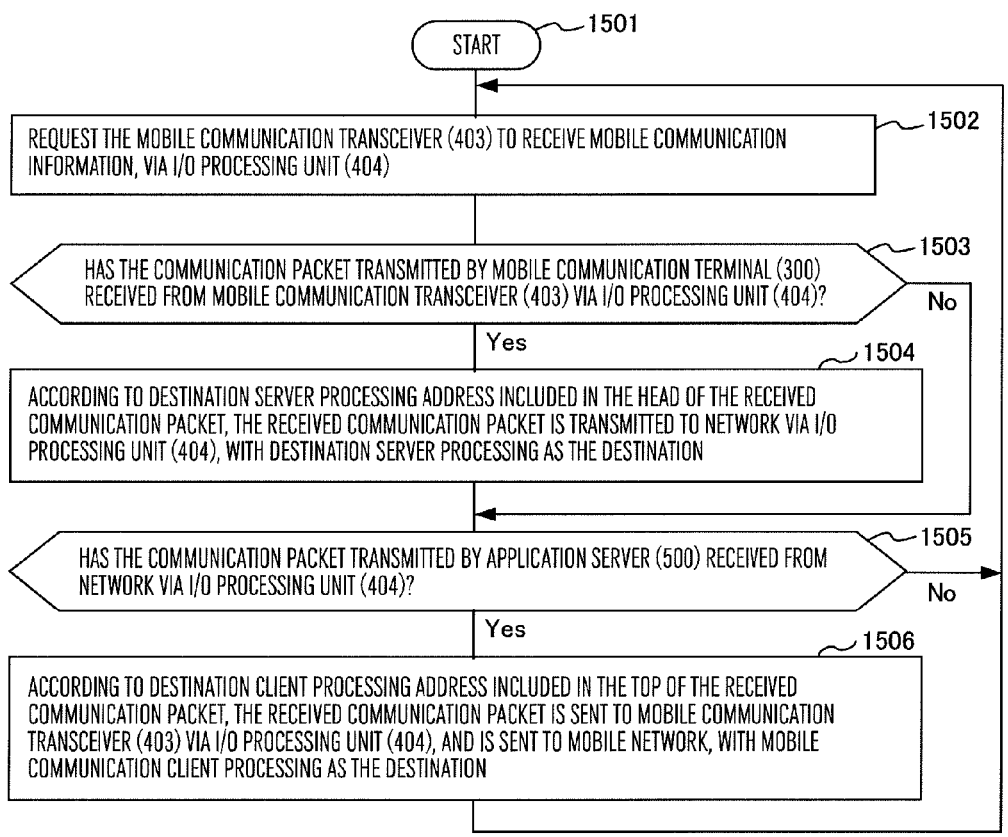
FIG. 11 is view showing a process flow of a mobile communication server processing (411).

(4) Here, the configuration of the mobile communication server 400 and the process flow of a mobile communication server processing 411 are described using FIG. 4 and FIG. 11. The configuration of the mobile communication server 400 is shown in FIG. 4. The mobile communication server 400 comprises mainly two sections.

The first section is the mobile communication transmitting/receiving antenna 401 and mobile communication transceiver 403 for transmitting/receiving data to/from the mobile communication terminal 300. The mobile communication transceiver 403 is connected to the I/O processing unit 404 of the later-described mobile communication server 400 via the data paths 111, 112, and 123.

The second section is the mobile communication server 400 including the same function as that of an ordinary computer. The mobile communication server 400, as with an ordinary computer, comprises a central processing unit 405, an I/O device 404, and a storage device 406. A mobile communication server operating system 410 is stored in the storage device 406 in advance, as with an ordinary computer. Other than this, a mobile communication server processing 411 which is a processing program specific to the mobile communication server 400 is stored in the storage device 406 in advance. Now the description of the configuration of the mobile communication server 400 is completed.

(5) Next, the process flow of the mobile communication server processing 411 is described with reference to FIG. 11. First, a request is issued via the I/O processing unit 404 to the mobile communication transceiver 403 to receive mobile communication information (Step 1502). Next, it is determined whether or not a communication packet transmitted by the mobile communication terminal 300 has been received from the mobile communication transceiver 403 via the I/O processing unit 404 (Step 1503). If the mobile communication packet has been received, the mobile communication packet processing is performed. That is, according to a destination server processing address included in the top of a received communication packet, the received communication packet is transmitted to the network via the I/O processing unit 404 with the destination server processing as the destination (Step 1504). If the mobile communication packet has not been received yet, the presence of absence of a communication packet from the network is determined. That is, it is determined whether or not the communication packet transmitted by the application server 500 has been received from the network via the I/O processing unit 404 (Step 1505). If the communication packet from the network has been received, the communication packet processing is performed. That is, according to the destination client processing address included in the top of the received communication packet, the received communication packet is sent to the mobile communication transceiver 403 via the I/O processing unit 404, and is sent to the mobile network with the mobile communication client processing as the destination (Step 1506). If the communication packet from the network has not been received yet, then the flow returns to Step 1502 and the determination of whether or not the mobile communication information has been received is repeated. As described above, the mobile communication server 400 is located between the mobile network and the ordinary backbone network, and plays a role to deliver the communication packet. Now the description of the mobile communication server 400 is completed.

Now, return to the description of the application client processing 319 shown in FIG. 9 and FIG. 10.

(6) Next, the sub-work with regard to the transmission of the mobile communication terminal application service request 111, which is a request from the client side of the location or position, time record and mobile device identification number information service, is described. The process flow of the application client processing 319 continues from Step 1310 of FIG. 9 to Step 1401 of FIG. 10. First, a client logic program (not illustrated) of the application is executed to generate application service request data for the application server 500, which is stored into $(application service request) of the internal variable (Step 1402). In the next step, the mobile communication terminal application service request 111 to the server program of the application is created. As the command argument,
a. the destination server processing address: $(application SV_ADR),
b. the source client processing address: $(application CL_ADR),
c. the application service request data: $(application service request), and
d. the transaction identifier: $(application token) are designated (Step 1403). In the next step, the created mobile communication terminal application service request 111 is sent to the mobile communication transceiver 320 via the I/O processing unit 312 to request transmission to the mobile network (Step 1404). After transmitting the mobile communication terminal application service request 111, the application client processing 319 moves to a step of waiting for a response of the application server processing 508 with respect to the request 111. Here, 6) the detailed description on the server side process (i.e., the application server processing) with respect to the mobile communication terminal application service request 111 sent to the mobile network and on the server configuration is described later, and the description of the process flow of the application client processing 319 continues.

In the application client processing 319, a request is issued via the I/O processing unit 312 to the mobile communication transceiver 320 to receive the carrier application service response 123 (Step 1405).

(7) Here, the sub-work (7) is described prior to the sub-work processings (5), (6). The carrier application service response 123 which is the executed result of the server side process corresponding to the request is received by the mobile communication transceiver 320, and is input to the application client processing 319 via the I/O processing unit 312. In the client processing 319, the input service response 123 is analyzed, and is displayed on a screen of the mobile communication terminal 300 as the executed result of the application client processing (Step 1406). Now the process flow of the application client processing 319 is completed (Step 1407). Now the description of the process flow of the application client processing 319 with reference to FIG. 10 is completed.

(5) Next, with regard to the server side process corresponding to the mobile communication terminal application service request 111 sent to the mobile network, as described in the procedure of the sub-work (4), the configuration of the application server 500 and the process flow of the application server processing 508 are mainly described. The mobile communication terminal application service request 111 sent to the mobile network is, via the mobile communication server 400, converted into the carrier application service request 121 and sent to the backbone network, and finally received by the application server 500. The application server 500 performs the application server processing 508 with the received carrier application service request 121 (=mobile communication terminal application service request 111) as an input.

Figure 5:
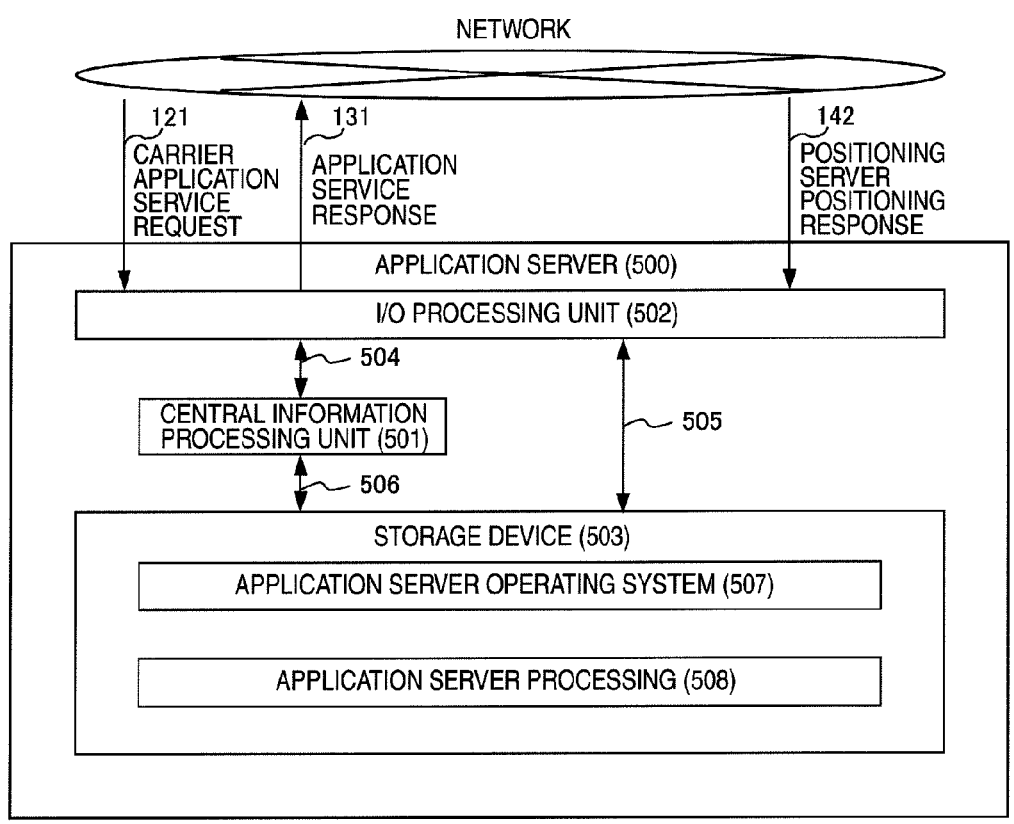
FIG. 5 is a view showing a configuration of an application server (500).

First, the configuration of the application server 500 is shown in FIG. 5. The application server 500, as with an ordinary computer, comprises a central processing unit 501, an I/O device 502, and a storage device 503. An application server operating system 507 is stored in the storage device 503 in advance, as with an ordinary computer. Other than this, the application server processing 508 which is a processing program specific to the application server 500 is stored in the storage device 503 in advance. Now the description of the configuration of the application server 500 is completed.

Figure 12:
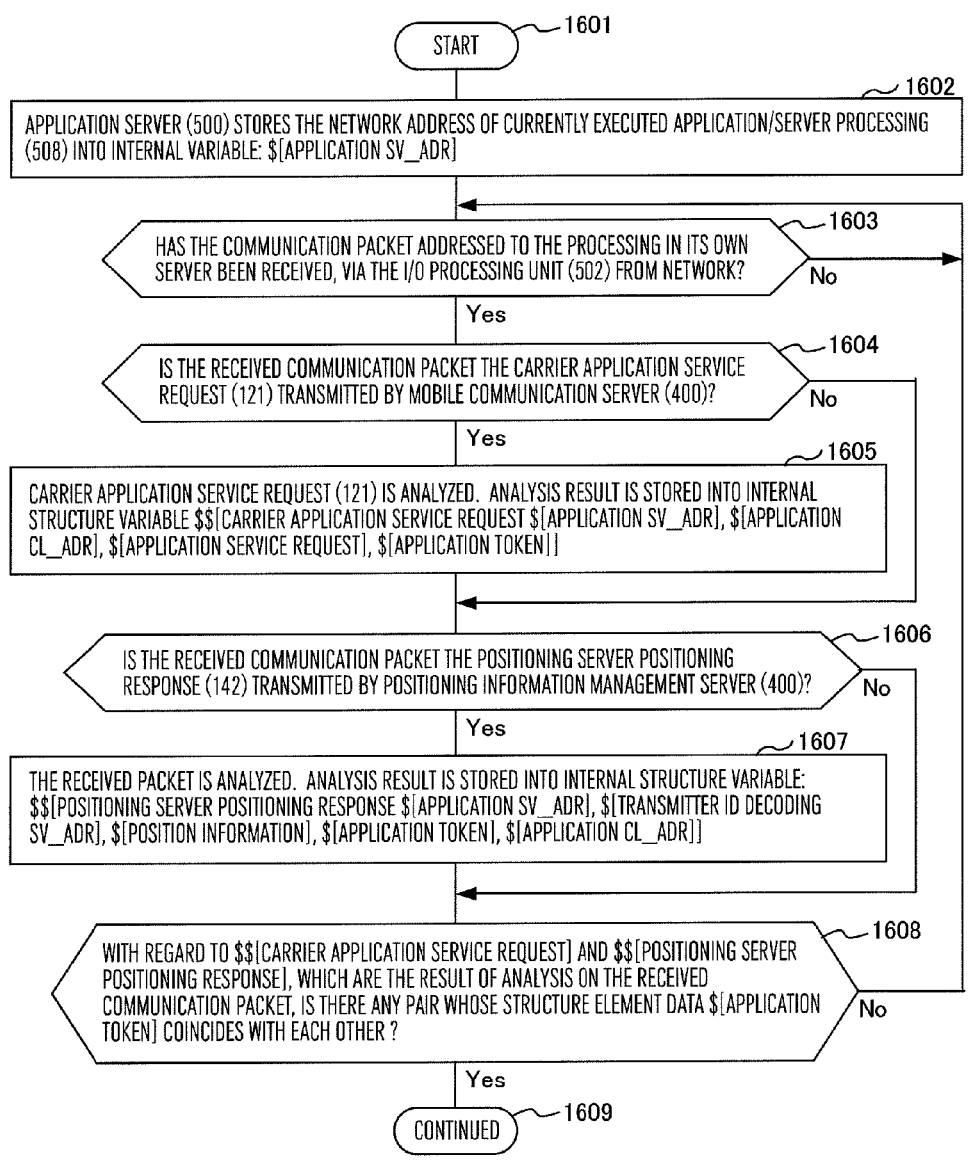
FIG. 12 is a view showing a process flow of an application server processing (508).
Figure 13:
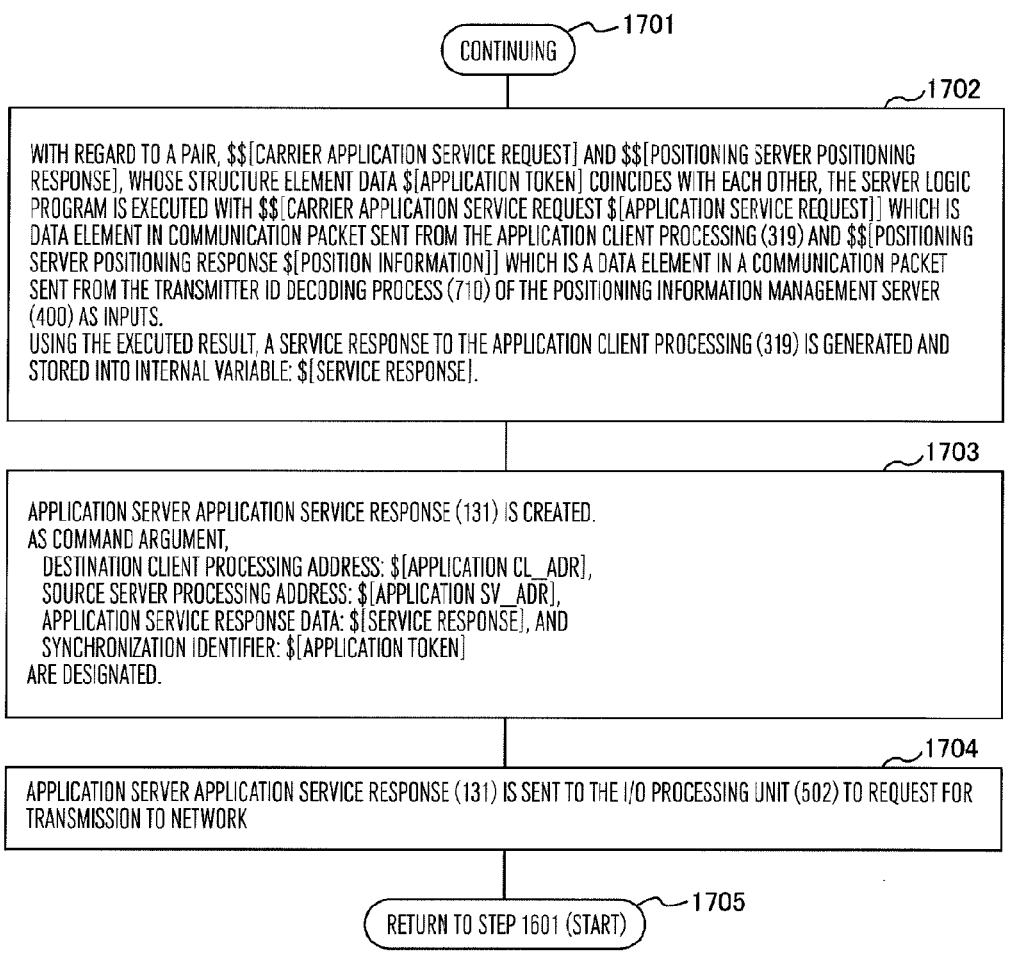
FIG. 13 is a view showing the process flow of the application server processing (508).

Next, the process flow of the application server processing 508 is described with reference to FIG. 12 and FIG. 13. When the application server process 508 is started, an initialization process is performed first (Step 1601). The application server 500 stores the network address of the application server processing 508 currently executed by the application server 500 itself into the internal variable: $(application SV_ADR) (Step 1602). Next, it is determined whether or not a communication packet addressed to the processing in its own server has been received via the I/O processing unit 502 from the network (Step 1603), and this determination is repeated until the communication packet has been received. If it has been received, the flow proceeds to Step 1604. In the next step, it is determined whether or not the received communication packet is the carrier application service request 121 transmitted by the mobile communication server 400, i.e., the mobile communication terminal application service request transmitted by the mobile communication terminal 200 (Step 1604). If the received communication packet is the carrier application service request 121, the received communication packet is analyzed (Step 1605). The analysis result is stored into the internal structure variable: $$(carrier application service request $(application SV_ADR), $(application CL_ADR), $(application service request), $(application token)). If the received communication packet is not the carrier application service request 121, then it is determined whether or not the received communication packet is the location or position server location or position response 142 transmitted by the ID-time-location or position management server 400 (Step 1606). If it is the location or position server location or position response 142, the received packet is analyzed and the analysis result is stored into the internal structure variable: $$(location or position server location or position response $(application SV_ADR), $(transmitter ID decoding SV_ADR), $(location or position, time record and mobile device identification number information), $(application token), $(application CL_ADR)) (Step 1607). If the above-describe steps have normally been proceeded, the carrier application service 121 and the location or position server location or position response 142 have been received.

As described above, in this embodiment, the application service request 111 and the location or position request 112 are transmitted in parallel from the mobile communication terminal so that the data processing and communication processing of the client and server can be performed in parallel and the whole processing time can be reduced. For this reason, in the application server processing 508, it is determined whether or not these communication packets are the communication packets generated and transmitted through the transaction of the same application client processing 319. Specifically, with regard to two types of structure internal variables, $$(carrier application service request) and $$(location or position server location or position response), which are the results of the analysis on the received communication packet, it is determined whether there is any pair whose element data $(application token) within the structure variable coincides with each other (Step 1608). If there is a coinciding structure variable, then two pieces of information, $(ID-time-location or position) and $(application service request) within these structure variables can be used to execute a server processing program logic of the application server processing (Steps 1609, 1701). Next, with regard to a pair of two structure internal variables, $$(carrier application service request) and $$(location or position server location or position response), in which a coincidence of the element data $(application token) is detected in Step 1608, the server logic program is executed, with $$(carrier application service request $(application service request)) which is a data element within the communication packet sent from the application client processing 319 and $$(location or position server location or position response $(location or position, time record and mobile device identification number information)) which is a data element within the communication packet sent from the transmitter ID decoding process 710 of the ID-time-location or position management server 400 as inputs.

Furthermore, using the executed results, a service response to the application client processing 319 is generated, and the generated result is stored into $(service response) of the internal variable (Step 1702). Next, the application server application service response 131 is created. As the command argument, a. the destination client processing address: $(application CL_ADR),
b. the source server processing address: $(application SV_ADR),
c. the application service response data: $(service response), and
d. the transaction identifier: $(application token).

are designated (Step 1703). Finally, the created application server application service response 131 is sent to the I/O processing unit 502 to request transmission to the network (Step 1704). Now that the response to one request from the application client processing is completed, the flow returns to Step 1601 to wait for the next request. Now the description of the process flow of the application server processing 508 is completed. In addition, the description on the configuration of the application server 500 and the process flow of the application server processing 508 is now completed.

Now the description on the "ID and/or location or position identifier reception and LBS work" which is the fifth work is completed. Because this work extends over one or a plurality of system modules and is lengthy and complicated, seven sub-works constituting this work are enumerated and described in the units of sub-work.

(6) ID and/or Location or Position Identifier Decoding Work

Figure 7:
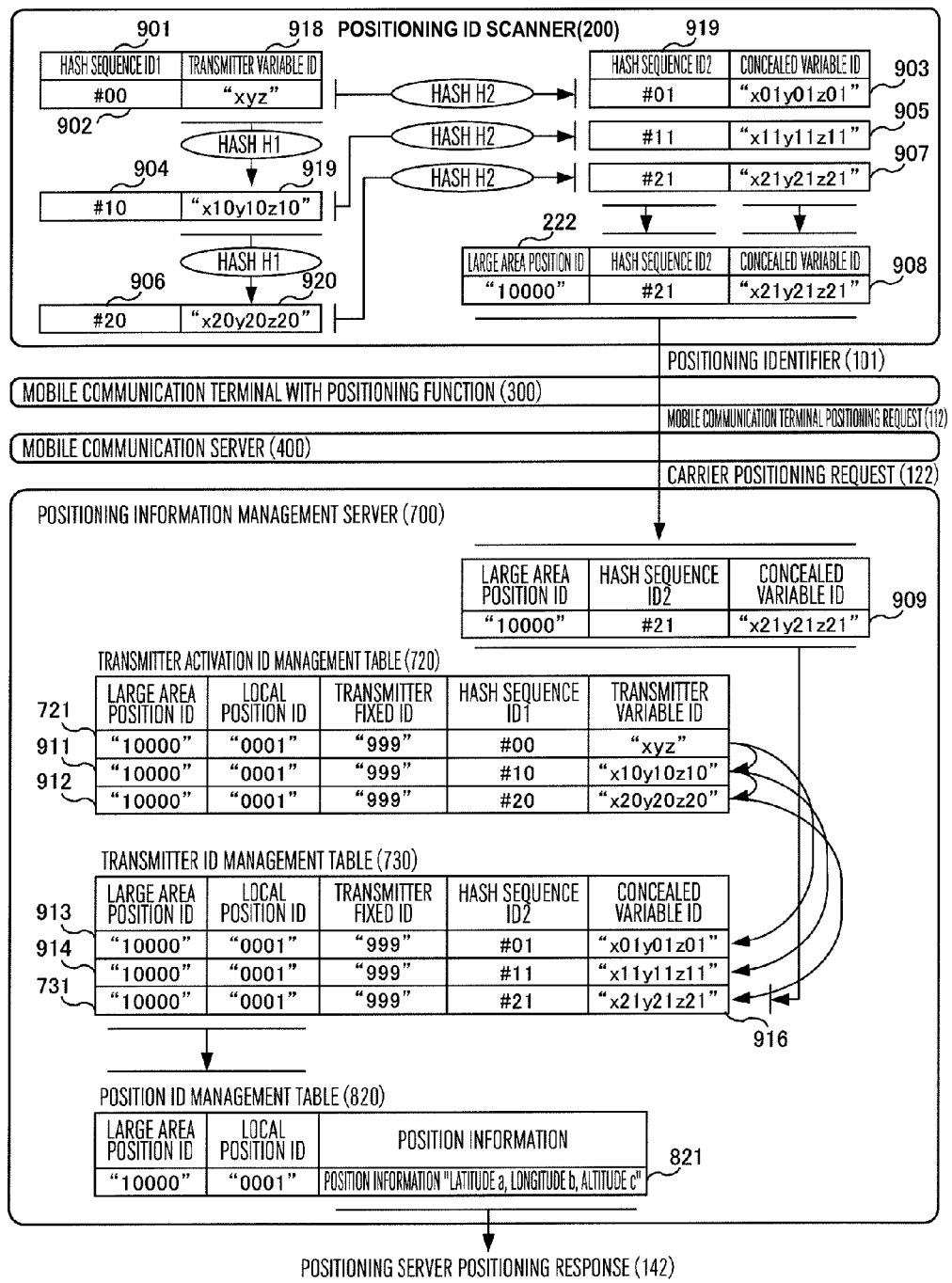
FIG. 7 is a view showing a configuration of an embodiment of a transmitter variable ID concealing and decoding process.
Figure 14:
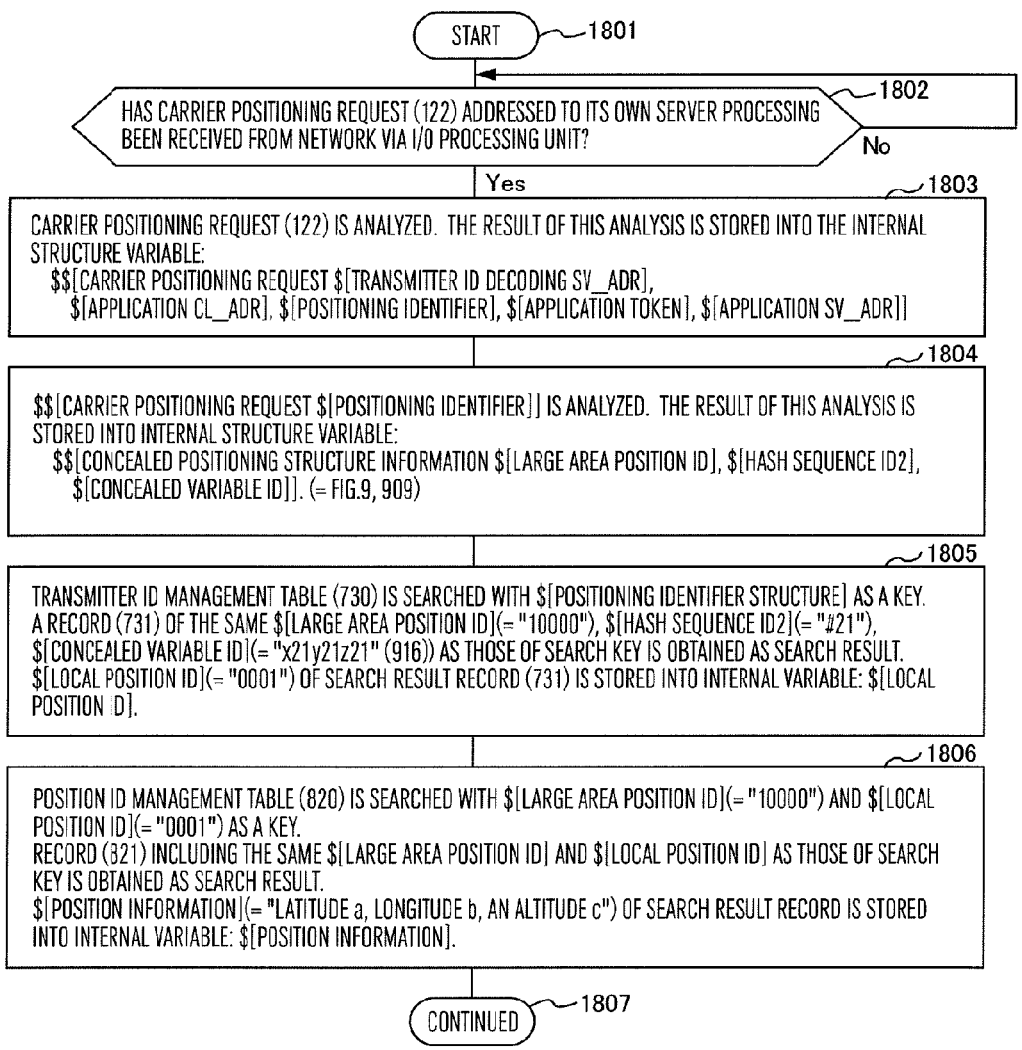
FIG. 14 is a view showing a process flow of an embodiment of a transmitter ID decoding process (710).
Figure 15:
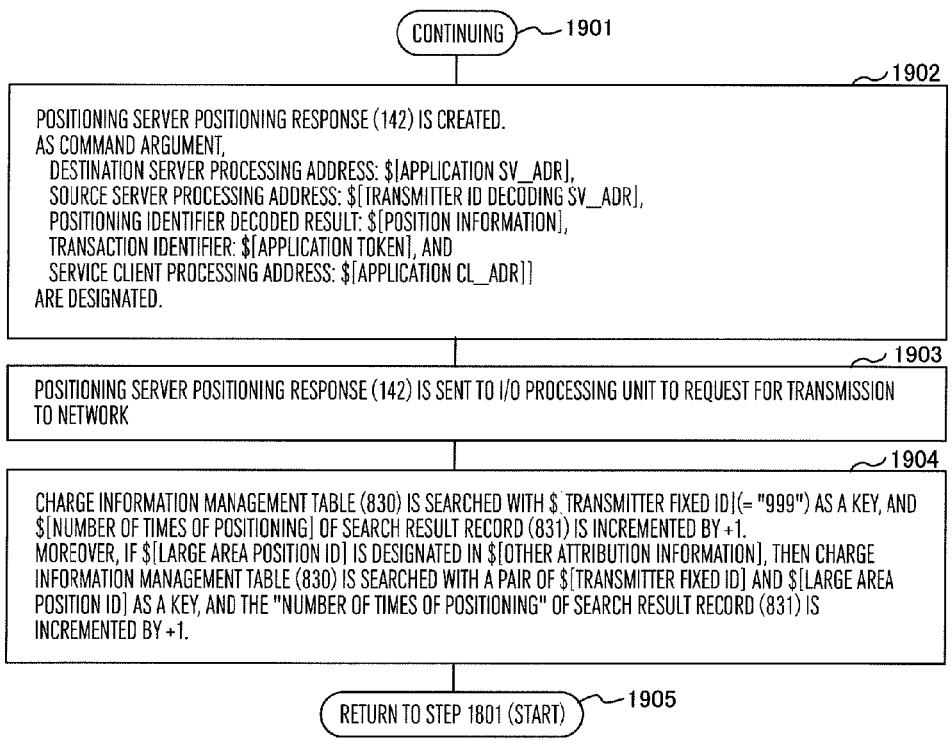
FIG. 15 is a view showing a process flow (continuing from FIG. 14) of an embodiment of the transmitter ID decoding process (710).

The "ID and/or location or position identifier decoding work" which is the sixth main work is described using FIG. 7, FIG. 14, and FIG. 15. This work flows as follows: the ID-time-location or position management server 700 performs the location or position ID decoding process on the carrier location or position request 122, which is transmitted from the mobile communication terminal 300 and is sent via the mobile communication server 400, to generate location or position, time record and mobile device identification number information which is the decoded result, and transmit the generated location or position, time record and mobile device identification number information to the application server 500 as the location or position server location or position response 142.

First, in FIG. 7 (a part thereof is also illustrated in FIG. 1), the initialization state of each table of the ID-time-location or position management server 700 at a time point immediately before receiving the carrier location or position request 122 is described.

First, the record 821 of the location or position ID management table 820 shown in FIG. 1 or FIG. 7 is described. A value is stored into the record 821 of the location or position ID management table 820, in the (preprocessing 2) of "(1) design and initialization work of the installation place of an ID and/or time information scanner" (821 in FIG. 18).

Next, the record 721 of the transmitter activation ID management table 720 shown in FIG. 1 is described. The record 721 is the same record as the record 721 of the transmitter activation ID management table 720 of FIG. 7, and a value is stored into the (preprocessing 3) of "(1) design and initialization work of the installation place of an ID and/or time information scanner" (2802 in FIG. 18). However, when the (preprocessing 3) is completed, the element data "transmitter fixed ID" of the record 2802 is in a state to be determined (="–"). This data item is set for the first time in "(3) registration work of an installed ID and/or time information scanner". Specifically, in Step 788 of the transmitter registration process flow 630 of FIG. 6, $(transmitter fixed ID)(="999") of the activated transmitter 200 is stored. As a result, the record 721 shown in FIG. 1 and FIG. 7 is determined.

Next, the rest records 911 and 912 of the transmitter activation ID management table 720 shown in FIG. 7, and the records 913, 914, and 731 of a transmitter ID management table 730 are described. These records are generated and stored by a non-illustrated initialization process in the ID-time-location or position management server 700 after the transmitter registration process 630 by the transmitter activation terminal 600 is completed. Specifically, according to the same process flow as that of the variable ID concealing process 230 in the ID and/or time information scanner 200, the following two hash sequences are created with the record 721 as the source, and a value is stored into each table.

a. The hash sequence ID 1 and transmitter variable ID is stored into the transmitter activation ID management table 720, and
b. The hash sequence ID 2 and concealed variable ID is stored into the transmitter ID management table 730.

Next, the record 831 of the charge information management table 830 shown in FIG. 1 is described. The record 831 is a record corresponding to a record 2206 or 2207 of the charge information management table 830 of FIG. 16, and is stored and registered in "(3) registration work of an installed ID and/or time information scanner". Specifically, in Step 790 of the transmitter registration process flow 630 of FIG. 6, the record 831 including $(transmitter fixed ID)(="999") of the activated transmitter 200 is stored.

Now the description of the initialization state of each table of the ID-time-location or position management server 700 at a time point immediately before receiving the carrier location or position request 122 in FIG. 7 is completed.

In the following, the process flow of a location or position ID decoding process 710 in response to the carrier location or position request 122 is described with reference to FIG. 14 and FIG. 15 while referring to FIG. 7 as required. First, the ID-time-location or position management server 700 starts the transmitter ID decoding process 710 as a server service (Step 1801). First, in the transmitter ID decoding process 710, first, it is repeatedly determined whether or not the carrier location or position request 122 addressed to its own server processing has been received from the network via the I/O processing unit (Step 1802). Here, as shown in FIG. 7, the mobile communication terminal provided with a location or position function 300 receives the ID and/or location or position identifier 101 transmitted by the ID and/or time information scanner 200. The mobile communication terminal 300 then transmits the mobile terminal location or position request 112. The mobile terminal location or position request 112 is converted into the carrier location or position request 122 via the mobile communication server 400, and reaches the ID-time-location or position management server 700. In the transmitter ID decoding process 710 of the ID-time-location or position management server 700, the received carrier location or position request 122 is analyzed. The result of this analysis is stored into the internal structure variable: $$(carrier location or position request $(transmitter ID decoding SV_ADR), $(application CL_ADR), $(ID and/or location or position identifier), $(application token), $(application SV_ADR)) (Step 1803).

Furthermore, $$(carrier location or position request $(ID and/or location or position identifier)) which is a data element of the internal structure variable is analyzed. The result of this analysis is stored into the internal structure variable: $$(concealed location or position structure information $(large area location or position ID), $(hash sequence ID 2), $(concealed variable ID)) (909 in FIG. 7) (Step 1804).

Next, the transmitter ID management table (730 in FIG. 7) is searched with $(ID and/or location or position identifier structure) as a key. Specifically, a record 731 having the same $(large area location or position ID)(="10000"), $(hash sequence ID 2)(="#21"), $(concealed variable ID) (="x21y21z21" (916)) as those of the search key is obtained as the search result.

$(local location or position ID)(="0001") of the search result record 731 is stored into $(local location or position ID) of the internal variable (Step 1805).

Next, the location or position ID management table 820 is searched with $(large area location or position ID) (="10000") and $(local location or position ID)(="0001") as a key. The record 821 having the same $(large area location or position ID) and $(local location or position ID) as those of the search key is obtained as the search result. $(location or position, time record and mobile device identification number information)(="latitude a, longitude b, an altitude c") of this search result record is stored into $(location or position, time record and mobile device identification number information) of the internal variable (Step 1806). The flow continues to Step 1901 of FIG. 15 through Step 1807.

Next, the location or position server location or position response 142 is created. As the command argument, a. the destination server processing address: $(application SV_ADR),
b. the source server processing address: $(transmitter ID decoding SV_ADR),
c. an ID and/or location or position identifier decoded result: $(location or position, time record and mobile device identification number information),
d. the transaction identifier: $(application token), and e. a service client processing address: $(application CL_ADR)) are designated (Step 1902).

Next, the location or position server location or position response 142 is sent to the I/O processing unit to request for transmission to the network (Step 1903).

In the final Step 1904, the charge information used in (7) the location or position charge work is stored. The charge information management table 830 is searched with $(transmitter fixed ID)(="999") (2222 in FIG. 16) as a key, and $(number of times of location or position) of the search result record 831 is incremented by +1. Moreover, if $(mobile communication company ID) 2203 or $(application service company ID) (2204) is designated in $(other attribution information) of the charge information management table 830, then the charge information management table 830 is searched with a set of information of $(transmitter fixed ID), $(mobile communication company ID), and $(application service company ID) as a key, and the "number of times of location or position" 2205 of the search result record 2206 or 2207 is incremented by +1 (Step 1904). Here, in FIG. 16, as the mobile communication company, the record 2206 or 2207 is prepared for two companies, i.e., Company K or Company D, respectively. In Embodiment 1 shown in FIG. 1, an example of a single mobile communication carrier 120 is shown.

However, as shown in FIG. 16, in cases where the ID-time-location or position management server supports one or a plurality of mobile communication carriers, if the number of times of location or position of a corresponding charge information management record is incremented by +1 in response to a carrier location or position request from each company, then the use state of the ID and/or location or position identifier can be managed on a per carrier basis and the charging is possible.

Finally, because one transaction of the transmitter ID decoding process 710 corresponding to the carrier location or position request 122 is completed, the transmitter ID decoding process 710 returns to Step 1801 in order to wait for the next carrier location or position request (Step 1905). Now the description of the transmitter ID decoding process 710 is completed.

Now the description on "(6) ID and/or location or position identifier decoding work" which is the sixth main work is completed.

(7) Charge Work of the ID and/or Location or Position Identifier Decoding Process "(7) Charge work of the ID and/or location or position identifier decoding process" which is the seventh main work is described with reference to FIG. 17. In this work, fair charging to each company which enjoys benefit from the location or position system is achieved with reference to the registered record of the charge information management table 830 which was prepared and registered in the decoding process in the main work (6).

Figure 17:
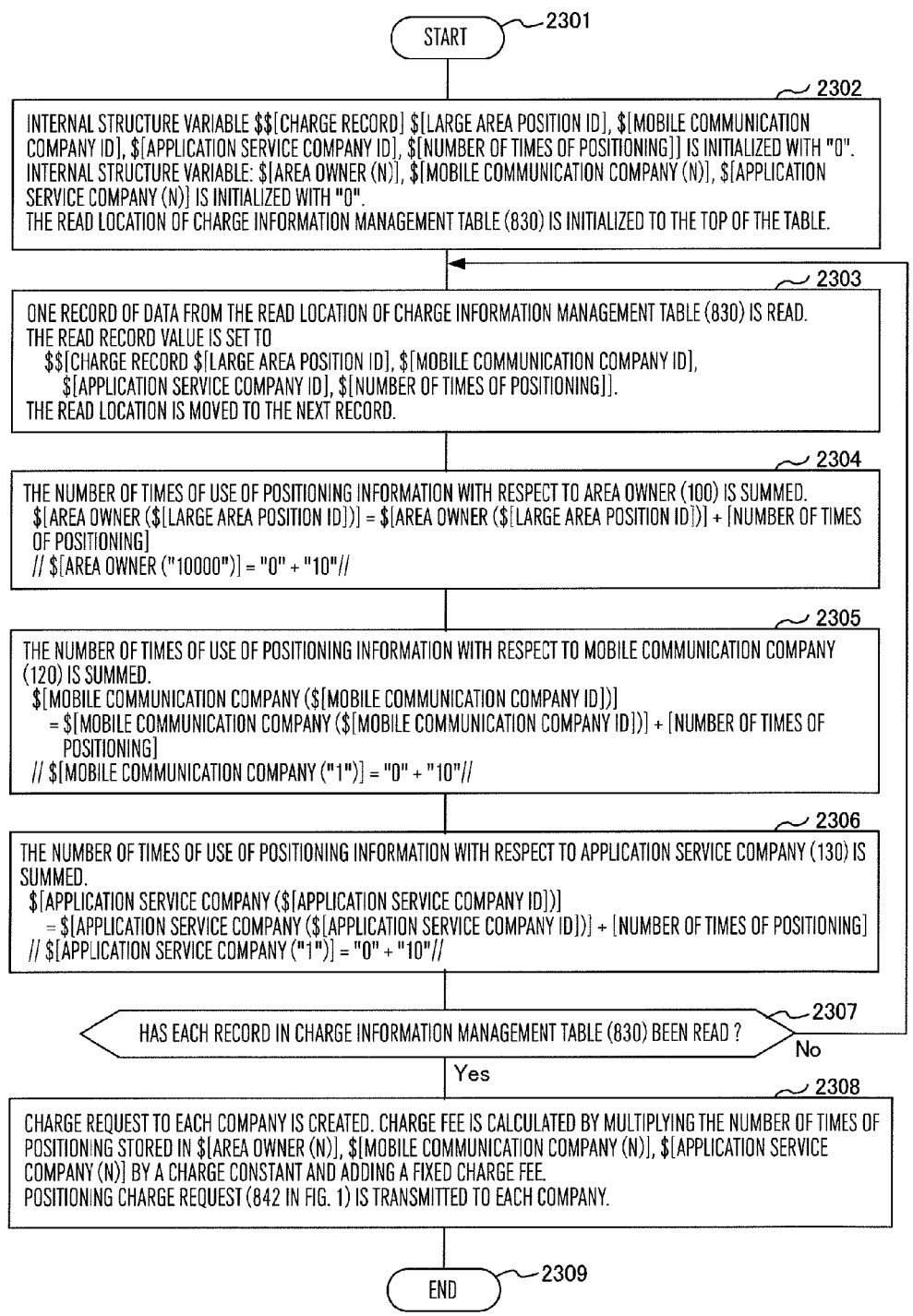
FIG. 17 is a view showing a process flow of a location or position charge process (840).

This work is described in detail in accordance with the process flow of a location or position charge process 840 shown in FIG. 17. The location or position charge process 840 is started (Step 2301). In the first step, an initialization process is carried out. First, the following internal structure variable-$$(charge record) is prepared:

$$(charge record $(large area location or position ID), $(mobile communication company ID), $(application service company ID), $(number of times of location or position)).

Each data element of the internal structure variable $$(charge record) is initialized to "0" in advance.

Furthermore, three types of internal array variables, $(area owner (N)), $(mobile communication company (N)), and $(application service company (N)) are prepared, all of which are initialized with "0".

The read location or position of the charge information management table (830) is initialized to the top of the table.

Now the initialization process is completed (Step 2302) and the flow moves to the creation of charge information.

One record of data is read from a read location or position of the charge information management table (830). The read record value is stored into the structure variable: $$(charge record $(large area location or position ID), $(mobile communication company ID), $(application service company ID), $(number of times of location or position)). The read location or position is moved to the next record (Step 2303).

Next, as shown below, based on the number of times of location or position of the read record, the number of times of use of ID-time-location or position with respect to the area owner 100 is summed (Step 2304).
$(area owner ($(large area location or position ID)))=$(owner ($(large area location or position ID)))+(number of times of location or position)

Specifically, when the record 2206 of FIG. 16 is read, the number of times of use of ID-time-location or position is summed and stored as follows.
$(area owner ("10000"))="0"+"10"

Next, as shown below, based on the number of times of location or position of the read record, the number of times of use of ID-time-location or position with respect to the mobile communication company 120 is summed (Step 2305).
$(mobile communication company ($(mobile communication company ID)))=$(mobile communication company ($(mobile communication company ID)))+(number of times of location or position)

Specifically, when the record 2206 of FIG. 16 is read, the number of times of use of ID-time-location or position is summed and stored as follows.
$(mobile communication company ("1"))="0"+"10"

Next, as shown below, based on the number of times of location or position of the read record, the number of times of use of ID-time-location or position with respect to the application service company 130 is summed (Step 2306).
$(application service company ($(application service company ID)))=$(application service company ($(application service company ID)))+(number of times of location or position)

Specifically, when the record 2206 of FIG. 16 is read, the number of times of use of ID-time-location or position is summed and stored as follows.
$(application service company ("1"))="0"+"10"

Now the summation of the number of times of use of ID-time-location or position with respect to one record of the charge information management table 830 is completed. In the next Step 2307, each record of the charge information management table 830 is read to determine whether or not the summation process has been performed. If there is any un-read record, the flows returns to Step 2303 to move to the read process of the next record. If each record has been read and the summation process is complete, the flow proceeds to the next Step 2308. In the next step, a charge request to each company is created. The charge fee is calculated by multiplying the number of times of location or position stored in $(area owner (N)), $(mobile communication company (N)), and $(application service company (N)), which are three internal array variables used for the summation of the ID-time-location or position, by a charge constant and adding a fixed charge fee. Next, the location or position charge request (842 in FIG. 1) is transmitted to each company.

Now the description of the process flow of the location or position charge process 840 is completed and the description of "(7) location or position charge work" is also completed.

Now the detailed description on the installation work and operation work of the location or position system, which is the first embodiment of the present invention, according to the above-described seven main work segments is completed.

The above description has been made on the embodiments, however, it is apparent to those skilled in the art that the present invention is not limited thereto, and various changes and modifications may be made within the spirit of the present invention and the scope of the appended claims.

In certain non-limiting claimed embodiments or examples of the present invention, certain elements or features can be excluded or not included, as negatively claimed elements or features, and can include wherein a method or system of the present invention does not include or excludes one or more of the following elements or features:

a. a location or position or a time record data identification information, an ID or time information scanner or locator, a transmitter fixed identifier, a transmitter variable identifier, a variable value, fixed and variable identifier data, communicated or associated location or position, time information data, one or more scanners, a storage device, information data stored or accessed as encoded, encrypted or secured data, an ID-time-location or position management server, a related server, encrypted or confidential mobile device LPTI information data decrypted or accessible, b. one or more installation points, transmitting a specific ID or location or position variable or fixed identifiers; an ID-time-location or position management server receiving the transmitted ID, time, or location or position identifier, converting into location or position, time record and mobile device identification number information, said relative vicinity of said criminal, regulated, tort, or prohibited activity occurs in or near a retail, service or business location or position or is associated with the use or operation of a vehicle, c. one or more of wherein the ID-time-location or position management server assigns to the determined area a large area location or position identifier specific thereto associated with the mobile device ID-time scanner, assigns to the determined scanner installation point a local location or position identifier specific thereto associated with the mobile device ID-time scanner, assigns to the ID-time scanner a transmitter fixed identifier specific thereto, assigns to the ID-time scanner a transmitter variable identifier which is specific to this ID or time information scanner and is a variable value, or stores the assigned large area identifier, local location or position identifier, transmitter identifier, and transmitter variable identifier, and communicated or associated location or position, time record and mobile device identification number information separate from, including or associated with the ID-time-location or position management server, or a related server;

d. one or more of wherein the ID or time information (ID-time) scanner stores its own transmitter fixed identifier, its own transmitter variable identifier, and a large area location or position identifier assigned to an area in which an installation point of the transmitter itself is located, into a storage unit, performs a transmitter variable identifier concealing process on the transmitter variable identifier to conceal the transmitter variable identifier stored therein, or generates the ID or location or position identifier comprising the concealed variable identifier and the large area location or position identifier, or transmits one or more of the above identifiers, optionally with location or position, time record and mobile device identification number information representing or corresponding to the presence of a mobile device and associated person as a potential or suspected suspects, conspirators, participants or witnesses in criminal, regulated, tort, or prohibited activity in the relative vicinity of the one or more scanners, to the ID-time-location or position management server and stored or accessed as encoded, encrypted or secured, e. one or more of wherein the ID-time-location or position management server: stores into the storage device a transmitter activation identifier management table for managing a correlation among initial values of the transmitter fixed identifier and transmitter variable identifier of the ID or time information scanner and the large area location or position identifier and local location or position identifier of an installation point, performs a concealing process on the transmitter variable identifier and stores into the storage device a transmitter identifier management table for managing a correlation among a generated concealed variable identifier and the large area location or position identifier and local location or position identifier of an installation point, storing or stores into the storage device a location or position identifier management table for managing a correlation among the large area location or position identifier and local location or position identifier of an installation point and the location or position, time record and mobile device identification number information of the installation point, extracts a concealed variable identifier from the ID or location or position identifier received from the ID or time information scanner, or converts the received ID or location or position identifier into the large area location or position identifier and the local location or position identifier of an installation point, with the extracted identifier as a secured, encrypted or encoded key, f. one or more of wherein the converted of the large area location or position identifiers, local location or position identifiers, location or position, time record and mobile device identification number information are provided or communicated to the server, and stored or accessed as encoded, encrypted or secured data, and the secured data is converted or accessible with an encryption key with reference to the location or position identifier management table, which secured data information is stored or accessed as encoded, encrypted or secured data comprising location or position, time record and mobile device identification number information representing or corresponding to the presence of a mobile device and associated person as a potential or suspected suspects, conspirators, participants or witnesses in criminal, regulated, tort, or prohibited activity in the relative vicinity of the one or more said scanners;

g. one or more of wherein the secured data is recorded or stored on at least one scanner, location or position identifier, server or storage device, h. one or more of wherein the step of generating the ID or location or position identifier comprises the steps of: (i) calculating on a computer a top hash value from each element of the second hash information sequence; (ii) calculating on a computer the extracted hash value combined with a large area location or position identifier stored therein and generating the ID or location or position identifier; (iii) repeatedly transmitting using an electronic transmitter the generated ID or location or position identifier a determined first number of times at a determined first time interval; (iv) calculating on a computer a next hash value of the second hash information sequence; or repeating steps (i) to (iv) to generate and transmit the ID or location or position identifier as described above, wherein the ID number is generated, accessed, stored or provided in an encoded, encrypted or secured form that is accessible to law enforcement or a court when authorized to do so, such as under a warrant or other legal basis;

i. one or more of wherein said system manages location or position, time record and mobile device identification number that are provided, recorded, accessed, or stored in an encrypted, secured, or encoded form) information in an area having a determined extent where installation points for one or a plurality of ID or time information scanners are set, the location or position, time record and mobile device identification number information system comprising: the ID or time information scanner being installed at the each set installation point and transmitting a specific ID or location or position identifier; a mobile communication terminal provided with a location or position function including an ID or location or position identifier receiving unit configured to receive the transmitted ID or location or position identifier, a program execution unit configured to execute a client program of a location or position, time record and mobile device identification number information application, or a wired or wireless communication unit for mobile communications; or a mobile communication server including a wireless communication unit for mobile communication with the mobile communication terminal, and a network communication unit configured to communicate with a network; an application server including a network communication unit configured to communicate with the network and a program execution unit configured to execute a server program of a location or position, time record and mobile device identification number information application; or an ID-time-location or position management server including a network communication unit configured to communicate with the network for receiving the transmitted ID or location or position identifier via the mobile communication terminal provided with a location or position function and the mobile communication server, or an ID or time information scanner identifier decoding processing unit configured to convert the received ID or location or position identifier into location or position, time record and mobile device identification number information representing the determined installation point, wherein the ID-time-location or position management server stores, accesses, communicates, or stores the mobile ID information in an encrypted, secure or encoded form that is accessible by law enforcement or a court upon issuance of a warrant or upon legally accepted basis for access in the investigation, indictment, prosecution, conviction, or appeal of an alleged crime.

As shown in the above-described embodiments, it is apparent that the present invention can be applicable to the mobile communication system represented by a mobile phone and to the location or position, time record and mobile device identification number information service (LBS) provided using this mobile communication system. Specifically, the third generation mobile phone service and the Internet information service on the third generation mobile phone service can be achieved. Various application services, such as navigation, watching, advertisement providing, and operator arrangement control, have been realized, as the LBS. The present invention realizes a common infrastructure function, i.e., the infrastructure service, to support in the realization of these various application services. Accordingly, the present invention can be applicable to a wide range of application fields, such as daily life and amusement, including the office work using IT equipment or the field operation.

What is claimed is:

1. A method, using one or more processors, for collecting and encrypting location or position, time, and identifier information (LPTI Information) data comprising mobile unique identifier (UID) data, time data, and location or position data, the LPTI Information data representing or corresponding to a presence of a mobile device and associated person as a potential or suspected suspects, conspirators, participants, or witnesses in criminal, regulated, tort, or prohibited activity in a relative vicinity of determined one or more installation points, the method comprising:
 (a) assigning each of one or more ID or time information scanner a corresponding transmitter fixed identifier specific thereto;
 (b) assigning to the each of the ID or time information scanners a corresponding transmitter variable identifier which is specific to each ID or time information scanner and is a variable value, and
 (c) storing in a storage device:
  (i) the transmitter fixed and variable identifiers, and
  (ii) the LPTI information communicated or associated from said one or more scanners, wherein
 said LPTI information data represents or corresponds to the presence of the mobile device and associated person as a potential suspects, conspirators, participants, or witnesses in criminal, regulated, tort, or prohibited activity in the relative vicinity thereof, wherein
 the LPTI information data is encoded, encrypted, or secured using the transmitter variable identifiers, wherein
 either separate from, including, or associated with, a UID-Information management or connected server, the encoded, encrypted, or secured LPTI information data is decrypted and accessible by law enforcement or a court upon issuance of a warrant or upon legally accepted basis for access in the investigation, indictment, prosecution, conviction, or appeal of an alleged crime, tort, regulation violation, law violation, ordinance violation, or prohibited activity, and wherein
 the method further comprises one or more of steps of (a) to (f) following:
  the steps of (a) include, using an ID-time-location or position management server, performing steps of (a-i) to (a-v) following:
   (a-i) assigning to the determined area a large area location or position identifier specific thereto associated with the each ID or time information scanner;
   (a-ii) assigning to the determined scanner installation point a local location or position identifier specific thereto associated with the each ID or time information scanner;
   (a-iii) assigning to the each ID or time information scanner the corresponding transmitter fixed identifier;

(a-iv) assigning to the each ID or time information scanner the corresponding transmitter variable identifier; and (a-v) storing the assigned large area identifier, local location or position identifier, transmitter fixed identifier, and transmitter variable identifier, and communicated or associated location or position, time record and mobile device identification number information representing or corresponding to the presence of the mobile device and associated person as a potential or suspected suspects, conspirators, participants, or witnesses in criminal, regulated, tort, or prohibited activity in the relative vicinity of the one or more scanners, and stored or accessed as encoded, encrypted or secured, into a storage device, either separate from, including, or associated with the ID-time-location or position management server or a related server, the steps of (b) include, using the each ID or time information (ID-time) scanner, performing steps of (b-i) to (b-iv) following:

(b-i) storing the corresponding transmitter fixed identifier, the corresponding transmitter variable identifier, and a large area location or position identifier assigned to an area in which an installation point of the scanner is located, into a storage unit;

(b-ii) performing a transmitter variable identifier concealing process on the transmitter variable identifier to conceal the transmitter variable identifier stored therein; and (b-iii) generating an ID or location or position identifier comprising the concealed variable identifier and the large area location or position identifier; and (b-iv) transmitting one or more of the corresponding transmitter fixed identifier, the corresponding transmitter variable identifier, the large area location or position identifier, the ID or location or position identifier, and the concealed variable identifier, optionally with location or position, time record and mobile device identification number information representing or corresponding to the presence of the mobile device and associated person as a potential or suspects, conspirators, participants, or witnesses in criminal, regulated, tort, or prohibited activity in the relative vicinity of the one or more scanners, to an ID-time-location or position management server and stored or accessed as encoded, encrypted or secured, the steps of (c) include, using a ID-time-location or position management server, performing steps of (c-i) to (c-v) following:

(c-i) storing into the storage device a transmitter activation identifier management table for managing a correlation among initial values of the transmitter fixed identifier and the transmitter variable identifier of the ID or time information scanner and a large area location or position identifier and a local location or position identifier of the installation point;

(c-ii) performing a concealing process on the transmitter variable identifier and stores into the storage device a transmitter identifier management table for managing a correlation among a generated concealed variable identifier and the large area location or position identifier and the local location or position identifier of the installation point;

(c-iii) storing into the storage device a location or position identifier management table for managing a correlation among the large area location or position identifier and local location or position identifier of the installation point and the location or position, time record, and mobile device identification number information of the installation point;

(c-iv) extracting a concealed variable identifier from an ID or location or position identifier received from the ID or time information scanner; and (c-v) converting the ID or location or position identifier into the large area location or position identifier and the local location or position identifier of the installation point, with the extracted identifier as a secured, encrypted, or encoded key, the steps of (d) include generating a ID or location or position identifier, comprising steps of (d-i) to (d-v) following:

(d-i) calculating a top hash value from each element of a second hash information sequence;

(d-ii) calculating an extracted hash value combined with a large area location or position identifier stored therein and generating the ID or location or position identifier;

(d-iii) repeatedly transmitting using an electronic transmitter the ID or location or position identifier a determined first number of times at a determined first time interval;

(d-iv) calculating a next hash value of the second hash information sequence; and (d-v) repeating the steps of (d-i) to (d-iv) to generate and transmit a next ID or location or position identifier, wherein an ID number is generated, accessed, stored, or provided in an encoded, encrypted, or secured form that is accessible to law enforcement or a court when authorized to do so, such as under a warrant or other legal basis, the steps of (e) include performing, using a processor, a location or position charge process, comprising steps of (e-i) to (e-v) following:

(e-i) searching a charge information management table, with a plurality of large area location or position identifiers extracted through the conversion and decoding, the transmitter fixed identification number, a mobile communication company identification number, and a service company identification number as a search key, if a mobile terminal location or position request is received and converted and decoded into location or position, time record, and mobile device identification number information, and one selected from:

e-a. creating a charge information record wherein a number of times of location or position of the charge information record is incremented by one and writing back the charge information record to the charge information management table, if there is a charge information record in the charge information management table matching the search key, or e-b. creating the charge information record, and setting the number of times of location or position of the created charge information record to one and storing the created charge information record into the charge information management table, if there is a charge information record in the charge information management table matching the search key;

(e-ii) reading each record of the charge information management table at a determined time interval;

(e-iii) for each of large area location or position identifiers, summing a total of the number of times of location or position of the read record to calculate the number of times of location or position for each of large area location or positions and applying a determined charge function to the calculated number of times of location or position and transmitting a location or position charge request for an area owner;

(e-iv) for the each mobile communication company identification number, summing a total of the number of times of location or position of the read record to calculate the number of times of location or position for each of mobile communication companies, and applying a determined charge function to the calculated number of times of location or position and transmitting a location or position charge request for the each mobile communication company; and (e-v) for the each application service company identification number, summing a total of the number of times of location or position of the read record to calculate the number of times of location or position for each of application service companies, and applying a determined charge function to the calculated number of times of location or position, and transmitting a location or position charge request for the each service company, and the steps of (f) include, using an ID-time-location or position management server, performing steps of (f-i) to (f-iii) following:

(f-i) storing, for each of a plurality of mobile communication terminals, a mobile communication terminal identifier management table for storing a result of a transmitter identifier decoding process, which is performed in response to a mobile terminal location or position request transmitted by the mobile communication terminal, into the storage device, (f-ii) storing a record comprising a mobile communication terminal identifier, a mobile communication company identifier, a large area location or position identifier, a local location or position identifier, the location or position request occurrence time, the transmitter fixed identifier, and location or position, time record, and mobile device identification number information into the mobile communication terminal identifier management table, and (f-iii) each time the ID-time-location or position management server receives the mobile terminal location or position request and starts a transmitter identifier decoding process, with reference to the mobile communication terminal identifier management table, and with the identifier of a mobile communication terminal which transmitted the location or position request, as a search key, the ID-time-location or position management server then:

f-a. obtains a decoding result of a mobile terminal location or position request, which the communication terminal issues immediately before, as a search result, and extracts the location or position request occurrence time of the immediately preceding location or position request and the location or position, time record and mobile device identification number information, and f-b. compares the location or position occurrence time, which is a result of the decoding process of the received new location or position request, with the location or position, time record and mobile device identification number information, and, if a change in the location or position, time record and mobile device identification number information, the change being equal to or greater than a determined distance, is detected with a determined time difference, then with regard to an ID or time information scanner which transmitted a concealed variable identifier included in the received new location or position request, the ID-time-location or position management server invalidates a record in the transmitter identifier management table in which the ID or time information scanner is registered.

2. A method according to claim 1, wherein said relative vicinity of said criminal, regulated, tort, or prohibited activity occurs in or near a retail, service, or business location or position or is associated with the use or operation of a vehicle.

3. A method according to claim 1, wherein said relative vicinity of said criminal, regulated, tort, or prohibited activity occurs in or near a financial, educational, governmental, transportation, shipping, cargo, residential, business, vacation, travel, power generation or distribution, water or food supply or storage, or data storage location or position or is associated with the use or operation of a vehicle.

4. A method according to claim 3, wherein said financial location or position is selected from an automated teller machine, a bank, a lending company, a check cashing company, a credit union, an investment company, or financing company.

5. A method according to claim 3, wherein said residential location or position is selected from a home, rental property, a vacation home, a condominium, an apartment, a townhouse.

6. A method according to claim 3, wherein said transportation location or position is selected from an airport, a train station, a bus station, a subway station, a taxi, or limousine station or stand, a shipping or cargo port or dock, a trucking or railway stop or distribution center, or a cargo stop, port, or distribution center.

7. A method according to claim 3, wherein said educational location or position is selected from a primary school, a secondary school, a college, a university, a vocational school, a health services school or university, a computer training school, or a retail or services school.

8. A method according to claim 3, wherein said method is provided at a business or residential location or position using a wireless or Ethernet internet connection provided by a cable, satellite, telephone, TV, wireless, or fiber optic product, service, or security system provider.

9. A method according to claim 8, wherein said security system provider provides security services to an occupant, owner, or leasee at said residential or business location or position.

10. A method according to claim 1, wherein the method comprises the steps of (a).

11. A method of claim 1, wherein the method comprises the steps of (b).

12. A method of claim 1, wherein the method comprises the steps of (c).

13. A method of claim 12, wherein the converted of the large area location or position identifiers, local location or position identifiers, location or position, time record, and mobile device identification number information data are provided or communicated to the server, and stored or accessed as encoded, encrypted, or secured data, and the secured data is converted or accessible with an encryption key with reference to the location or position identifier management table, in which secured data information is stored or accessed as encoded, encrypted, or secured data comprising location or position, time record, and mobile device identification number information representing or corresponding to the presence of a mobile device and associated person as a potential or suspected suspects, conspirators, participants, or witnesses in criminal, regulated, tort, or prohibited activity in the relative vicinity of the one or more said scanners.

14. A method according to claim 13, wherein the secured data information is recorded or stored on at least one scanner, location or position identifier, server, or storage device.

15. A method according to claim 1, wherein the method comprises the steps of (d).

16. A mobile device, time, and location or position system for recording and encrypting location or position data, time record data, and mobile device identification number information, comprising:
   a. one or more of a mobile device ID-time scanner installed at one or more installation points and transmitting a specific ID or location or position variable or fixed identifiers; and
   b. an ID-time-location or position management server receiving a transmitted ID, time, or location or position identifier data and converting the same into location or position, time record, and mobile device identification number information as LPTI information, said data representing or corresponding to a presence of a mobile device and associated person(s) as a potential or suspects, conspirators, participants or witnesses in criminal, regulated, tort, or prohibited activity in the relative vicinity of one or more installation points, wherein said system manages the location or position, time record, and mobile device identification number information that are provided, recorded, accessed, or stored in an encrypted, secured, or encoded form in an area having a determined extent where the installation points, for one or a plurality of ID or time information scanners, are set;
   c. a mobile communication terminal provided with a location or position function including an ID or location or position identifier receiving unit configured to receive the transmitted ID or location or position identifier;
   d. a program execution unit configured to execute a client program of a first location or position, time record, and mobile device identification number information application;
   e. a wired or wireless communication unit for mobile communications;
   f. a mobile communication server including a wireless communication unit for mobile communication with the mobile communication terminal and a first network communication unit configured to communicate with a network;
   g. an application server including a second network communication unit configured to communicate with the network and a program execution unit configured to execute a server program of a second location or position, time record, and mobile device identification number information application;
   h. an ID-time-location or position management server including a third network communication unit configured to communicate with the network for receiving the transmitted ID or location or position identifier via the mobile communication terminal provided with a location or position function and the mobile communication server; and
   i. an ID or time information scanner identifier decoding processing unit configured to convert the received ID or location or position identifier into location or position, time record, and mobile device identification number information representing the determined installation point,
   wherein the ID-time-location or position management server stores, accesses, communicates, or stores the mobile ID information in an encrypted, secure, or encoded form that is accessible by law enforcement or a court upon issuance of a warrant or upon legally accepted basis for access in the investigation, indictment, prosecution, conviction, or appeal of an alleged crime,
   wherein the LPTI information is encrypted, and wherein said data is decrypted and accessible by law enforcement or a court upon issuance of a warrant or upon legally accepted basis for access to said data in a criminal investigation, indictment, prosecution, conviction, or appeal of an alleged crime, tort, regulation violation, law violation, ordinance violation, or prohibited activity,
   wherein the ID-time-location or position management server is configured to assign a large area location or position identifier to the area,
   wherein the ID-time-location or position management server is configured to assign one or more local location or position identifiers, each of the one or more local location or position identifiers is associated with each of the one or more installation points,
   wherein the ID-time-location or position management server is configured to assign a corresponding transmitter fixed identifier and a corresponding transmitter variable identifier to each of the one or more ID-time scanner,
   and wherein the ID-time-location or position management server is configured to store the large area location or position identifier, the one or more local location or position identifiers, the transmitter fixed identifier, and the transmitter variable identifier, and the LPTI information into a storage device, either separate from, including, or associated with the ID-time-location or position management server.

17. A method according to claim 1, wherein the method comprises the steps of (e).

18. A method according to claim 1,
   b. wherein the method comprises the steps of (f).

* * * * *

UNITED STATES PATENT AND TRADEMARK OFFICE
CERTIFICATE OF CORRECTION

PATENT NO. : 8,971,932 B2  
APPLICATION NO. : 13/525201  
DATED : March 3, 2015  
INVENTOR(S) : Michael Mapes Page 1 of 1

It is certified that error appears in the above-identified patent and that said Letters Patent is hereby corrected as shown below:

On the Title Page item (54) and in the Specification, col. 1, lines 1-4 should read

SECURE WITNESS OR CRIMINAL PARTICIPANT LOCATION OR POSITION AND TIME RECORDING INFORMATION APPARATUS, SYSTEMS AND METHODS

In the Claims

Claim 9, column 56, line 55, replace "leasee" with --lessee--  
Claim 18, column 58, line 57, delete "b."

Signed and Sealed this  
Fifteenth Day of September, 2015

Michelle K. Lee  
*Director of the United States Patent and Trademark Office*